United States Patent
Itakura et al.

(10) Patent No.: US 9,670,346 B2
(45) Date of Patent: Jun. 6, 2017

(54) PROPYLENE-BASED RESIN COMPOSITION

(71) Applicant: MITSUI CHEMICALS, INC., Tokyo (JP)

(72) Inventors: Keita Itakura, Ichihara (JP); Akiko Odawara, Kisarazu (JP); Satoru Kinouchi, Urayasu (JP); Tateo Takashima, Ichihara (JP); Ryoichi Tsunori, Takaishi (JP); Tomoaki Matsugi, Kisarazu (JP); Yasushi Yanagimoto, Ichihara (JP); Tatsuya Nakamura, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/126,512

(22) PCT Filed: Dec. 9, 2015

(86) PCT No.: PCT/JP2015/084496
§ 371 (c)(1),
(2) Date: Sep. 15, 2016

(87) PCT Pub. No.: WO2016/093266
PCT Pub. Date: Jun. 16, 2016

(65) Prior Publication Data
US 2017/0081509 A1   Mar. 23, 2017

(30) Foreign Application Priority Data
Dec. 9, 2014   (JP) ................................ 2014-249270

(51) Int. Cl.
| | | |
|---|---|---|
| *C08F 210/16* | (2006.01) | |
| *C08L 23/10* | (2006.01) | |
| *C08L 23/14* | (2006.01) | |
| *C08L 23/12* | (2006.01) | |
| *C08F 255/02* | (2006.01) | |

(52) U.S. Cl.
CPC ............ *C08L 23/12* (2013.01); *C08F 255/02* (2013.01); *C08L 23/14* (2013.01)

(58) Field of Classification Search
CPC .......... C08L 23/08; C08L 23/10; C08L 23/12; C08L 23/14
See application file for complete search history.

(56) References Cited

U.S. PATENT DOCUMENTS

| | | | |
|---|---|---|---|
| 4,892,851 A | 1/1990 | Ewen et al. | |
| 4,990,640 A | 2/1991 | Tsutsui et al. | |
| 4,999,403 A * | 3/1991 | Datta .................... | C08F 255/00 525/289 |
| 5,026,798 A | 6/1991 | Canich | |
| 5,055,438 A | 10/1991 | Canich | |
| 5,057,475 A | 10/1991 | Canich et al. | |
| 5,096,867 A | 3/1992 | Canich | |
| 5,153,157 A | 10/1992 | Hlatky et al. | |
| 5,155,080 A | 10/1992 | Elder et al. | |
| 5,158,920 A | 10/1992 | Razavi | |
| 5,162,278 A | 11/1992 | Razavi | |
| 5,195,401 A | 3/1993 | Mouton | |
| 5,223,467 A | 6/1993 | Razavi | |
| 5,223,468 A | 6/1993 | Razavi | |
| 5,225,500 A | 7/1993 | Elder et al. | |
| 5,227,440 A | 7/1993 | Canich et al. | |
| 5,241,025 A | 8/1993 | Hlatky et al. | |
| 5,243,002 A | 9/1993 | Razavi | |
| 5,264,405 A | 11/1993 | Canich | |
| 5,278,119 A | 1/1994 | Turner et al. | |
| 5,278,265 A | 1/1994 | Razavi | |
| 5,292,838 A | 3/1994 | Razavi | |
| 5,304,523 A | 4/1994 | Razavi | |
| 5,321,106 A | 6/1994 | LaPointe | |
| 5,334,677 A | 8/1994 | Razavi et al. | |
| 5,384,299 A | 1/1995 | Turner et al. | |
| 5,387,568 A | 2/1995 | Ewen et al. | |
| 5,391,629 A | 2/1995 | Turner et al. | |
| 5,407,884 A | 4/1995 | Turner et al. | |
| 5,408,017 A | 4/1995 | Turner et al. | |
| 5,420,217 A | 5/1995 | Canich | |
| 5,470,927 A | 11/1995 | Turner et al. | |
| 5,483,014 A | 1/1996 | Turner et al. | |
| 5,504,169 A | 4/1996 | Canich | |
| 5,519,100 A | 5/1996 | Ewen et al. | |
| 5,547,675 A | 8/1996 | Canich | |
| 5,561,092 A | 10/1996 | Ewen et al. | |

(Continued)

FOREIGN PATENT DOCUMENTS

| | | |
|---|---|---|
| JP | H01-501950 A | 7/1989 |
| JP | H01-502036 A | 7/1989 |
| JP | H02-078687 A | 3/1990 |
| JP | H03-179005 A | 8/1991 |
| JP | H03-179006 A | 8/1991 |
| JP | H03-207703 A | 9/1991 |
| JP | H03-207704 A | 9/1991 |
| JP | H08-502303 A | 3/1996 |
| JP | 2000-095903 A | 4/2000 |
| JP | 2000-191851 A | 7/2000 |
| JP | 2000-191862 A | 7/2000 |
| JP | 2001-047577 A | 2/2001 |
| JP | 2001-527589 A | 12/2001 |
| JP | 2002-105132 A | 4/2002 |
| JP | 2004-204057 A | 7/2004 |

(Continued)

OTHER PUBLICATIONS

Peacock et al. The Handbook of Polyethylene 2000.*
International Search Report issued in International Patent Application No. PCT/JP2015/084496 dated Jan. 19, 2016.
Written Opinion of the International Searching Authority issued in International Patent Application No. PCT/JP2015/084496 dated Jan. 19, 2016.
U.S. 5,168,111, 12/1992, Canich, Jo Ann M. (withdrawn).
Office Action issued in Korean Patent Application No. 10-2016-7024288 dated Oct. 17, 2016.

*Primary Examiner* — Mark Kaucher
(74) *Attorney, Agent, or Firm* — Foley & Lardner LLP

(57) ABSTRACT

An object of the present invention is to provide a propylene-based resin composition capable of providing a molded article having an excellent balance between rigidity and impact resistance. The object can be achieved by a propylene-based resin composition including an olefin-based resin characterized by including a grafted ethylene-based copolymer having an ethylene polymer as a side chain.

8 Claims, No Drawings

(56) References Cited

U.S. PATENT DOCUMENTS

| | | | |
|---|---|---|---|
| 5,589,556 A | 12/1996 | Razavi | |
| 5,599,761 A | 2/1997 | Turner | |
| 5,614,457 A | 3/1997 | Ewen et al. | |
| 5,621,126 A | 4/1997 | Canich et al. | |
| 5,631,391 A | 5/1997 | Canich | |
| 5,663,249 A | 9/1997 | Ewen et al. | |
| 5,723,560 A | 3/1998 | Canich | |
| 5,763,549 A | 6/1998 | Elder et al. | |
| 5,801,113 A | 9/1998 | Jejelowo et al. | |
| 5,807,939 A | 9/1998 | Elder et al. | |
| 5,883,202 A | 3/1999 | Ewen et al. | |
| 5,955,557 A * | 9/1999 | Machida | C08F 8/04 526/346 |
| 6,114,457 A | 9/2000 | Markel et al. | |
| 6,121,395 A | 9/2000 | Turner | |
| 6,147,180 A * | 11/2000 | Markel | C08F 2/08 526/348 |
| 6,232,420 B1 | 5/2001 | Turner | |
| 6,245,706 B1 | 6/2001 | Hlatky | |
| 6,265,338 B1 | 7/2001 | Canich | |
| 6,294,625 B1 | 9/2001 | Hlatky et al. | |
| 6,306,973 B1 | 10/2001 | Takaoka et al. | |
| 6,355,592 B1 | 3/2002 | Hlatky et al. | |
| 6,417,120 B1 | 7/2002 | Mitchler et al. | |
| 6,423,795 B1 | 7/2002 | Canich et al. | |
| 6,444,773 B1 | 9/2002 | Markel | |
| 6,617,466 B1 | 9/2003 | Canich | |
| 6,632,898 B1 | 10/2003 | Canich | |
| 6,660,809 B1 | 12/2003 | Weng et al. | |
| 6,939,928 B1 | 9/2005 | Kawai et al. | |
| 7,041,841 B1 | 5/2006 | Canich | |
| 7,163,907 B1 | 1/2007 | Canich et al. | |
| 7,488,789 B2 | 2/2009 | Ikenaga et al. | |
| 7,569,646 B1 | 8/2009 | Canich | |
| 7,678,934 B2 | 3/2010 | Hirota et al. | |
| 7,728,078 B2 | 6/2010 | Ikenaga et al. | |
| 7,737,239 B2 | 6/2010 | Ikenaga et al. | |
| 7,767,313 B2 | 8/2010 | Ikenaga et al. | |
| 2002/0010278 A1 | 1/2002 | Garcia-Franco et al. | |
| 2002/0028896 A1 | 3/2002 | Garcia-Franco et al. | |
| 2002/0049292 A1 | 4/2002 | Garcia-Franco et al. | |
| 2002/0077434 A1 | 6/2002 | Markel | |
| 2002/0155776 A1 | 10/2002 | Mitchler et al. | |
| 2003/0078350 A1 | 4/2003 | Weng et al. | |
| 2003/0120003 A1 | 6/2003 | Kashiwa et al. | |
| 2004/0048984 A1 | 3/2004 | Weng et al. | |
| 2005/0228155 A1 | 10/2005 | Kawai et al. | |
| 2006/0161013 A1 | 7/2006 | Tohi et al. | |
| 2006/0178491 A1 | 8/2006 | Canich | |
| 2006/0198983 A1 | 9/2006 | Patel | |
| 2006/0199006 A1 | 9/2006 | Poon et al. | |
| 2006/0199030 A1 | 9/2006 | Liang et al. | |
| 2006/0199744 A1 | 9/2006 | Walton et al. | |
| 2006/0199872 A1 | 9/2006 | Prieto et al. | |
| 2006/0199884 A1 | 9/2006 | Hoenig et al. | |
| 2006/0199887 A1 | 9/2006 | Liang et al. | |
| 2006/0199896 A1 | 9/2006 | Walton et al. | |
| 2006/0199897 A1 | 9/2006 | Karjala et al. | |
| 2006/0199905 A1 | 9/2006 | Hughes et al. | |
| 2006/0199906 A1 | 9/2006 | Walton et al. | |
| 2006/0199907 A1 | 9/2006 | Chang et al. | |
| 2006/0199908 A1 | 9/2006 | Cheung et al. | |
| 2006/0199910 A1 | 9/2006 | Walton et al. | |
| 2006/0199911 A1 | 9/2006 | Markovich et al. | |
| 2006/0199912 A1 | 9/2006 | Fuchs et al. | |
| 2006/0199914 A1 | 9/2006 | Harris et al. | |
| 2006/0199930 A1 | 9/2006 | Li Pi Shan et al. | |
| 2006/0199931 A1 | 9/2006 | Poon et al. | |
| 2006/0205833 A1 | 9/2006 | Martinez et al. | |
| 2006/0211819 A1 | 9/2006 | Hoenig et al. | |
| 2006/0276607 A1 | 12/2006 | Ikenaga et al. | |
| 2007/0010616 A1 | 1/2007 | Kapur et al. | |
| 2007/0066756 A1 | 3/2007 | Poon et al. | |
| 2007/0078222 A1 | 4/2007 | Chang et al. | |
| 2007/0112127 A1 | 5/2007 | Soediono et al. | |
| 2007/0155900 A1 | 7/2007 | Chang et al. | |
| 2007/0167315 A1 | 7/2007 | Arriola et al. | |
| 2007/0167578 A1 | 7/2007 | Arriola et al. | |
| 2007/0202330 A1 | 8/2007 | Peng et al. | |
| 2007/0219334 A1 | 9/2007 | Li Pi Shan et al. | |
| 2008/0090983 A1 | 4/2008 | Satoh et al. | |
| 2008/0177242 A1 | 7/2008 | Chang et al. | |
| 2008/0234435 A1 | 9/2008 | Chang et al. | |
| 2008/0269388 A1 | 10/2008 | Markovich et al. | |
| 2008/0280517 A1 | 11/2008 | Chang et al. | |
| 2008/0281037 A1 | 11/2008 | Karjala et al. | |
| 2008/0281046 A1 * | 11/2008 | Mori | C08L 23/04 525/88 |
| 2008/0292896 A1 | 11/2008 | Ikenaga et al. | |
| 2008/0306219 A1 | 12/2008 | Ikenaga et al. | |
| 2008/0306234 A1 | 12/2008 | Ikenaga et al. | |
| 2008/0311812 A1 | 12/2008 | Arriola et al. | |
| 2008/0312461 A1 | 12/2008 | Ikenaga et al. | |
| 2009/0042472 A1 | 2/2009 | Poon et al. | |
| 2009/0043050 A1 | 2/2009 | Ikenaga et al. | |
| 2009/0105417 A1 | 4/2009 | Walton et al. | |
| 2009/0247033 A1 | 10/2009 | Peng et al. | |
| 2009/0324914 A1 | 12/2009 | Liang et al. | |
| 2009/0326136 A1 * | 12/2009 | Masuda | C08L 53/00 524/451 |
| 2010/0069574 A1 | 3/2010 | Shan et al. | |
| 2010/0240818 A1 | 9/2010 | Walton et al. | |
| 2010/0279571 A1 | 11/2010 | Poon et al. | |
| 2010/0292421 A1 | 11/2010 | Bando | |
| 2011/0003929 A1 | 1/2011 | Soediono et al. | |
| 2011/0118416 A1 | 5/2011 | Arriola et al. | |
| 2011/0124818 A1 | 5/2011 | Arriola et al. | |
| 2011/0144240 A1 | 6/2011 | Harris et al. | |
| 2011/0152437 A1 | 6/2011 | Harris et al. | |
| 2011/0196103 A1 | 8/2011 | Kawahara et al. | |
| 2011/0230108 A1 | 9/2011 | Arriola et al. | |
| 2013/0018150 A1 | 1/2013 | Walton et al. | |
| 2013/0030092 A1 | 1/2013 | Arriola et al. | |
| 2013/0048204 A1 | 2/2013 | Chang et al. | |
| 2013/0085234 A1 | 4/2013 | Harris et al. | |
| 2014/0114031 A1 | 4/2014 | Bando et al. | |
| 2014/0141228 A1 | 5/2014 | Fuchs et al. | |
| 2014/0249286 A1 | 9/2014 | Arriola et al. | |

FOREIGN PATENT DOCUMENTS

| | | |
|---|---|---|
| JP | 2006-233207 A | 9/2006 |
| JP | 2007-039540 A | 2/2007 |
| JP | 2007-039541 A | 2/2007 |
| JP | 2007-084806 A | 4/2007 |
| JP | 2009-144148 A | 7/2009 |
| JP | 2012-237013 A | 12/2012 |
| KR | 2000-0057837 A | 9/2000 |
| KR | 2005-0118208 A | 12/2005 |
| WO | WO-01/27124 A1 | 4/2001 |
| WO | WO-2004/029062 A1 | 4/2004 |
| WO | WO-2006/057229 A1 | 6/2006 |

* cited by examiner

PROPYLENE-BASED RESIN COMPOSITION

CROSS-REFERENCE TO RELATED APPLICATIONS

The present application is a U.S. national stage application of International Patent Application No. PCT/JP2015/084496, filed Dec. 9, 2015, which claims the benefit of priority to Japanese Patent Application No. 2014-249270, filed Dec. 9, 2014, the entireties of which are hereby incorporated by reference.

TECHNICAL FIELD

The present invention relates to a propylene-based resin composition and a molded article including the composition. More specifically, the invention relates to a propylene-based resin composition that can provide a molded article having an excellent balance between rigidity and impact resistance.

BACKGROUND ART

Propylene resins are used in a various kinds of fields including miscellaneous daily goods, kitchen goods, packaging films, home electric appliances, machine parts, electric parts, and automotive parts. Propylene-based resin compositions containing various modifiers and additives according to required performance are used. Additionally, in order to promote three Rs (Reduce, Reuse, and Recycle) for forming a recycling-oriented society, attempts for weight reduction by thinning molded articles have recently been made in individual industrial fields. Propylene-based resin compositions are being further improved so that even lightweighted and thin molded articles can have sufficient rigidity and impact resistance.

In general, a modifier added to a propylene resin is a soft olefin-based resin made of an ethylene/α-olefin-based copolymer. For further performance improvement, it is expected to apply, as a modifier, an olefin-based block polymer prepared by chemically bonding a crystalline polyethylene segment to a noncrystalline or low-crystalline ethylene/α-olefin-based copolymer segment.

Examples of techniques relating to such an olefin-based block polymer include a technique relating to a linear block polymer including a polyethylene segment and an ethylene/α-olefin-based copolymer segment obtained by using a living polymerization catalyst disclosed in Patent Literature 1 and a technique relating to production of a multi-block polymer using a reversible chain-transfer reaction between two kinds of catalysts disclosed in Patent Literature 2.

Apart from such linear block polymers, Patent Literature documents 3 to 8 have proposed methods for obtaining grafted copolymers having a main chain and one or more side chains and composed of heterogeneous composition segments, one of which is a soft segment and the other one is a hard segment. Disclosures of these methods are generally based on a technique in which a hard segment such as a polyethylene having a terminal vinyl group is synthesized, and, following or simultaneously with the synthesis, the hard segment such as polyethylene is copolymerized with ethylene or an α-olefin having 3 or more carbon atoms to be introduced into the soft segment as the main chain.

For example, Patent Literature documents 3 and 4 disclose methods for obtaining a grafted olefin polymer by copolymerizing a vinyl-terminated polyethylene produced using a specific metallocene catalyst with ethylene. In the disclosed methods, while polyethylene having a terminal vinyl group is obtained, terminal vinyl production efficiency is low, as a result of which there remains a large amount of polyethylene not introduced as side chains. Adding such a grafted polymer into a polypropylene resin deteriorates mechanical physical properties such as impact resistance due to the large amount of contained nonreactive polyethylene. Accordingly, the performance of the grafted polymer as a modifier resin still needs to be improved. Thus, the use of the grafted polymer has not allowed for production of a polypropylene resin composition that exhibits intended physical properties.

Meanwhile, Patent Literature documents 5 to 7 have disclosed techniques for synthesizing a vinyl-terminated polyethylene for a side chain with high production efficiency by using a specific non-metallocene-based complex catalyst. The present inventors performed a follow-up investigation by using a catalyst for main chain production disclosed in Examples of the Patent Literature document 5 or 7 and confirmed that although a certain amount of vinyl-terminated polyethylene is copolymerized into the main chain, productivity is low in high-temperature conditions for introducing the vinyl-terminated vinyl polyethylene with high efficiency. In a block polymer thus obtained, an amount of side chains to be introduced is also limited. Accordingly, even when trying to use the block polymer as a modifier resin for polypropylene, a modification performance thereof is insufficient.

Patent Literature 8 has disclosed a technique for introducing a side chain with high efficiency by a co-supported catalyst system. However, because the main chain is limited to a crystalline polymer, it has been difficult to produce a polymer for a non- or low-crystalline region suitable to modify a propylene-based resin.

Thus, even with the use, as a modifier for a polypropylene resin, of the block polymers and the grafted polymers composed of chemically bonded heterogeneous polymers disclosed in the known techniques, there has been obtained no propylene-based resin composition that is highly balanced in rigidity and impact resistance.

CITATION LIST

Patent Literature

[Patent Literature 1] JP-A-2007-84806
[Patent Literature 2] JP-A-2012-237013
[Patent Literature 3] JP-T-1996-502303
[Patent Literature 4] JP-A-2001-527589
[Patent Literature 5] JP-A-2002-105132
[Patent Literature 6] JP-A-2007-39540
[Patent Literature 7] JP-A-2007-39541
[Patent Literature 8] JP-A-2009-144148

SUMMARY OF INVENTION

Technical Problem

It is an object of the present invention to provide a propylene-based resin composition that has an excellent balance between rigidity and impact resistance.

Solution to Problem

The present inventors conducted intensive and extensive studies to solve the above problem and consequently found that a propylene-based resin composition including an olefin-based resin that contains a considerable amount of a grafted ethylene/α-olefin-based copolymer having an ethylene polymer as a side chain has an excellent balance between rigidity and impact resistance.

The grafted ethylene/α-olefin-based copolymer included in the olefin-based resin includes a main chain having a low glass transition temperature Tg and a crystalline polyethylene side chain having a specific molecular structure. Accordingly, it is speculated that when the olefin-based resin was added to polypropylene, low-temperature impact properties were exhibited by the main chain having the low Tg and, at the same time, rigidity and hardness were favorably exhibited by the side chain polyethylene component acting as a physical crosslinking point, as a result of which the balance between the rigidity and hardness of the propylene-based resin composition and the impact resistance thereof significantly improved.

In this manner, the present inventors have been able to achieve all requirements of rigidity, hardness, and impact resistance at high level by the propylene-based resin composition including the olefin-based resin characterized by including the grafted ethylene/α-olefin-based copolymer having the ethylene polymer as the side chain(s), thereby completing the present invention.

Specifically, the propylene-based resin composition of the present invention relates to the following [1] to [7]:

[1] A propylene-based resin composition characterized by comprising from 1 to 99 parts by weight of a propylene-based polymer (α) whose melt flow rate (MFR) at 230° C. under a load of 2.16 kg obtained according to ASTM D1238E is from 0.1 to 500 g/10 min and from 1 to 99 parts by weight of an olefin-based resin (β) satisfying the following requirements (I) to (V) (in which a sum of the (α) and the (β) is 100 parts by weight):

(I) the olefin-based resin (β) includes a grafted olefin-based polymer [R1] having a main chain comprising an ethylene/α-olefin copolymer and at least one side chain comprising an ethylene polymer;

(II) the olefin-based resin (β) has a melting peak in a range of from 60 to 130° C. in a differential scanning calorimetry (DSC) measurement and a melting heat quantity ΔH at the melting peak is in a range of from 5 to 100 J/g;

(III) a percentage E of an ortho-dichlorobenzene soluble component at 20° C. or lower measured by cross-fractionation chromatography (CFC) is 45% by weight or less;

(IV) a glass transition temperature Tg measured by differential scanning calorimetry (DSC) is in a range of from −80 to −30° C.; and (V) an intrinsic viscosity [η] measured in decalin at 135° C. is in a range of from 0.1 to 12 dl/g.

[2] The propylene-based resin composition according to [1], wherein the side chain of the grafted olefin-based polymer [R1] has a weight average molecular weight in a range of from 500 to 10000.

[3] The propylene-based resin composition according to [1] or [2], wherein the side chain is present with an average frequency of from 0.5 to 20 per 1000 carbon atoms included in the main chain of the grafted olefin-based polymer [R1].

[4] The propylene-based resin composition according to any one of [1] to [3], wherein the olefin-based resin (β) further satisfies the following requirement (VI):

(VI) when the MFR of the olefin-based resin (β) at 190° C. under the load of 2.16 kg obtained according to ASTM D1238E is M g/10 min and the intrinsic viscosity [η] of the olefin-based resin (β) measured in decalin at 135° C. is H g/dl, a value A represented by the following relational equation (Eq-1) is in a range of from 30 to 280:

$$A = M/\exp(-3.3H)$$ (Eq-1)

[5] The propylene-based resin composition according to any one of [1] to [4], wherein the olefin-based resin (β) further satisfies the following requirement (VII):

(VII) in a four-component approximation by a Lorentz function performed for a free induction decay curve obtained by a Carr Purcell Meiboom Gill method in a pulsed nuclear magnetic resonance (pulsed NMR) measurement at 200° C., a spin-spin relaxation time (T2) of a component having a highest mobility is in a range of from 150 to 500 ms and an abundance ratio of the component is in a range of from 15 to 50%.

[6] A method for producing the olefin-based resin (β) according to any of [1] to [5], comprising a step of copolymerizing ethylene with at least one α-olefin selected from α-olefins having 3 to 20 carbon atoms in the presence of an olefin polymerization catalyst including the following components (A) to (C):

(A) a crosslinking metallocene compound represented by the following general formula (I);

(B) a transition metal compound represented by the following general formula [B]; and (C) at least one compound selected from an organometallic compound (C-1), an organoaluminum oxy compound (C-2), and a compound (C-3) that reacts with the crosslinking metallocene compound (A) or the transition metal compound (B) to form a pair of ions,

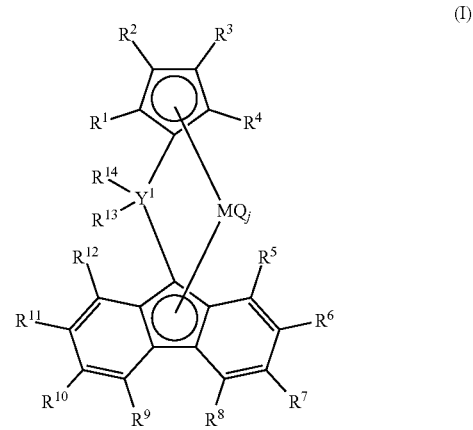

(in the formula (I), $R^1$, $R^2$, $R^3$, $R^4$, $R^5$, $R^8$, $R^9$, and $R^{12}$ each independently represent a hydrogen atom, a hydrocarbon group, a silicon-containing group, or a hetero atom-containing group other than silicon-containing groups, in which adjacent two groups of $R^1$ to $R^4$ may bond to each other to form a ring;

$R^6$ and $R^{11}$ are the same atom or the same group selected from a hydrogen atom, hydrocarbon groups, silicon-containing groups, and hetero atom-containing groups other than silicon-containing groups, $R^7$ and $R^{10}$ are the same atom or the same group selected from a hydrogen atom, hydrocarbon groups, silicon-containing groups, and hetero atom-containing groups other than silicon-containing groups, in which $R^6$ and $R^7$ may bond to each other to form a ring, and $R^{10}$ and $R^{11}$ may bond to each other to form a ring, provided that not all of $R^6$, $R^7$, $R^{10}$, and $R^{11}$ are hydrogen atoms;

$R^{13}$ and $R^{14}$ each independently represent an aryl group;

M represents a titanium atom, a zirconium atom, or a hafnium atom;

$Y^1$ represents a carbon atom or a silicon atom;

Q represents a halogen atom, a hydrocarbon group, a halogenated hydrocarbon group, a neutral conjugated or non-conjugated diene having 4 to 10 carbon atoms, an anion ligand, or a neutral ligand capable of being coordinated with a lone pair of electrons, and j represents an integer of from 1 to 4, in which when j is an integer of 2 or larger, a plurality of Qs each may be the same as or different from each other),

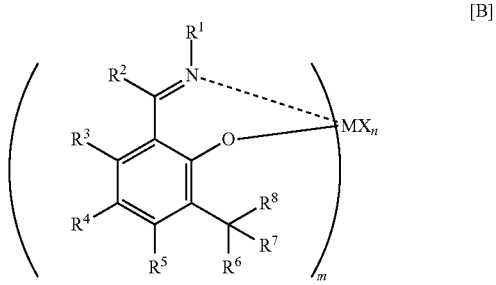

[B]

(in the general formula [B], M represents a transition metal atom of group IV or V in the periodic table;

m represents an integer of from 1 to 4;

$R^1$ represents a hydrocarbon group having 1 to 8 carbon atoms represented by general formula $C_{n'}H_{2n'+1}$ (n' is an integer of from 1 to 8);

$R^2$ to $R^5$ may be the same as or different from each other, and represent a hydrogen atom, a halogen atom, a hydrocarbon group, a heterocyclic compound residue, an oxygen-containing group, a nitrogen-containing group, a boron-containing group, a sulfur-containing group, a phosphorous-containing group, a silicon-containing group, a germanium-containing group, or a tin-containing group, in which two or more thereof may bond to each other to form a ring;

$R^6$ to $R^8$ are hydrocarbon groups, at least one of which is an aromatic hydrocarbon group, and when m is an integer of 2 or larger, two of the groups represented by $R^2$ to $R^8$ between structural units of formula [B] may be bonded to each other;

n is a value satisfying a valence of M, and X represents a hydrogen atom, a halogen atom, a hydrocarbon group, an oxygen-containing group, a sulfur-containing group, a nitrogen-containing group, a boron-containing group, an aluminum-containing group, a phosphorous-containing group, a halogen-containing group, a heterocyclic compound residue, a silicon-containing group, a germanium-containing group, or a tin-containing group, in which when n is an integer of from 2 or larger, a plurality of Xs may be the same as or different from each other and the plurality of groups represented by X may bond to each other to form a ring).

[7] The method for producing the olefin-based resin (β) according to [6], wherein the copolymerizing step is a step of copolymerizing by a solution polymerization method in a temperature range of from 80 to 300° C.

Advantageous Effects of Invention

Since the propylene-based resin composition according to the present invention is highly balanced in rigidity and impact resistance, the composition can be suitably used in various kinds of products such as automotive parts, food containers, and medical containers.

DESCRIPTION OF EMBODIMENTS

Hereinafter, a description will be given of a propylene-based polymer (α) and an olefin-based resin (β) included in a propylene-based resin composition according to the present invention.

Propylene-Based Polymer (α)

The propylene-based polymer (α) is a propylene homopolymer, a copolymer of propylene and at least one selected from ethylene and α-olefins, or a block copolymer of propylene and at least one selected from ethylene and α-olefins. Specific examples of the above-mentioned α-olefins include 1-butene, 2-methyl-1-propane, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene. Among them, 1-butene, 1-pentene, 1-hexene, and 1-octene are preferably usable α-olefins.

A melt flow rate (MFR) of the propylene-based polymer (α) at 230° C. under a load of 2.16 kg obtained according to ASTM D1238 is from 0.1 to 500 g/10 min, preferably 0.2 to 400 g/10 min, and more preferably 0.3 to 300 g/10 min. When the MFR of the propylene-based polymer (α) is lower than the above range, dispersibility of the propylene-based polymer (α) and the olefin-based resin (β) in the propylene-based resin composition is deteriorated, which may lower mechanical strength. Additionally, any MFR of the propylene-based polymer (α) exceeding the above range lowers the strength of the propylene-based polymer (α) itself and therefore may lower the mechanical strength of an obtained propylene-based resin composition.

Olefin-Based Resin (β)

The olefin-based resin (β) may include only one olefin-based polymer or may include two or more olefin-based polymers, but is characterized in that the resin necessarily satisfies all of the following requirements (I) to (V):

(I) the olefin-based resin (β) includes a grafted olefin-based polymer [R1] including an ethylene/α-olefin copolymer main chain and an ethylene polymer side chain;

(II) the olefin-based resin (β) has a melting peak in a range of from 60 to 130° C. in measurement by differential scanning calorimetry (DSC) and has a melting heat quantity ΔH of from 5 to 100 J/g at the melting peak:

(III) a percentage E (% by weight) of an ortho-dichlorobenzene soluble component at 20° C. or lower measured by cross-fractionation chromatography (CFC) is 45% by weight or less;

(IV) a glass transition temperature Tg measured by differential scanning calorimetry (DSC) is in a range of from −80 to −30° C.; and (V) an intrinsic viscosity [η] measured in decalin at 135° C. is in a range of from 0.1 to 12 dl/g.

Hereinafter, the requirements (I) to (V) will be specifically described.

[Requirement (I)]

The olefin-based resin (β) includes the olefin-based polymer [R1] as an essential structural component by producing, for example, by a polymerization method that will be described later. The olefin-based polymer [R1] is a grafted copolymer including a main chain and one or more side chains.

In addition, in the present invention, the term "grafted copolymer" means a T-shaped polymer or a comb-shaped polymer in which one or more side chains are bonded to a main chain. However, the side chains can include repeating unit (s) other than ethylene without departing from the gist of the invention.

Thus, while the olefin-based polymer [R1] has a main chain structure of a non-crystalline or low-crystalline ethylene-based copolymer, it has a crystalline side chain structure. Accordingly, the olefin-based resin (β) of the present invention is less sticky than typical ethylene-based elastomers such as, for example, ethylene/propylene copolymers, ethylene/butene copolymers, and ethylene/octene copolymers, therefore facilitating handling of pellet products.

The olefin-based polymer [R1] of the present invention is the grafted copolymer having a main chain and one or more side chains, as described above. In the invention, preferably, the olefin-based polymer [R1] satisfies the following requirements (i) to (v) in relation to the main chain and the side chains:

(i) the main chain comprises a copolymer of ethylene and at least one or more α-olefins selected from α-olefins having 3 to 20 carbon atoms, and includes 60 to 97% by mol of a repeating unit derived from the ethylene and 3 to 40% by mol of a repeating unit derived from the one or more α-olefins;

(ii) a main chain moiety has a weight average molecular weight of from 20000 to 400000;

(iii) the one or more side chains include a repeating unit derived from ethylene;

(iv) the side chains have a weight average molecular weight of from 500 to 10000; and (v) the side chains are present with an average frequency of from 0.3 to 20 per 1000 carbon atoms included in the main chain.

Hereinafter, the requirements (i) to (v) will be specifically described.

[Requirement (i)]

The main chain of the olefin-based polymer [R1] comprises an ethylene/α-olefin copolymer and serves as a moiety that exhibits characteristics such as flexibility and low-temperature characteristics as a modifier. Accordingly, preferably, the main chain of the olefin-based polymer [R1] includes repeating units derived from ethylene and at least one α-olefin selected from α-olefins having 3 to 20 carbon atoms.

Herein, specific examples of the at least one α-olefin having 3 to 20 carbon atoms that is copolymerized with ethylene include propylene, 1-butene, 2-methyl-1-propene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene, and 1-dodecene.

More preferred are α-olefins having 3 to 10 carbon atoms, and still more preferred are α-olefins having 3 to 8 carbon atoms. Specific examples thereof include linear olefins such as propylene, 1-butene, 1-pentene, 1-hexene, 1-octene, and 1-decene and branched olefins such as 4-methyl-1-pentene, 3-methyl-1-pentene, and 3-methyl-1-butene. Among them, propylene, 1-butene, 1-pentene, 1-hexene, and 1-octene are preferable.

A mole ratio of the ethylene-derived repeating unit with respect to all repeating units in the main chain of the olefin-based polymer [R1] is in a range of preferably from 60 to 97% by mol, more preferably from 60 to 95% by mol, still more preferably from 65 to 90% by mol, and particularly preferably from 65 to 85% by mol. Additionally, a mole ratio of the α-olefin-derived repeating unit with respect to all the repeating units is in a range of preferably from 3 to 40% by mol, more preferably from 5 to 40% by mol, still more preferably from 10 to 35% by mol, and particularly preferably from 15 to 35% by mol.

By setting the mole ratios of the repeating units derived from the ethylene and the α-olefin in the main chain in the above ranges, the olefin-based resin (β) has properties highly flexibility and excellent in low-temperature characteristics, so that the propylene-based resin composition of the present invention including the olefin-based resin (β) has excellent low-temperature impact resistance. On the other hand, when the mole ratio of the α-olefin-derived repeating unit is below the above range, an obtained olefin-based resin becomes a resin inferior in flexibility and low-temperature characteristics, and therefore a propylene-based resin composition including the resin tends to be inferior in low-temperature impact resistance. In addition, when the mole ratio of the α-olefin-derived repeating unit is above the range, it has a disadvantageous effect on copolymerization with a macromonomer forming a side chain, which will be described later. Thereby, no advantageous effect of the grafted polymer that will be described later is obtained and thus the propylene-based resin composition tends to be inferior in the physical balance between impact resistance and rigidity.

The above-mentioned mole ratios of the ethylene- and α-olefin-derived repeating units in the main chain can be adjusted by controlling a ratio between a concentration of the ethylene and a concentration of the α-olefin allowed to be present in a polymerization reaction system in a process for producing the main chain.

In addition, the mole ratio (% by mol) of the unit derived from the α-olefin of the main chain, i.e., an α-olefin composition percentage in the main chain can be calculated or defined by the following method (1) or (2):

(1) an α-olefin composition of a component including only an ethylene/α-olefin copolymer by-produced in a process for producing the olefin-based resin (β) is defined as the unit derived from the α-olefin of the main chain. The by-produced ethylene/α-olefin copolymer is equivalent to a component eluted at a temperature of 20° C. or lower when the olefin-based resin (β) is added into ortho-dichlorobenzene. Thus, the α-olefin composition in the eluted component can be obtained by calculation by a known method using a carbon nuclear magnetic resonance analysis ($^{13}$C-NMR).

(2) a polymer that forms only the main chain is separately synthesized under conditions reasonable in light of conditions for producing the olefin-based resin (β), and then, an α-olefin composition of the obtained ethylene/α-olefin copolymer is analyzed and indirectly defined as the α-olefin composition of the main chain of the olefin-based polymer [R1]. The reasonable conditions are conditions under which a polymer equivalent in principle to the main chain moiety of the olefin-based polymer [R1] is produced, such as the concentrations of the ethylene and the α-olefin in the polymerization system and a molecular abundance ratio between ethylene and hydrogen. Particularly, in a case of, as the method for producing the olefin-based resin (β), employing a method of producing the resin (β) by previously synthesizing an ethylene-based polymer moiety (a macromonomer) corresponding to the side chain and copolymerizing the macromonomer, ethylene, and an α-olefin, a polymerization under the same conditions except for no addition of the macromonomer is separately performed, and then an α-olefin composition of the obtained ethylene/α-olefin copolymer is analyzed and indirectly defined as the α-olefin composition of the main chain of the olefin-based polymer [R1].

[Requirement (ii)]

The weight average molecular weight of the main chain of the olefin-based polymer [R1] is from 20000 to 400000, more preferably from 30000 to 300000, and still more preferably from 50000 to 200000.

When the weight average molecular weight of the main chain of the olefin-based polymer [R1] is in the above range, the propylene-based resin composition of the present invention including the olefin-based resin (β) exhibits a favorable balance between impact resistance, rigidity, and toughness. On the other hand, when the weight average molecular weight thereof is below the range, the impact resistance and toughness are reduced, whereas it is above the range, dispersion into a propylene-based resin becomes poor. Thus, it tends to be difficult to obtain a desired balance between the physical properties.

The weight average molecular weight of the main chain of the olefin-based polymer [R1] can be adjusted by controlling the ethylene concentration in the polymerization system in the production process that will be described later. As the method for controlling the ethylene concentration, there may be mentioned ethylene partial pressure adjustment and polymerization temperature adjustment. The weight average molecular weight of the main chain can also be adjusted by supplying hydrogen in the polymerization system.

In addition, the weight average molecular weight of the main chain can be obtained by obtaining an ethylene/α-olefin copolymer according o the method of calculating or defining the mole ratio (% by mol) of the α-olefin-derived unit described in the afore-mentioned "Requirement (i)" and then measuring a weight average molecular weight of the polymer by a usual method. For example, the weight average molecular weight of the main chain can be obtained from a weight average molecular weight in terms of polyethylene obtained by gel permeation chromatography (GPC).

[Requirement (iii)]

The side chain of the olefin-based polymer [R1] is an ethylene polymer moiety comprising a repeating unit substantially derived from ethylene and comprises a crystalline ethylene polymer chain.

The ethylene polymer comprising the repeating unit substantially derived from ethylene represents a polymer in which a mole ratio of the ethylene-derived repeating unit is preferably from 95.0 to 100% by mol, more preferably from 98.0 to 100% by mol, and still more preferably from 99.5 to 100% by mol, with respect to all repeating units included in the ethylene polymer. In other words, the ethylene polymer may include α-olefin (s) other than ethylene in a range not impairing the role and characteristics thereof.

The side chains of the olefin-based polymer [R1] act as physical crosslinking points in the olefin-based resin (β) and play a role of improving surface hardness and increasing rigidity in the propylene-based resin composition.

The fact that the side chains of the olefin-based polymer [R1] are the crystalline ethylene polymer chains can be confirmed by observing a melting peak in a range of from 60 to 130° C. in differential scanning calorimetry (DSC) of the olefin-based resin (β) according to the present invention, i.e., by having a melting temperature (Tm) in the range of from 60 to 130° C.

[Requirement (iv)]

The weight average molecular weight of the side chains of the olefin-based polymer [R1] is in a range of from 500 to 15000, preferably from 500 to 10000, more preferably from 500 to 5000, and particularly preferably from 500 to 3000.

When the weight average molecular weight of the side chains of the olefin-based polymer [R1] is in the above range, the propylene-based resin composition including the olefin-based resin (β) can exhibit high impact resistance while having high rigidity and high surface hardness.

When the weight average molecular weight of the side chains is below the above range, the role of the side chain components as the physical crosslinking points is reduced and therefore the surface hardness and rigidity of the propylene-based resin composition including the olefin-based resin (β) tend to be lowered.

On the other hand, when the weight average molecular weight of the side chains is above the range, reduction in the number of the side chains with respect to the main chain lowers mechanical physical properties, such as rigidity, surface hardness, and toughness, of the propylene-based resin composition or lowers a relative amount of the ethylene/α-olefin copolymer moiety, whereby impact resistance can be lowered.

The olefin-based polymer [R1] can be obtained by copolymerizing a macromonomer that is the ethylene polymer chain with ethylene and α-olefin (s). In other words, the weight average molecular weight of the macromonomer is equivalent to the weight average molecular weight of the side chains of the olefin-based polymer [R1]. Accordingly, the weight average molecular weight of the side chains can be calculated by analyzing a molecular weight of the ethylene-based polymer moiety (macromonomer) isolated as an eluted component of a low molecular weight-side by GPC measurement of the olefin-based resin (β) or performing GPC measurement of a previously synthesized ethylene-based polymer moiety (macromonomer).

Examples of the method for adjusting the weight average molecular weight of the side chains include a method of changing the kind of a transition metal compound that is used as a catalyst for producing a vinyl-terminated macromonomer that will be described later and a method of adjusting polymerization conditions.

[Requirement (v)]

The side chains of the olefin-based polymer [R1] are present with an average frequency of from 0.3 to 20, preferably from 0.5 to 15, and more preferably from 0.5 to 10, per 1000 carbon atoms in a main chain polymer molecular chain.

When the side chains are introduced in the main chain with the average frequency of the above range, the propylene-based resin composition including the olefin-based resin (β) can have high surface hardness and can exhibit high impact resistance while maintaining rigidity.

On the other hand, when the side chains are introduced in the main chain with an average frequency below the above range, the advantageous effect of the physical crosslinking points by side chains is reduced, whereby the rigidity of the propylene-based resin composition including the resin can be lowered. In addition, when the side chains are introduced in the main chain with an average frequency above the range, the relative amount of crystalline components comprising the ethylene polymer moiety increases, which can thus lower the impact resistance of the propylene-based resin composition including the resin.

Examples of a method for calculating the average frequency of the side chains include [a] a method of using isotope carbon nuclear magnetic resonance spectra ($^{13}$C-NMR) that will be described later and [b] a method by gel permeation chromatography (GPC).

Hereinafter, the [a] and the [b] will be described.

[a] Preferably, the main chain of the olefin-based polymer [R1] comprises repeating units derived from ethylene and at least one α-olefin selected from α-olefins having 3 to 20 carbon atoms, and, in measurement by isotope carbon nuclear magnetic resonance spectra ($^{13}$C-NMR), preferably, a signal attributable to methine carbon of bonding sites between the main chain and the side chains is observed, separately from methine carbon derived from the α-olefin, in a range of from 37.8 to 38.1 ppm.

When the signal is observed, a side-chain average frequency can be obtained by the following formula:

$$[\text{Side-chain average frequency}] = 1000 \times [I_{PE\text{-methine}}] / \{[I_{all-C}] \times (100 - [R2'] - [M])/100\}$$

$[I_{PE\text{-methine}}]$ integration value of methine carbon of bonding sites between side chains and main chain $[I_{all-C}]$: total carbon integration value

[R2']: weight ratio (% by weight) of [R2] other than polymer by-produced when producing [R1], in olefin-based resin (β)

[M]: weight ratio (% by weight) of macromonomer added or produced when producing [R1], in olefin-based resin (β)

[b] As described above, the peak of the low molecular weight side obtained when analyzing the olefin-based resin (β) by gel permeation chromatography (GPC) is derived from the ethylene-based polymer moiety (macromonomer) remaining without being copolymerized in the copolymerization reaction. Accordingly, the weight ratio of the remaining macromonomer included in the olefin-based resin (β) can be obtained from an area ratio of the peak. When a weight composition of the macromonomer added or generated in producing [R1] is obvious, the side-chain average frequency can be obtained from a difference between the weight composition and the weight ratio of the remaining macromonomer. Specifically, the average frequency can be obtained by the following formula:

$$[\text{Side-chain average frequency}] = ([M] - [M'])/(100 - [M']) \times (1/[M_{n\text{-}M}]) \times 14 / \{1 - ([M] - [M'])/(100 - [M'])\} \times (1/1000)$$

[M]: weight ratio (% by weight) of macromonomer added or produced when producing [R1], in total amount [R'] of resin obtained when producing [R1]

[M']: weight amount ratio (% by weight) of remaining macromonomer obtained by GPC, in total amount [R'] of resin obtained when producing [R1], $[M_{n\text{-}M}]$: number average molecular weight of macromonomer In addition, when a by-produced ethylene/α-olefin copolymer is present, the average frequency obtained by the above method [a] or [b] is a value obtained when the number of side chains in the polymer is counted as 0.

The number of the side chains can be adjusted by controlling the molar concentration of the macromonomer in the polymerization system. For example, in a case in which the molecular weight of the side chains is fixed under certain polymerization conditions, when a mass of the macromonomer to be added or produced is increased, the molar concentration of the macromonomer becomes higher and the number of side chains of a grafted polymer produced increases. In addition, in a case in which the mass of the macromonomer to be added or produced is fixed, the molar concentration of the macromonomer becomes higher by making the side chain molecular weight small, which can increase the number of side chains of a grafted polymer produced.

In addition, the number of the side chains can also be adjusted by selecting the kind of a transition metal compound (A) that will be described later. For example, the number of the side chains can be increased by selecting an olefin polymerization catalyst including a transition metal compound that exhibits high copolymerization properties at high temperature and produces a high molecular weight polymer.

When the olefin-based polymer [R1] included in the olefin-based resin (β) satisfies the above-described requirements (i) to (v), the propylene-based resin composition including the olefin-based resin (β) can more significantly exhibit characteristics that satisfy all the requirements for rigidity, hardness, and impact resistance at high level. More preferably, the olefin-based polymer [R1] further satisfies the following requirement (vi).

[Requirement (vi)]

The number of methyl branches in the side chains of the olefin-based polymer [R1] is less than 0.1 per 1000 carbons included in the side chains.

When the number of methyl branches in the side chains is in the above range, crystallinity of the ethylene polymer moiety of the side chains are further increased, so that the surface hardness and rigidity of the propylene-based resin composition including the olefin-based resin (β) are increased.

Additionally, the number of the methyl branches can be measured by performing a known method using an isotope carbon nuclear magnetic resonance ($^{13}$C-NMR) analysis, for example, a method disclosed in JP-A-2006-233207, in the ethylene-based polymer moiety (macromonomer) corresponding to the side chains isolated as an eluted component of the low molecular weight side in GPC by the method described in the "Requirement (iii)" described above or a previously synthesized ethylene-based polymer moiety (macromonomer) corresponding to the side chains. The side chain ethylene-based polymer moiety that satisfies the above requirement can be obtained by specifying the kind of a transition metal compound that is used in a vinyl-terminated macromonomer production catalyst that will be described later.

[Requirement (II)]

The olefin-based resin (β) exhibits a heat absorption peak, namely, a melting peak when measuring a temperature increase by differential scanning calorimetry (DSC). A melting temperature Tm thereof is in a range of from 60 to 130° C., preferably from 80 to 125° C., and more preferably from 90 to 120° C.

In addition, a melting heat quantity ΔH calculated from an area of the above melting peak is in a range of from 5 to 100 J/g, preferably from 5 to 80 J/g, more preferably from 5 to 70 J/g, and still more preferably from 8 to 60 J/g.

The Tm and the ΔH are obtained by melting a sample through a temperature increasing step once by DSC, then crystallizing in a cooling step to 30° C., and analyzing a heat absorption peak appearing at a second temperature increasing step (temperature increasing rate: 10° C./minute).

The melting temperature Tm and the melting heat quantity ΔH observed in the above ranges are mainly derived from the side chain ethylene polymer of the olefin-based polymer [R1] forming the olefin-based resin (β). When the melting temperature Tm and the melting heat quantity ΔH are in the above ranges, the balance between the rigidity, heat resistance, and toughness of the propylene-based resin composition of the present invention become favorable. On the other hand, when the melting temperature Tm or the melting heat quantity ΔH is below the above range, the rigidity, heat resistance, and toughness of the propylene-based resin composition are lowered. In addition, when the melting heat quantity ΔH is above the range, the impact resistance of the propylene-based resin composition is lowered, which is thus not preferable.

As a method for adjusting the melting temperature Tm to a value within the above range, there may be mentioned a method of appropriately selecting the kind of the transition metal compound that is used in a vinyl-terminated macromonomer production catalyst that will be described later.

In addition, as a method for adjusting the melting heat quantity ΔH to a value within the above range, there may be mentioned a method of controlling an abundance ratio of the vinyl-terminated macromonomer in a production process that will be described later. Specifically, it is a method of controlling a feeding amount of a vinyl-terminated macromonomer feed or controlling a feeding ratio of the transition metal compound (A) and a transition metal compound (B) that will be described later.

[Requirement (III)]

In the olefin-based resin (β), a percentage (E value) of the following ortho-dichlorobenzene soluble component at 20° C. or lower measured by cross-fractionation chromatography (CFC) is 45% by weight or less, preferably 35% by weight or less, and more preferably 30% by weight or less.

Usually, commercially available ethylene/α-olefin copolymers, for example, ethylene/propylene copolymers, ethylene/butene copolymers, and ethylene/octene copolymers are polymers adjusted so that the composition of an α-olefin such as propylene, 1-butene, or 1-octene is approximately from 10 to 50% by mol. Those polymers exhibit non-crystalline properties or low-crystalline properties and are favorably soluble in specific organic solvents even at room temperature or lower. For example, a commercially available ethylene/butene copolymer resin, for example, TAFMER A-5055S is mostly soluble in ortho-dichlorobenzene at 20° C. or lower, and the E value thereof is usually a value equal to or more than 93%.

On the other hand, in the olefin-based polymer [R1] forming the olefin-based resin (β) according to the invention, while the main chain thereof is the ethylene/α-olefin copolymer as described above, the side chains thereof are the crystalline ethylene polymer. Thus, the olefin-based polymer [R1] is hardly soluble in ortho-chlorobenzene at room temperature or lower. Due to that, the olefin-based resin (β) is characterized in that the E value thereof is small.

The fact that the olefin-based resin (β) has a small E value is indirect evidence indicating that the main chain structure and the side chain structure of the olefin-based polymer [R1] are chemically bonded to each other, and further indicates that a significant amount of the olefin-based polymer [R1] is included in the olefin-based resin (β).

In the propylene-based resin composition of the present invention, the olefin-based resin (β) is dispersed in a polypropylene resin and plays a role of providing improvement in impact resistance, as in commercially available ethylene/α-olefin copolymer resins commonly used as modifiers. Herein, when a commercially available ethylene/α-olefin copolymer resin is used, impact resistance is improved according to the amount of addition, whereas rigidity and mechanical strength inherent in polypropylene are lowered. On the other hand, when the olefin-based resin (β) according to the invention is used, it is speculated that the polyethylene moiety as the side chains of the olefin-based polymer [R1] forms physical crosslinking points in a domain formed by the ethylene/α-olefin copolymer, whereby high rigidity, hardness, and mechanical strength are provided in the domain itself, as a result of which the propylene-based resin composition of the invention has excellent surface hardness and a significantly improved balance between rigidity and impact resistance. Accordingly, the fact that the olefin-based resin (β) includes a significant amount of the olefin-based polymer [R1] is an important factor in terms of exhibiting a favorable balance between the physical properties of the polypropylene composition of the invention.

In addition, in order to favorably maintain the balance between the impact resistance and the rigidity of the propylene-based resin composition of the invention, the ΔH and the E value of the olefin-based resin (β) preferably satisfy any of the following relationships a), b), and c).

a) When ΔH is 5 J/g or more and less than 15 J/g, E is 45% by weight or less, preferably 40% by weight or less, and more preferably in a range of from 10 to 35% by weight.

b) When ΔH is 15 J/g or more and less than 30 J/g, E is 40% by weight or less, preferably 35% by weight or less, and more preferably in a range of from 5 to 30% by weight.

c) When ΔH is 30 J/g or more, E is 30% by weight or less, and preferably 25% by weight or less.

Satisfying any of the relationships shown above indicates that the amount of the olefin-based polymer [R1] included in the olefin-based resin (β) according to the present invention is sufficiently large in terms of obtaining a propylene-based resin composition having an excellent balance between rigidity and impact resistance.

When the above relationships are not satisfied, i.e., when the E value is large, the content of the grafted polymer is insufficient and the properties of the polymer become like those of a polymer blend of an ethylene/α-olefin copolymer and an ethylene-based polymer, which makes it difficult to exhibit the favorable physical balance as described above.

For example, as in the case in which ΔH is 5 J/g or more and less than 15 J/g, when the amount of the ethylene polymer component is small and the E value exceeds 45% by weight, the propylene-based resin composition has performance close to that obtained when using an existing ethylene/α-olefin copolymer, whereby the propylene-based resin composition can be a resin composition having improved impact resistance but inferior rigidity. In addition, as in the case in which ΔH is 30 J/g or more, when the amount of the ethylene polymer component is relatively large and the E value exceeds 30% by weight, the content of the component of the ethylene polymer alone not introduced in the main chain increases, which can not only deteriorate an impact resistance modifying effect, but also can significantly lower the rigidity.

As already described, the olefin-based resin (β) includes the significant amount of the component in which the crystalline ethylene polymer moiety is chemically bonded to the ethylene/α-olefin copolymer, and therefore can simultaneously satisfy the above-described requirements (II) and (III). In order to obtain such a resin, it is important to select a catalyst that is used in the process of copolymerizing ethylene with α-olefin(s) and a vinyl-terminated ethylene polymer, and the selection can be achieved by using the transition metal compound (A) described later.

[Requirement (IV)]

In the olefin-based resin (β), the glass transition temperature Tg measured by differential scanning calorimetry (DSC) is in a range of from −80 to −30° C., preferably from −80 to −40° C., and more preferably from −80 to −50° C.

The glass transition temperature Tg is derived from the ethylene/α-olefin copolymer of the main chain of the olefin-based polymer [R1]. When the glass transition temperature Tg is in the range of from −80 to −30° C., the propylene-based resin composition including the olefin-based resin (β) favorably exhibits impact resistance.

A glass transition temperature Tg lying within the above range can be obtained by controlling the kind and composition of the α-olefin as a comonomer.

[Requirement (V)]

The olefin-based resin (β) has an intrinsic viscosity [η], measured in decalin at 135° C., ranging from 0.1 to 12 dl/g, more preferably from 0.2 to 10 dl/g, and still more preferably from 0.5 to 5 dl/g. When the intrinsic viscosity is in the range, the propylene-based resin composition including the olefin-based resin (β) exhibits favorable rigidity and mechanical strength in addition to impact resistance, whereby higher moldability can also be achieved.

The olefin-based resin (β) preferably satisfies the following requirement (VI) in addition to the above requirements (I) to (V).

[Requirement (VI)]

When a melt flow rate (MFR) of the olefin-based resin (β) at 190° C. under a load of 2.16 kg obtained according to ASTM D1238E is assumed to be M g/10 min and the intrinsic viscosity [η] measured in decalin at 135° C. is assumed to be H g/dl, a value A represented by the following relational equation (Eq-1) is in a range of from 30 to 280, preferably from 60 to 250, and more preferably from 70 to 200.

$$A = M/\exp(-3.3H) \qquad \text{(Eq-1)}$$

When the olefin-based resin (β) has the value A in such a range, it indicates a high macromonomer introduction ratio. The olefin-based resin (β) satisfying the requirement (VI) is preferable because it does not cause reduction in the physical properties such as rigidity due to a remaining macromonomer or a non-grafted polymer even when applied to modification of a propylene-based resin.

The olefin-based resin (β) preferably satisfies the following requirement (VII) in addition to the above requirements (I) to (V).

[Requirement (VII)]

In the olefin-based resin (β), in a four-component approximation by a Lorentz function performed for a free induction decay curve obtained by a Carr Purcell Meiboom Gill (CPMG) method in a pulsed nuclear magnetic resonance measurement (pulsed NMR) at 200° C., the spin-spin relaxation time (T2) of a component having the highest mobility is in a range of from 150 to 500 ms, and the abundance ratio of the component is in a range of 15 to 50%.

Pulsed NMR is an analysis commonly performed as a method for evaluating mobilities of polymer molecular chains and an interaction state between different components, and evaluates by measuring $^1$H transverse relaxation times of all components forming a resin. The relaxation time becomes shorter as the mobility of a polymer chain becomes lower. Thus, signal intensity attenuation becomes faster, and relative signal intensity with respect to an initial signal intensity of 100% is reduced in a short time. In addition, since the relaxation time becomes longer as the mobility of the polymer chain becomes higher, signal intensity attenuation becomes slower, and thus, relative signal intensity with respect to the initial signal strength of 100% is gently reduced in a long time.

In a four component-approximation by the Lorentz function performed for a free induction decay curve (FID) of $^1$H nuclei obtained in a pulsed NMR measurement performed at a measurement temperature of 200° C., with an observed pulse width of 2.0 µsec and a repeating time of 4 sec by the CPMG method, a component having the longest T2 can be considered to be derived from a component having the highest polymer mobility. Particularly, when the T2 is from 150 to 500 ms, it can be said that the relaxation time is derived from the mobility of a free terminal of the polymer chain.

Since the olefin-based resin (β) of the present invention includes the olefin-based polymer [R1] comprising the ethylene/α-olefin copolymer main chain that is a non-crystalline or low-crystalline component and the grafted polymer chains as the ethylene polymer side chains that are crystalline components, it has more terminal structures than non-grafted polymers.

Accordingly, in the olefin-based resin (β), in the four-component approximation by the Lorentz function performed for the free induction decay curve obtained by the Carr Purcell Meiboom Gill (CPMG) method in the pulsed nuclear magnetic resonance measurement (pulsed NMR) at 200° C., the abundance ratio of the component having the highest mobility is in a range of preferably from 15 to 50%, and more preferably from 15 to 40%.

Thus, when the component abundance ratio corresponding to the content of free terminals of the ethylene polymer side chains is in the above range, the above-described physical crosslinking points by the ethylene polymer side chains are easily formed, so that the propylene-based resin composition of the present invention significantly favorably exhibits impact resistance while maintaining rigidity, and furthermore has very high surface hardness.

[Other Physical Properties of Olefin-Based Resin (β)]

Elastic Modulus

The olefin-based resin (β) has an elastic modulus ranging preferably from 2 to 120 MPa, more preferably from 3 to 100 MPa, and still more preferably from 5 to 90 MPa. When the elastic modulus is in the above range, the propylene-based resin composition including the olefin-based resin (β) has better balance between rigidity and impact resistance.

The olefin-based resin (β) is highly flexible because the main chain structure of the olefin-based polymer [R1] comprises the ethylene/α-olefin copolymer. In other words, the propylene-based resin composition including the olefin-based resin (β) favorably exhibits impact resistance.

In addition, the elastic modulus is preferably a tensile elastic modulus according to ASTM D638.

Phase Separation Structure

In the olefin-based resin (β), a phase representing a crystalline component observed through a transmission electron microscope is preferably a discontinuous phase of micrometer order. In addition, an observation as to whether or not the olefin-based resin (β) contains the above-mentioned phase structure is made, for example, as follows.

First, using a hydraulic hot press molding machine set at 170° C., the propylene-based resin composition is previously heated for 5 minutes and then molded in 1 minute under a pressure of 10 MPa. After that, the molded product is cooled at 20° C. under a pressure of 10 MPa for 3 minutes to create a sheet having a predetermined thickness, whereby a test piece is obtained.

The test piece as the above pressed sheet is formed into a small piece having a size of 0.5 mm square and dyed with ruthenium acid ($RuO_4$). Furthermore, the obtained small piece is cut into an ultra-thin slice piece having a film thickness of approximately 100 nm by an ultra microtome provided with a diamond knife. Then, carbon is deposited on the ultra-thin slice piece, and the test piece is observed through a transmission electron microscope (acceleration voltage: 100 kV).

In the observation method, the side chain ethylene polymer component of the olefin-based polymer [R1] is observed with higher contrast because an inter-crystal non-crystalline moiety having a lamellar structure formed by the component is selectively dyed with osmic acid.

In the olefin-based resin (β), preferably, the phase that represents the crystalline component comprising the side chain ethylene polymer of the olefin-based polymer [R1] observed in this manner is a discontinuous phase of micrometer order.

As described above, the olefin-based resin (β) includes, as the main component, the olefin-based polymer [R1] in which the non-crystalline or low-crystalline main chain and the crystalline side chains are bonded by covalent bonding, there is a highly compatible effect between the non-crystalline component and the crystalline component. Thus, it seems that the micro phase separation structure as mentioned above is formed.

The discontinuous phase observed in the olefin-based resin (β) is a physical crosslinking point comprising the side chain ethylene polymer, and the physical crosslinking point seems to be formed also in the ethylene/α-olefin copolymer domain formed in the propylene-based resin composition of the present invention using the olefin-based resin (β). Thus, the propylene-based resin composition of the invention is considered to have an excellent balance between rigidity and impact resistance, as described above.

On the other hand, when the polymer blend of an ethylene/α-olefin copolymer and an ethylene polymer is used, the micro phase separation structure as mentioned above is not formed, and a coarse crystalline phase is observed. Due to this, in a propylene-based resin composition using the polymer blend, no physical crosslinking point is formed in the olefin copolymer domain. Thus, there cannot be obtained a propylene-based resin composition exhibiting a favorable physical property balance.

As described above, the peak of the low molecular weight side obtained from the analysis of the olefin-based resin (β) by gel permeation chromatography (GPC) is derived from the ethylene-based polymer moiety (macromonomer) remaining without being copolymerized in the copolymerization reaction, and the weight ratio of the remaining macromonomer remaining included in the olefin-based resin (β) can be obtained from the area ratio of the peak of the low molecular weight side with respect to a total peak area. The weight ratio of the remaining macromonomer calculated in this way is preferably from 0 to 30% by weight, more preferably from 0 to 25% by weight, still more preferably from 0 to 20% by weight, and even still more preferably from 2 to 15% by weight. When the remaining macromonomer has a weight ratio in the above range, it means that the content of the component of the ethylene polymer alone not introduced in the main chain is sufficiently small, so that the olefin-based resin (β) can effectively exhibit modification performance. On the other hand, when the weight ratio of the remaining macromonomer exceeds 30% by weight, not only deterioration of the effect of modification on impact resistance but also significant rigidity reduction can occur.

<Method for Producing Olefin-Based Resin (β)>

An example of a method for producing the olefin-based resin (β) of the present invention is a method of polymerizing a specific olefin in the presence of an olefin polymerization catalyst that is used by combining the following (A) to (C).

Hereinafter, each component of the (A) to the (C) will be described and then, specific production methods, production conditions, and the like will be described.

[Crosslinking Metallocene Compound (A)]

A crosslinking metallocene compound (A) that is used in the present invention is represented by the following general formula (I), and serves as an olefin polymerization catalyst in the presence of a compound (C) that will be described later.

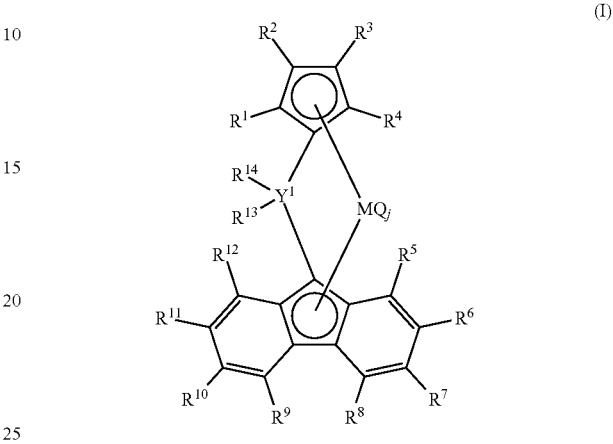

(I)

(In the formula (I), $R^1$, $R^2$, $R^3$, $R^4$, $R^5$, $R^8$, $R^9$, and $R^{12}$ each independently represent a hydrogen atom, a hydrocarbon group, a silicon-containing group, or a hetero atom-containing group other than silicon-containing groups, in which adjacent two groups of $R^1$ to $R^4$ may bond to each other to form a ring;

$R^6$ and $R^{11}$ are the same atom or the same group selected from a hydrogen atom, hydrocarbon groups, silicon-containing groups, and hetero atom-containing groups other than silicon-containing groups, $R^7$ and $R^{10}$ are the same atom or the same group selected from a hydrogen atom, hydrocarbon groups, silicon-containing groups, and hetero atom-containing groups other than silicon-containing groups, in which $R^6$ and $R^7$ may bond to each other to form a ring and $R^{10}$ and $R^{11}$ may bond to each other to form a ring, provided that not all of $R^6$, $R^7$, $R^{10}$, and $R^{11}$ are hydrogen atoms;

$R^{13}$ and $R^{14}$ each independently represent an aryl group;

M represents a titanium atom, a zirconium atom, or a hafnium atom;

$Y^1$ represents a carbon atom or a silicon atom;

Q represents a halogen atom, a hydrocarbon group, a halogenated hydrocarbon group, a neutral conjugated or non-conjugated diene having 4 to 10 carbon atoms, an anion ligand, or a neutral ligand capable of being coordinated with a lone pair of electrons; and j represents an integer of from 1 to 4, in which when j is an integer of 2 or larger, a plurality of Qs each may be the same as or different from each other).

The olefin polymerization catalyst including the crosslinking metallocene compound (A) plays a role of polymerizing ethylene, at least one α-olefin selected from α-olefins having 3 to 20 carbon atoms, and furthermore, a vinyl-terminated macromonomer synthesized by an olefin polymerization catalyst including (B) and (C) that will be described later to produce the moiety forming the main chain of the olefin-based polymer [R1].

In other words, the olefin polymerization catalyst including the crosslinking metallocene compound (A) is characterized in that it can copolymerize ethylene, α-olefin(s), and a vinyl-terminated macromonomer and is highly polymerizable particularly, with α-olefins and vinyl-terminated macromonomers. Furthermore, the olefin polymerization catalyst including the transition metal compound (A) is characterized in that it exhibits a sufficiently high olefin polymerization activity even under relatively high temperature conditions in which the macromonomer as the ethylene polymer chain is dissolved and produces a polymer having a practically sufficiently high molecular weight.

By allowing the olefin polymerization catalyst including the crosslinking metallocene compound (A) to have the above characteristics, the olefin-based resin (β) includes much the olefin-based polymer [R1] and can satisfy the above-described requirements (I) to (V). Thereby, the propylene-based resin composition of the present invention has high surface hardness and becomes excellent in the balance between impact resistance and rigidity.

Hereinafter, a description will be given of characteristics of a chemical structure of the crosslinking metallocene compound (A) that is used in the present invention.

The crosslinking metallocene compound (A) structurally includes the following characteristics [m1] to [m3]:

[m1] one of two ligands is a cyclopentadienyl group that may have a substituent, and the other one thereof is a fluorenyl group having a substituent (hereinafter referred to also as "substituted fluorenyl group");

[m2] the two ligands are bonded by an aryl group-containing covalent bonding crosslinking site comprising a carbon atom or a silicon atom containing an aryl group (hereinafter referred to also as "crosslinking site"); and

[m3] a transition metal (M) forming the metallocene compound is an atom of group IV in the periodic table, and specifically, a titanium atom, a zirconium atom, or a hafnium atom.

Hereinafter, the cyclopentadienyl group that may have a substituent, the substituted fluorenyl group, the crosslinking site, and other characteristics included in the crosslinking metallocene compound (A) will be described in order.
(Cyclopentadienyl Group that May have Substituent)

In the formula (I), $R^1$, $R^2$, $R^3$, and $R^4$ each independently represent a hydrogen atom, a hydrocarbon group, a silicon-containing group, or a hetero atom-containing group other than silicon-containing groups, among which a hydrogen atom, a hydrocarbon group, and a silicon-containing group are preferable, and in which adjacent two groups may bond to each other to form a ring.

For example, $R^1$, $R^2$, $R^3$, and $R^4$ are all a hydrogen atom or any one or more of $R^1$, $R^2$, $R^3$, and $R^4$ are a hydrocarbon group (hereinafter may be referred to as "hydrocarbon group (f1)"), and preferably, a hydrocarbon group having 1 to 20 carbon atoms or a silicon-containing group (hereinafter may be referred to as "silicon-containing group (f2)"), and preferably, a silicon-containing group having 1 to 20 carbon atoms. Other examples of $R^1$, $R^2$, $R^3$, and $R^4$ can include hetero atom-containing groups (except for silicon-containing groups (f2)), such as halogenated hydrocarbon groups, oxygen-containing groups, and nitrogen-containing groups.

The hydrocarbon groups (f1) are preferably hydrocarbon groups having 1 to 20 carbon atoms. Examples thereof include linear or branched hydrocarbon groups such as alkyl groups, alkenyl groups, and alkynyl groups; cyclic saturated hydrocarbon groups such as cycloalkyl groups; and cyclic unsaturated hydrocarbon groups such as aryl groups. The hydrocarbon groups (f1) also include, among the groups exemplified above, groups in which optional two hydrogen atoms bonded to carbon atoms adjacent to each other are simultaneously substituted to form an alicyclic ring or an aromatic ring.

Specific examples of the hydrocarbon groups (f1) include linear hydrocarbon groups such as methyl groups, ethyl groups, n-propyl groups, n-butyl groups, n-pentyl groups, n-hexyl groups, n-heptyl groups, n-octyl groups, n-nonyl groups, n-decanyl groups, and allyl groups; branched hydrocarbon groups such as isopropyl groups, isobutyl groups, sec-butyl groups, t-butyl groups, amyl groups, 3-methylpentyl groups, neopentyl groups, 1,1-diethylpropyl groups, 1,1-dimethylbutyl groups, 1-methyl-1-propylbutyl groups, 1,1-propylbutyl groups, 1,1-dimethyl-2-methylpropyl groups, and 1-methyl-1-isopropyl-2-methylpropyl groups; cyclic saturated hydrocarbon groups such as cyclopentyl groups, cyclohexyl groups, cycloheptyl groups, cyclooctyl groups, norbornyl groups, and adamantyl groups; cyclic unsaturated hydrocarbon groups such as phenyl groups, naphthyl groups, biphenyl groups, phenanthryl groups, and anthracenyl groups, and nucleus alkyl-substituted groups thereof; and groups in which at least one hydrogen atom of the saturated hydrocarbon groups is substituted with an aryl group, such as benzyl groups and cumyl groups.

The silicon-containing groups (f2) are preferably silicon-containing groups having 1 to 20 carbon atoms, and examples thereof include groups in which a silicon atom is directly covalent-bonded to cyclic carbon of a cyclopentadienyl group. Specific examples of the groups include alkylsilyl groups such as trimethylsilyl groups and arylsilyl groups such as triphenylsilyl groups.

Specific examples of the hetero atom-containing groups (except for silicon-containing groups (f2)) include methoxy groups, ethoxy groups, phenoxy groups, N-methylamino groups, trifluoromethyl groups, tribromomethyl groups, pentafluoroethyl groups, and pentafluorophenyl groups.

When two or more of $R^1$, $R^2$, $R^3$, and $R^4$ are substituents other than a hydrogen atom, the substituents may be the same as or different from each other and adjacent two groups of $R^1$, $R^2$, $R^3$, and $R^4$ may bond to each other to form an alicyclic ring or an aromatic ring.
(Substituted Fluorenyl Group)

In the formula (I), $R^5$, $R^8$, $R^9$, and $R^{12}$ each independently represent a hydrogen atom, a hydrocarbon group, a silicon-containing group, or a hetero atom-containing group other than silicon-containing groups, among which a hydrogen atom, a hydrocarbon group, and a silicon-containing group are preferable; $R^6$ and $R^{11}$ are the same atom or the same group selected from a hydrogen atom, hydrocarbon groups, silicon-containing groups, and hetero atom-containing groups other than silicon-containing groups, among which a hydrogen atom, hydrocarbon groups, and silicon-containing groups are preferable; and $R^7$ and $R^{10}$ are the same atom or the same group selected from a hydrogen atom, hydrocarbon groups, silicon-containing groups, and hetero atom-containing groups other than silicon-containing groups, among which a hydrogen atom, hydrocarbon groups, and silicon-containing groups are preferable; $R^6$ and $R^7$ may bond to each other to form a ring and $R^{10}$ and $R^{11}$ may bond to each other to form a ring, provided that not all of $R^6$, $R^7$, $R^{10}$, and $R^{11}$ are hydrogen atoms.

From the viewpoint of polymerization activity, preferably, neither $R^6$ nor $R^{11}$ are hydrogen atoms; more preferably, none of $R^6$, $R^7$, $R^{10}$ and $R^{11}$ are hydrogen atoms; and particularly preferably, $R^6$ and $R^{11}$ are the same group selected from hydrocarbon groups and silicon-containing groups, and $R^7$ and $R^{10}$ are the same group selected from hydrocarbon groups and silicon-containing groups. Additionally, preferably, $R^6$ and $R^7$ bond to each other to form an alicyclic ring or an aromatic ring, and $R^{10}$ and $R^{11}$ bond to each other to form an alicyclic ring or an aromatic ring.

Exemplary and preferable groups as the hydrocarbon groups in $R^5$ to $R^{12}$ are the hydrocarbon groups (f1) defined in the section of the above substituted cyclopentadienyl group. Exemplary and preferable groups as the silicon-containing groups in $R^5$ to $R^{12}$ are the silicon-containing groups (f2) defined in the section of the above substituted cyclopentadienyl group. The hetero atom-containing groups in $R^5$ to $R^{12}$ are the groups exemplified in the section of the above substituted cyclopentadienyl group.

Suitable examples of the substituted fluorenyl group in the cases in which $R^6$ and $R^7$, and $R^{10}$ and $R^{11}$ bond to each other to form an alicyclic ring or an aromatic ring include groups derived from compounds represented by general formulae [II] to [VI] that will be described later.
(Crosslinking Site)

In the formula (I), $R^{13}$ and $R^{14}$ each independently represent an aryl group, and $Y^1$ represents a carbon atom or a silicon atom. An important point in the olefin polymer production method is that the crosslinking atom $Y^1$ of the crosslinking site has $R^{13}$ and $R^{14}$ as aryl groups that may be the same as or different from each other. In terms of production easiness, preferably, $R^{13}$ and $R^{14}$ are the same as each other.

Examples of the aryl groups include phenyl groups, naphthyl groups, anthracenyl groups, and groups in which one or more aromatic hydrogen atoms (sp2-type hydrogen atoms) of these groups are substituted with substituents. Examples of the substituents include the hydrocarbon groups (f1) and the silicon-containing groups (f2) defined in the section of the substituted cyclopentadienyl group, halogen atoms, and halogenated hydrocarbon groups.

Specific examples of the aryl groups include unsubstituted aryl groups having 6 to 14 carbon atoms, and preferably 6 to 10 carbon atoms, such as phenyl groups, naphthyl groups, anthracenyl groups, and biphenyl groups; alkyl group-substituted aryl groups such as tolyl groups, isopropylphenyl groups, n-butylphenyl groups, t-butylphenyl groups, and dimethylphenyl groups; cycloalkyl group-substituted aryl groups such as cyclohexylphenyl groups; halogenated aryl groups such as chlorophenyl groups, bromophenyl groups, dichlorophenyl groups, and dibromophenyl groups; and halogenated alkyl group-substituted aryl groups such as (trifluoromethyl)phenyl groups and bis(trifluoromethyl)phenyl groups. The substituents are preferably at a meta position and/or a para position. Among them, more preferable are substituted phenyl groups whose substituents are at a meta position and/or a para position.
(Other Characteristics of Crosslinking Metallocene Compound (A))

In the formula (I), Q represents a halogen atom, a hydrocarbon group, a halogenated hydrocarbon group, a neutral conjugated or non-conjugated diene having 4 to 10 carbon atoms, an anion ligand, or a neutral ligand capable of being coordinated with a lone pair of electrons, and j represents an integer of from 1 to 4, in which when j is an integer of 2 or larger, plural Qs each may be the same as or different from each other.

Specific examples of halogen include fluorine, chlorine, bromine, and iodine. Examples of the hydrocarbon group include linear or branched aliphatic hydrocarbon groups having 1 to 10 carbon atoms and alicyclic hydrocarbon groups having 3 to 10 carbon atoms. Examples of the aliphatic hydrocarbon groups include methyl groups, ethyl groups, n-propyl groups, isopropyl groups, 2-methylpropyl groups, 1,1-dimethylpropyl groups, 2,2-dimethylpropyl groups, 1,1-diethylpropyl groups, 1-ethyl-1-methylpropyl groups, 1, 1, 2, 2-tetramethylpropyl groups, sec-butyl groups, tert-butyl groups, 1,1-dimethylbutyl groups, 1,1,3-trimethylbutyl groups, and neopentyl groups. Examples of the alicyclic hydrocarbon groups include cyclohexyl groups, cyclohexylmethyl groups, and 1-methyl-1-cyclohexyl groups.

Examples of the halogenated hydrocarbon groups in Q include groups in which at least one hydrogen atom of the hydrocarbon group in Q is substituted with a halogen atom.

Specific examples of the neutral conjugated or non-conjugated diene having 4 to 10 carbon atoms include s-cis- or s-trans-η4-1,3-butadiene, s-cis- or s-trans-η4-1,4-diphenyl-1,3-butadiene, s-cis- or s-trans-η4-3-methyl-1,3-pentadiene, s-cis- or s-trans-η4-1,4-dibenzyl-1,3-butadiene, s-cis- or s-trans-η4-2,4-hexadiene, s-cis- or s-trans-η4-1,3-pentadiene, s-cis- or s-trans-η4-1,4-ditolyl-1,3-butadiene, and s-cis- or s-trans-η4-1,4-bis(trimethylsilyl)-1,3-butadiene.

Specific examples of the anion ligand include alkoxy groups such as methoxy, tert-butoxy, and phenoxy, carboxylate groups such as acetate and benzoate, and sulfonate groups such as mesylate and tosylate.

Specific examples of the neutral ligand capable of being coordinated with a lone pair of electrons include organic phosphorus compounds such as trimethylphosphine, triethylphosphine, triphenylphosphine, and diphenylmethylphosphine or ethers such as tetrahydrofuran, diethylether, dioxane, and 1,2-dimethoxyethane.

In the formula (I), M represents a titanium atom, a zirconium atom, or a hafnium atom, among which a hafnium atom is preferable in that a hafnium atom can copolymerize a macromonomer with high efficiency and can control to give a high molecular weight.

Particularly, in an industry process in which polymerization is performed under high pressure and high temperature conditions in order to ensure high productivity, M is preferably a hafnium atom in terms of the characteristics as described above. The reason for this is that because the abundance ratios of ethylene and α-olefin are higher than a macromonomer under high pressure conditions and molecular weight reduction generally occurs under high temperature conditions, it is important to use a catalyst having performance that copolymerizes a macromonomer with high efficiency and can control a polymer to have a high molecular weight, as described above.

Characteristics of such an M that is a hafnium atom can be considered to result from that: (1) Lewis acidity of hafnium atom is smaller and responsiveness thereof is lower than zirconium atom and titanium atom, and (2) the fact that bonding energy between hafnium and carbon atoms is greater than zirconium and titanium atoms inhibits a chain transfer reaction including a β-hydrogen elimination reaction of a polymerization active species bonded to a produced polymer chain that is one of molecular weight determinants.
(Exemplification of Preferable Crosslinking Metallocene Compounds (A))

Hereinafter, specific examples of the crosslinking metallocene compound (A) will be given by the following formulae [II] to [VI]. In addition, in the exemplified compounds, octamethyloctahydro dibenzofluorenyl represents a group derived from compounds having structures represented by formula [II]; octamethyltetrahydro dicyclopentafluorenyl represents a group derived from compounds having structures represented by formula [III]; dibenzofluorenyl represents a group derived from compounds having structures represented by formula [IV]; 1,1',3,6,8,8'-hexamethyl-2,7-dihydrodicyclopentafluorenyl represents a group derived from compounds having structures represented by formula [V]; and 1,3,3',6,6',8-hexamethyl-2,7-dihydrodicyclopentafluorenyl represents a group derived from compounds having structures represented by formula [VI].

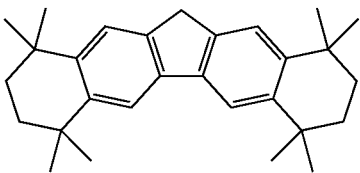

[II]

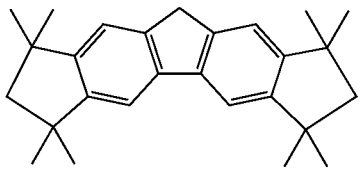

[III]

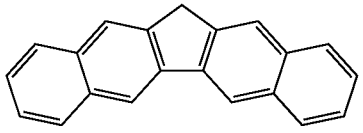

[IV]

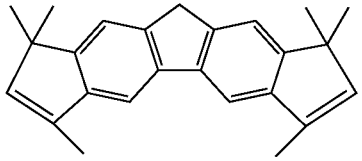

[V]

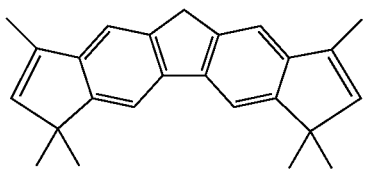

[VI]

Examples of the crosslinking metallocene compound (A) include:

diphenylmethylene(cyclopentadienyl)(2,7-ditert-butylfluorenyl)zirconium dichloride,
diphenylmethylene(cyclopentadienyl)(3,6-ditert-butylfluorenyl) zirconium dichloride,
diphenylmethylene(cyclopentadienyl)(octamethyloctahydrodibenzofluorenyl)zirconium dichloride,
diphenylmethylene(cyclopentadienyl)(octamethyltetrahydrodicyclopentafluorenyl)zirconium dichloride,
diphenylmethylene(cyclopentadienyl)(dibenzofluorenyl) zirconium dichloride,
diphenylmethylene(cyclopentadienyl)(1,1',3,6,8,8'-hexamethyl-2,7-dihydrodicyclopentafluorenyl)zirconium dichloride,
diphenylmethylene(cyclopentadienyl)(1,3,3',6,6',8-hexamethyl-2,7-dihydrodicyclopentafluorenyl)zirconium dichloride,
diphenylmethylene(cyclopentadienyl)(2,7-diphenyl-3,6-ditert-butylfluorenyl)zirconium dichloride,
diphenylmethylene(cyclopentadienyl)(2,7-dimethyl-3,6-ditert-butylfluorenyl)zirconium dichloride,
diphenylmethylene(cyclopentadienyl)(2,7-(trimethylphenyl)-3,6-ditert-butylfluorenyl)zirconium dichloride,
diphenylmethylene(cyclopentadienyl)(2,7-(dimethylphenyl)-3,6-ditert-butylfluorenyl)zirconium dichloride,
diphenylmethylene(cyclopentadienyl)(2,3,6,7-tetratert-butylfluorenyl)zirconium dichloride,
di(p-tolyl)methylene(cyclopentadienyl)(2,7-ditert-butyl fluorenyl)zirconium dichloride,
di(p-tolyl)methylene(cyclopentadienyl)(3,6-ditert-butylfluorenyl)zirconium dichloride,
di(p-tolyl)methylene(cyclopentadienyl)(octamethyloctahydrodibenzofluorenyl)zirconium dichloride,
di(p-tolyl)methylene(cyclopentadienyl)(octamethyltetrahydrodicyclopentafluorenyl)zirconium dichloride,
di(p-tolyl)methylene(cyclopentadienyl)(dibenzofluorenyl)zirconium dichloride,
di(p-tolyl)methylene(cyclopentadienyl)(1,1',3,6,8,8'-hexamethyl-2,7-dihydrodicyclopentafluorenyl)zirconium dichloride,
di(p-tolyl)methylene(cyclopentadienyl)(1,3,3',6,6',8-hexamethyl-2,7-dihydrodicyclopentafluorenyl)zirconium dichloride,
di(p-tolyl)methylene(cyclopentadienyl)(2,7-diphenyl-3,6-ditert-butylfluorenyl)zirconium dichloride,
di(p-tolyl)methylene(cyclopentadienyl)(2,7-dimethyl-3,6-ditert-butylfluorenyl)zirconium dichloride,
di(p-tolyl)methylene(cyclopentadienyl)(2,7-(trimethylphenyl-3,6-ditert-butylfluorenyl)zirconium dichloride,
di(p-tolyl)methylene(cyclopentadienyl)(2,7-(dimethylphenyl)-3,6-ditert-butylfluorenyl)zirconium dichloride,
di(p-tolyl)methylene(cyclopentadienyl)(2,3,6,7-tetramethylfluorenyl)zirconium dichloride,
di(p-tolyl)methylene(cyclopentadienyl)(2,3,6,7-tetratert-butylfluorenyl)zirconium dichloride,
di(p-chlorophenyl)methylene(cyclopentadienyl)(2,7-ditert-butylfluorenyl)zirconium dichloride,
di(p-chlorophenyl)methylene(cyclopentadienyl)(3,6-ditert-butylfluorenyl)zirconium dichloride,
di(p-chlorophenyl)methylene(cyclopentadienyl)(octamethyloctahydrodibenzofluorenyl)zirconium dichloride,
di(p-chlorophenyl)methylene(cyclopentadienyl)(octamethyltetrahydrodicyclopentafluorenyl)zirconium dichloride,
di(p-chlorophenyl)methylene(cyclopentadienyl)(dibenzofluorenyl)zirconium dichloride,
di(p-chlorophenyl)methylene(cyclopentadienyl)(1,1',3,6,8,8'-hexamethyl-2,7-dihydrodicyclopentafluorenyl)zirconium dichloride,
di(p-chlorophenyl)methylene(cyclopentadienyl)(1,3,3',6,6',8'-hexamethyl-2,7-dihydrodicyclopentafluorenyl)zirconium dichloride,
di(p-chlorophenyl)methylene(cyclopentadienyl)(2,7-diphenyl-3,6-ditert-butylfluorenyl)zirconium dichloride,
di(p-chlorophenyl)methylene(cyclopentadienyl)(2,7-dimethyl-3,6-ditert-butylfluorenyl)zirconium dichloride,
di(p-chlorophenyl)methylene(cyclopentadienyl)(2,7-(trimethylphenyl)-3,6-ditert-butylfluorenyl)zirconium dichloride,
di(p-chlorophenyl)methylene(cyclopentadienyl)(2,7-(dimethylphenyl)-3,6-ditert-butylfluorenyl)zirconium dichloride, di(p-chlorophenyl)methylene(cyclopentadienyl)(2,3,6,7-tetratert-butylfluorenyl)zirconium dichloride,
di(m-chlorophenyl)methylene(cyclopentadienyl)(2,7-ditert-butylfluorenyl)zirconium dichloride,
di(m-chlorophenyl)methylene(cyclopentadienyl)(3,6-ditert-butylfluorenyl)zirconium dichloride,
di(m-chlorophenyl)methylene(cyclopentadienyl)(octamethyloctahydrodibenzofluorenyl)zirconium dichloride,
di(m-chlorophenyl)methylene(cyclopentadienyl)(octamethyltetrahydrodicyclopentafluorenyl)zirconium dichloride,
di(m-chlorophenyl)methylene(cyclopentadienyl)(dibenzofluorenyl)zirconium dichloride,
di(m-chlorophenyl)methylene(cyclopentadienyl)(1,1',3,6,8,8'-hexamethyl-2,7-dihydrodicyclopentafluorenyl)zirconium dichloride,
di(m-chlorophenyl)methylene(cyclopentadienyl)(1,3,3',6,6'8-hexamethyl-2,7-dihydrodicyclopentafluorenyl)zirconium dichloride,
di(m-chlorophenyl)methylene(cyclopentadienyl)(2,7-diphenyl-3,6-ditert-butylfluorenyl)zirconium dichloride,
di(m-chlorophenyl)methylene(cyclopentadienyl)(2,7-dimethyl-3,6-ditert-butylfluorenyl)zirconium dichloride,
di(m-chlorophenyl)methylene(cyclopentadienyl)(2,7-(trimethylphenyl)-3,6-ditert-butylfluorenyl)zirconium dichloride,
di(m-chlorophenyl)methylene(cyclopentadienyl)(2,7-(dimethylphenyl)-3,6-ditert-butylfluorenyl)zirconium dichloride,
di(m-chlorophenyl)methylene(cyclopentadienyl)(2,3,6,7-tetratert-butylfluorenyl)zirconium dichloride,
di(p-bromophenyl)methylene(cyclopentadienyl)(2,7-ditert-butylfluorenyl)zirconium dichloride,
di(p-bromophenyl)methylene(cyclopentadienyl)(3,6-ditert-butyl fluorenyl)zirconium dichloride,
di(p-bromophenyl)methylene(cyclopentadienyl)(octamethyloctahydrodibenzofluorenyl)zirconium dichloride,
di(p-bromophenyl)methylene(cyclopentadienyl)(octamethyltetrahydrodicyclopentafluorenyl)zirconium dichloride,
di(p-bromophenyl)methylene(cyclopentadienyl)(dibenzofluorenyl) zirconium dichloride,
di(p-bromophenyl)methylene(cyclopentadienyl)(1,1',3,6,8,8'-hexamethyl-2,7-dihydrodicyclopentafluorenyl)zirconium dichloride,
di(p-bromophenyl)methylene(cyclopentadienyl)(1,3,3',6,6',8-hexamethyl-2,7-dihydrodicyclopentafluorenyl)zirconium dichloride,
di(p-bromophenyl)methylene(cyclopentadienyl)(2,7-diphenyl-3,6-ditert-butylfluorenyl)zirconium dichloride,
di(p-bromophenyl)methylene(cyclopentadienyl)(2,7-dimethyl-3,6-ditert-butylfluorenyl)zirconium dichloride,
di(p-bromophenyl)methylene(cyclopentadienyl)(2,7-(trimethylphenyl)-3,6-ditert-butylfluorenyl)zirconium dichloride,
di(p-bromophenyl)methylene(cyclopentadienyl)(2,7-(dimethylphenyl)-3,6-ditert-butylfluorenyl)zirconium dichloride, and
di(p-bromophenyl)methylene(cyclopentadienyl)(2,3,6,7-tetratert-butylfluorenyl)zirconium dichloride,
di(m-trifluoromethyl-phenyl)methylene(cyclopentadienyl)(2,7-ditert-butylfluorenyl)zirconium dichloride, di(m-trifluoromethyl-phenyl)methylene(cyclopentadienyl)(3,6-ditert-butylfluorenyl)zirconium dichloride, di(m-trifluoromethyl-phenyl)methylene(cyclopentadienyl)(octamethyl octahydrodibenzofluorenyl)zirconium dichloride, di(m-trifluoromethyl-phenyl)methylene(cyclopentadienyl)(octamethyl tetrahydrodicyclopentafluorenyl)zirconium dichloride, di(m-trifluoromethyl-phenyl)methylene(cyclopentadienyl)(dibenzofluorenyl)zirconium dichloride,
di(m-trifluoromethyl-phenyl)methylene(cyclopentadienyl)(1,1',3,6,8,8'-hexamethyl-2,7-dihydrodicyclopentafluorenyl)zirconium dichloride,
di(m-trifluoromethyl-phenyl)methylene(cyclopentadienyl)(1,3,3'6,6',8-hexamethyl-2,7-dihydrodicyclopentafluorenyl)zirconium dichloride,
di(m-trifluoromethyl-phenyl)methylene(cyclopentadienyl)(2,7-diphenyl-3,6-ditert-butylfluorenyl)zirconium dichloride,
di(m-trifluoromethyl-phenyl)methylene(cyclopentadienyl)(2,7-dimethyl-3,6-ditert-butylfluorenyl)zirconium dichloride,
di(m-trifluoromethyl-phenyl)methylene(cyclopentadienyl)(2,7-(trimethylphenyl)-3,6-ditert-butylfluorenyl)zirconium dichloride,
di(m-trifluoromethyl-phenyl)methylene(cyclopentadienyl)(2,7-(dimethylphenyl)-3,6-ditert-butylfluorenyl)zirconium dichloride,
di(m-trifluoromethyl-phenyl)methylene(cyclopentadienyl)(2,3,6,7-tetratert-butylfluorenyl)zirconium dichloride,
di(p-trifluoromethyl-phenyl)methylene(cyclopentadienyl)(2,7-ditert-butylfluorenyl)zirconium dichloride,
di(p-trifluoromethyl-phenyl)methylene(cyclopentadienyl)(3,6-ditert-butylfluorenyl)zirconium dichloride,
di(p-trifluoromethyl-phenyl)methylene(cyclopentadienyl)(octamethyloctahydrodibenzofluorenyl)zirconium dichloride,
di(p-trifluoromethyl-phenyl)methylene(cyclopentadienyl)(octamethyltetrahydrodicyclopentafluorenyl)zirconium dichloride,
di(p-trifluoromethyl-phenyl)methylene(cyclopentadienyl)(dibenzofluorenyl)zirconium dichloride,
di(p-trifluoromethyl-phenyl)methylene(cyclopentadienyl)(1,1',3,6,8,8'-hexamethyl-2,7-dihydrodicyclopentafluorenyl)zirconium dichloride,
di(p-trifluoromethyl-phenyl)methylene(cyclopentadienyl)(1,3,3',6,6',8-hexamethyl-2,7-dihydrodicyclopentadienyl)zirconium dichloride,
di(p-trifluoromethyl-phenyl)methylene(cyclopentadienyl)(2,7-diphenyl-3,6-ditert-butylfluorenyl)zirconium dichloride,
di(p-trifluoromethyl-phenyl)methylene(cyclopentadienyl)(2,7-dimethyl-3,6-ditert-butylfluorenyl)zirconium dichloride,
di(p-trifluoromethyl-phenyl)methylene(cyclopentadienyl)(2,7-trimethylphenyl)-3,6-ditert-butylfluorenyl)zirconium dichloride,
di(p-trifluoromethyl-phenyl)methylene(cyclopentadienyl)(2,7-(dimethylphenyl)-3,6-ditert-butylfluorenyl)zirconium dichloride,
di(p-trifluoromethyl-phenyl)methylene(cyclopentadienyl)(2,3,6,7-tetratert-butylfluorenyl)zirconium dichloride,
di(p-tert-butyl-phenyl)methylene(cyclopentadienyl)(2,7-ditert-butylfluorenyl)zirconium dichloride,
di(p-tert-butyl-phenyl)methylene(cyclopentadienyl)(3,6-ditert-butylfluorenyl)zirconium dichloride,
di(p-tert-butyl-phenyl)methylene(cyclopentadienyl)(octamethyl octahydrodibenzofluorenyl)zirconium dichloride,
di(p-tert-butyl-phenyl)methylene(cyclopentadienyl)(octamethyl tetrahydrodicyclopentafluorenyl)zirconium dichloride,
di(p-tert-butyl-phenyl)methylene(cyclopentadienyl)(dibenzofluorenyl)zirconium dichloride, di(p-tert-butyl-phenyl)methylene(cyclopentadienyl)(1,1',3,6,8,8'-hexamethyl-2,7-dihydrodicyclopentafluorenyl)zirconium dichloride,
di(p-tert-butyl-phenyl)methylene(cyclopentadienyl)(1,3,3',6,6'8-hexamethyl-2,7-dihydrodicyclopentafluorenyl)zirconium dichloride,
di(p-tert-butyl-phenyl)methylene(cyclopentadienyl)(2,7-diphenyl-3,6-ditert-butylfluorenyl)zirconium dichloride,
di(p-tert-butyl-phenyl)methylene(cyclopentadienyl)(2,7-dimethyl-3,6-ditert-butylfluorenyl)zirconium dichloride,
di(p-tert-butyl-phenyl)methylene(cyclopentadienyl)(2,7-(trimethylphenyl)-3,6-ditert-butylfluorenyl)zirconium dichloride,
di(p-tert-butyl-phenyl)methylene(cyclopentadienyl)(2,7-(dimethylphenyl)-3,6-ditert-butylfluorenyl)zirconium dichloride,
di(p-tert-butyl-phenyl)methylene(cyclopentadienyl)(2,3,6,7-tetratert-butylfluorenyl)zirconium dichloride,
di(p-n-butyl-phenyl)methylene(cyclopentadienyl)(2,7-ditert-butylfluorenyl)zirconium dichloride,
di(p-n-butyl-phenyl)methylene(cyclopentadienyl)(3,6-ditert-butylfluorenyl)zirconium dichloride,
di(p-n-butyl-phenyl)methylene(cyclopentadienyl)(octamethyloctahydrodibenzofluorenyl)zirconium dichloride,
di(p-n-butyl-phenyl)methylene(cyclopentadienyl)(octamethyltetrahydrodicyclopentafluorenyl)zirconium dichloride,
di(p-n-butyl-phenyl)methylene(cyclopentadienyl)(dibenzofluorenyl)zirconium dichloride,
di(p-n-butyl-phenyl)methylene(cyclopentadienyl)(1,1',3,6,8,8'-hexamethyl-2,7-dihydrodicyclopentafluorenyl)zirconium dichloride,
di(p-n-butyl-phenyl)methylene(cyclopentadienyl)(1,3,3',6,6',8-hexamethyl-2,7-dihydrocyclopentafluorenyl)zirconium dichloride,
di(p-n-butyl-phenyl)methylene(cyclopentadienyl)(2,7-diphenyl-3,6-ditert-butylfluorenyl)zirconium dichloride,
di(p-n-butyl-phenyl)methylene(cyclopentadienyl)(2,7-dimethyl-3,6-ditert-butylfluorenyl)zirconium dichloride,
di(p-n-butyl-phenyl)methylene(cyclopentadienyl)(2,7-(trimethylphenyl)-3,6-ditert-butylfluorenyl)zirconium dichloride,
di(p-n-butyl-phenyl)methylene(cyclopentadienyl)(2,7-(dimethyl phenyl)-3,6-ditert-butylfluorenyl)zirconium dichloride,
di(p-n-butyl-phenyl)methylene(cyclopentadienyl)(2,3,6,7-tetra tert-butylfluorenyl)zirconium dichloride,
di(p-biphenyl)methylene(cyclopentadienyl)(2,7-ditert-butylfluorenyl)zirconium dichloride,
di(p-biphenyl)methylene(cyclopentadienyl)(3,6-ditert-butylfluorenyl)zirconium dichloride,
di(p-biphenyl)methylene(cyclopentadienyl)(octamethyloctahydrodibenzofluorenyl)zirconium dichloride,
di(p-biphenyl)methylene(cyclopentadienyl)(octamethyltetrahydrocyclopentafluorenyl)zirconium dichloride,
di(p-biphenyl)methylene(cyclopentadienyl)(dibenzofluorenyl)zirconium dichloride,
di(p-biphenyl)methylene(cyclopentadienyl)(1,1',3,6,8,8'-hexamethyl-2,7-dihydrodicyclopentafluorenyl)zirconium dichloride,
di(p-biphenyl)methylene(cyclopentadienyl)(1,3,3',6,6',8-hexamethyl-2,7-dihydrodicyclopentafluorenyl)zirconium dichloride,
di(p-biphenyl)methylene(cyclopentadienyl)(2,7-diphenyl-3,6-di tert-butylfluorenyl)zirconium dichloride,
di(p-biphenyl)methylene(cyclopentadienyl)(2,7-dimethyl-3,6-di tert-butylfluorenyl)zirconium dichloride,
di(p-biphenyl)methylene(cyclopentadienyl)(2,7-(trimethylphenyl)-3,6-ditert-butylfluorenyl)zirconium dichloride,
di(p-biphenyl)methylene(cyclopentadienyl)(2,7-(dimethylphenyl)-3,6-ditert-butylfluorenyl)zirconium dichloride,
di(p-biphenyl)methylene(cyclopentadienyl)(2,3,6,7-tetra-tert-butylfluorenyl)zirconium dichloride,
di(1-naphthyl)methylene(cyclopentadienyl)(2,7-ditert-butylfluorenyl)zirconium dichloride,
di(1-naphthyl)methylene(cyclopentadienyl)(3,6-ditert-butylfluorenyl)zirconium dichloride,
di(1-naphthyl)methylene(cyclopentadienyl)(octamethyloctahydro dibenzofluorenyl)zirconium dichloride,
di(1-naphthyl)methylene(cyclopentadienyl)(octamethyltetrahydrodicyclopentafluorenyl)zirconium dichloride,
di(1-naphthyl)methylene(cyclopentadienyl)(dibenzofluorenyl)zirconium dichloride,
di(1-naphthyl)methylene(cyclopentadienyl)(1,1',3,6,8,8'-hexamethyl-2,7-dihydrodicyclopentafluorenyl)zirconium dichloride,
di(1-naphthyl)methylene(cyclopentadienyl)(1,3,3'6,6',8-hexamethyl-2,7-dihydrodicyclopentafluorenyl)zirconium dichloride,
di(1-naphthyl)methylene(cyclopentadienyl)(2,7-diphenyl-3,6-di tert-butylfluorenyl)zirconium dichloride,
di(1-naphthyl)methylene(cyclopentadienyl)(2,7-dimethyl-3,6-di tert-butylfluorenyl)zirconium dichloride,
di(1-naphthyl)methylene(cyclopentadienyl)(2,7-(trimethylphenyl)-3,6-ditert-butylfluorenyl)zirconium dichloride,
di(1-naphthyl)methylene(cyclopentadienyl)(2,7-(dimethylphenyl)-3,6-ditert-butylfluorenyl)zirconium dichloride,
di(1-naphthyl)methylene(cyclopentadienyl)(2,3,6,7-tetratert-butylfluorenyl)zirconium dichloride,
di(2-naphthyl)methylene(cyclopentadienyl)(2,7-ditert-butylfluorenyl)zirconium dichloride,
di(2-naphthyl)methylene(cyclopentadienyl)(3,6-ditert-butylfluorenyl)zirconium dichloride,
di(2-naphthyl)methylene(cyclopentadienyl)(octamethyloctahydro dibenzofluorenyl)zirconium dichloride,
di(2-naphthyl)methylene(cyclopentadienyl)(octamethyltetrahydrodicyclopentafluorenyl)zirconium dichloride,
di(2-naphthyl)methylene(cyclopentadienyl)(dibenzofluorenyl)zirconium dichloride,
di(2-naphthyl)methylene(cyclopentadienyl)(1,1',3,6,8,8'-hexamethyl-2,7-dihydrodicyclopentafluorenyl)zirconium dichloride,
di(2-naphthyl)methylene(cyclopentadienyl)(1,3,3',6,6',8-hexamethyl-2,7-dihydrodicyclopentafluorenyl)zirconium dichloride,
di(2-naphthyl)methylene(cyclopentadienyl)(2,7-diphenyl-3,6-di tert-butylfluorenyl)zirconium dichloride,
di(2-naphthyl)methylene(cyclopentadienyl)(2,7-dimethyl-3,6-di tert-butylfluorenyl)zirconium dichloride,
di(2-naphthyl)methylene(cyclopentadienyl)(2,7-(trimethylphenyl)-3,6-ditert-butylfluorenyl)zirconium dichloride,
di(2-naphthyl)methylene(cyclopentadienyl)(2,7-(dimethylphenyl)-3,6-ditert-butylfluorenyl)zirconium dichloride,
di(2-naphthyl)methylene(cyclopentadienyl)(2,3,6,7-tetra-tert-butylfluorenyl)zirconium dichloride,
di(m-tolyl)methylene(cyclopentadienyl)(2,7-ditert-butyl fluorenyl)zirconium dichloride,
di(m-tolyl)methylene(cyclopentadienyl)(2,7-dimethylfluorenyl) zirconium dichloride,
di(m-tolyl)methylene(cyclopentadienyl)(3,6-ditert-butyl-fluorenyl)zirconium dichloride,
di(p-isopropylphenyl)methylene(cyclopentadienyl)(octamethyloctahydrodibenzofluorenyl)zirconium dichloride, di(p-isopropylphenyl)methylene(cyclopentadienyl)(2,7-ditert-butylfluorenyl)zirconium dichloride,
di(p-isopropylphenyl)methylene(cyclopentadienyl)(3,6-ditert-butylfluorenyl)zirconium dichloride,
diphenylsilylene(cyclopentadienyl)(2,7-ditert-butylfluorenyl)zirconium dichloride,
diphenylsilylene(cyclopentadienyl)(3,6-ditert-butylfluorenyl) zirconium dichloride,
diphenylsilylene(cyclopentadienyl)(octamethyloctahydrodibenzofluorenyl)zirconium dichloride,
diphenylsilylene(cyclopentadienyl)(octamethyltetrahydrodicyclopentafluorenyl)zirconium dichloride,
diphenylsilylene(cyclopentadienyl)(dibenzofluorenyl)zirconium dichloride,
diphenylsilylene(cyclopentadienyl)(1,1',3,6,8,8'-hexamethyl-2,7-dihydrodicyclopentafluorenyl)zirconium dichloride,
diphenylsilylene(cyclopentadienyl)(1,3,3',6,6',8-hexamethyl-2,7-dihydrodicyclopentafluorenyl)zirconium dichloride,
diphenylsilylene(cyclopentadienyl)(2,7-diphenyl-3,6-ditert-butylfluorenyl)zirconium dichloride,
diphenylsilylene(cyclopentadienyl)(2,7-dimethyl-3,6-ditert-butylfluorenyl)zirconium dichloride,
diphenylsilylene(cyclopentadienyl)(2,7-(trimethylphenyl)-3,6-ditert-butylfluorenyl)zirconium dichloride,
diphenylsilylene(cyclopentadienyl)(2,7-(dimethylphenyl)-3,6-ditert-butylfluorenyl) zirconium dichloride, and
diphenylsilylene(cyclopentadienyl)(2,3,6,7-tetratert-butylfluorenyl)zirconium dichloride.

As the crosslinking metallocene compound (A), there may be also mentioned compounds in which "zirconium" in the exemplified compounds is replaced by "hafnium" or "titanium", compounds in which "dichloride" therein is replaced by "difluoride" "dibromide", "diiodide", "dimethyl", "methylethyl", "dibenzyl" or the like, and compounds in which "cyclopentadienyl" therein is replaced by "3-tert-butyl-5-methyl-cyclopentadienyl", "3,5-dimethyl-cyclopentadienyl", "3-tert-butyl-cyclopentadienyl", "3-methyl-cyclopentadienyl" or the like.

The metallocene compounds mentioned above can be produced by known methods, and the production method therefor is not particularly limited. Examples of the known methods include methods described in WO01/27124 and WO04/029062.

The crosslinking metallocene compounds (A) as mentioned above are used singularly or in combination of two or more thereof.

[Transition Metal Compound (B)]

The transition metal compound (B) that is used in the present invention is a specific compound having structures represented by the following general formula [B] and serves as an olefin polymerization catalyst in the presence of the compound (C) that will be described later.

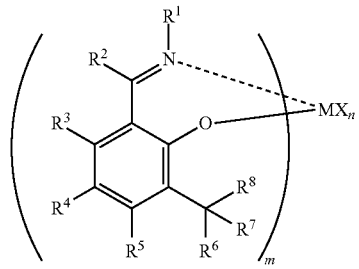

[B]

(In the general formula [B], M represents a transition metal atom of group IV or V in the periodic table;

m represents an integer of from 1 to 4;

$R^1$ represents a hydrocarbon group having 1 to 8 carbon atoms represented by general formula $C_{n'}H_{2n'+1}$ (n' is an integer of from 1 to 8);

$R^2$ to $R^5$ may be the same as or different from each other, and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or tin-containing group, in which two or more of these groups may bond to each other to form a ring;

$R^6$ to $R^8$ are hydrocarbon groups, at least one of which is an aromatic hydrocarbon group, and when m is 2 or larger, two of the groups represented by $R^2$ to $R^8$ between structural units of formula [B] may be bonded to each other;

n is a value satisfying a valence of M, and X represents a hydrogen atom, a halogen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group, or a tin-containing group, in which when n is an integer of 2 or larger, a plurality of Xs may be the same as or different from each other, and the plurality of groups represented by X may bond to each other to form a ring).

The olefin polymerization catalyst including the transition metal compound (B) plays a role of producing a vinyl-terminated macromonomer that is an ethylene polymer to produce a moiety forming the side chains of the olefin-based polymer [R1].

In other words, the olefin polymerization catalyst including the transition metal compound (B) has characteristics that mainly polymerize ethylene and produce an ethylene polymer that becomes a one-terminal vinyl group with high selectivity. Furthermore, the olefin polymerization catalyst including the transition metal compound (B) has characteristics that produce an ethylene polymer having a relatively low molecular weight (a weight average molecular weight in a range of from 200 to 10000). Since the olefin polymerization catalyst including the transition metal compound (B) has the characteristics described above, side chains are efficiently introduced in the olefin-based polymer [R1], so that the propylene-based resin composition of the present invention has high surface hardness and has an excellent balance between impact resistance and rigidity.

Additionally, the olefin polymerization catalyst including the transition metal compound (B) has the characteristics that polymerize ethylene with high selectivity even under conditions in which ethylene coexists with α-olefin and a vinyl-terminated macromonomer. The characteristics allows the side chains of the olefin-based polymer [R1] to favorably maintain mechanical properties and thermal properties as the ethylene polymer, so that the propylene-based resin composition of the invention has high surface hardness and an excellent balance between impact resistance and rigidity. In addition, the above characteristics are also preferable in terms of employing a polymerization method [b] of the production method that will be described later.

In addition, the olefin polymerization catalyst including the transition metal compound (B) preferably has performance that substantially produces no olefin structure, a so-called internal olefin inside the polymer chain, from the viewpoint of light resistance, coloring resistance, and the like.

Hereinafter, characteristics of the chemical structure of the transition metal compound (B) that is used in the present invention will be described.

In general formula [B], N . . . M generally represents being in a coordinated state, although they may or may not be coordinated in the present invention.

In general formula [B], M represents a transition metal atom of group IV or V in the periodic table, and specific examples thereof include titanium, zirconium, hafnium, vanadium, niobium, and tantalum. Preferred is a metal atom of group V in the periodic table, specifically, titanium, zirconium, or hafnium, and more preferred is zirconium.

m represents an integer of from 1 to 4, preferably from 1 to 2, and particularly preferably 2.

$R^1$ represents a hydrocarbon group having 1 to 8 carbon atoms represented by a general formula $C_{n'}H_{2n'+1}$ (n' is an integer of from 1 to 8). Specific examples thereof include acyclic hydrocarbon groups such as methyl groups, ethyl groups, n-propyl groups, n-butyl groups, iso-propyl groups, iso-butyl groups, tert-butyl groups, neopentyl groups, and n-hexyl groups and cyclic hydrocarbon groups such as cyclopropyl groups, cyclobutyl groups, cyclopentyl groups, and cyclohexyl groups. Preferred are linear hydrocarbon groups, and specifically, methyl groups, ethyl groups, n-propyl groups, and n-butyl groups. Among them, methyl groups, ethyl groups, and n-propyl groups are more preferable. Still more preferred are methyl groups and ethyl groups. Selecting the above hydrocarbon groups allows production of an ethylene polymer having a relatively low molecular weight, for example, a weight average molecular weight in a range of from 200 to 10000, which facilitates obtaining of a propylene-based resin composition of the present invention having an excellent balance between physical properties, as described above.

$R^2$ to $R^5$ may be the same as or different from each other, and represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group, or a tin-containing group, in which two or more thereof may bond to each other to form a ring.

When m is 2 or larger, two of the groups represented by $R^2$ to $R^8$ between the structural units of formula [B] may be bonded to each other.

Examples of the halogen atom include fluorine, chlorine, bromine, and iodine.

Specific examples of the hydrocarbon group include linear or branched alkyl groups having 1 to 30 carbon atoms, and preferably 1 to 20 carbon atoms, such as methyl groups, ethyl groups, n-propyl groups, isopropyl groups, n-butyl groups, isobutyl groups, sec-butyl groups, t-butyl groups, neopentyl groups, and n-hexyl groups; linear or branched alkenyl groups having 2 to 30 carbon atoms, and preferably 2 to 20 carbon atoms, such as vinyl groups, allyl groups, and isopropenyl groups; linear or branched alkynyl groups having 2 to 30 carbon atoms, and preferably 2 to 20 carbon atoms, such as ethynyl groups and propargyl groups; cyclic saturated hydrocarbon groups having 3 to 30 carbon atoms, and preferably 3 to 20 carbon atoms, such as cyclopropyl groups, cyclobutyl groups, cyclopentyl groups, cyclohexyl groups, and adamantyl groups; cyclic unsaturated hydrocarbon groups having 5 to 30 carbon atoms, such as cyclopentadienyl groups, indenyl groups, and fluorenyl groups; aryl groups having 6 to 30 carbon atoms, and preferably 6 to 20 carbon atoms, such as phenyl groups, naphthyl groups, biphenyl groups, terphenyl groups, phenanthryl groups, and anthracenyl groups; and alkyl-substituted aryl groups such as tolyl groups, isopropylphenyl groups, t-butylphenyl groups, dimethylphenyl groups, and di-t-butylphenyl groups.

In the hydrocarbon groups, a hydrogen atom(s) may be substituted with halogen, and examples thereof include halogenated hydrocarbon groups having 1 to 30 carbon atoms, and preferably 1 to 20 carbon atoms, such as trifluoromethyl groups, pentafluorophenyl groups, and chlorophenyl groups. Additionally, the hydrocarbon groups may be substituted with other hydrocarbon groups, and examples thereof include alkyl groups substituted with aryl groups such as benzyl groups and cumyl groups.

Still furthermore, the above hydrocarbon groups may include a heterocyclic compound residue; an oxygen-containing group such as an alkoxy group, an aryloxy group, an ester group, an ether group, an acyl group, a carboxyl group, a carbonate group, a hydroxy group, a peroxy group, or a carboxylic acid anhydride group; a nitrogen-containing group such as an amino group, an imino group, an amide group, an imide group, a hydrazino group, a hydrazono group, a nitro group, a nitroso group, a cyano group, an isocyano group, a cyanate ester group, an amidino group, a diazo group, or an ammonium salt of an amino group; a boron-containing group such as a boranediyl group, a boranetriyl group, or a diboranyl group; a sulfur-containing group such as a mercapto group, a thioester group a dithioester group, an alkylthio group, an arylthio group, a thioacyl group, a thioether group, a thiocyanic ester group, an isothiocyanic ester group, a sulfonic ester group, a sulfonic amido group, a thiocarboxyl group, a dithiocarboxyl group, a sulfo group, a sulfonyl group, a sulfinyl group, or a sulphenyl group; a phosphorus-containing group such as a phosphide group, a phosphoryl group, a thiophosphoryl group, or a phosphate group; a silicon-containing group, a germanium-containing group; or a tin-containing group.

Among them, particularly preferred are linear and branched alkyl groups having 1 to 30 carbon atoms, and preferably 1 to 20 carbon atoms, such as methyl groups, ethyl groups, n-propyl groups, isopropyl groups, n-butyl groups, isobutyl groups, sec-butyl groups, t-butyl groups, neopentyl groups, and n-hexyl groups; aryl groups having 6 to 30 carbon atoms, and preferably 6 to 20 carbon atoms, such as phenyl groups, naphthyl groups, biphenyl groups, terphenyl groups, phenanthryl groups, and anthracenyl groups; and substituted aryl groups in which the above aryl groups are substituted with 1 to 5 substituents, such as a halogen atom, an alkyl group or an alkoxy group having 1 to 30 carbon atoms, and preferably 1 to 20 carbon atoms, and an aryl group and an aryloxy group having 6 to 30 carbon atoms, and preferably 6 to 20 carbon atoms.

Examples of the oxygen-containing group, the nitrogen-containing group, the boron-containing group, the sulfur-containing group, and the phosphorus-containing group include the same ones as those exemplified above. Examples of the heterocyclic compound residue include nitrogen-containing compounds such as pyrrole, pyridine, pyrimidine, quinoline, and triazine, oxygen-containing compounds such as furan and pyran, residues of sulfur-containing compounds such as thiophene, or the like, and groups in which these heterocyclic compound residues are additionally substituted with substituents such as alkyl groups or alkoxy groups having 1 to 30 carbon atoms, and preferably 1 to 20 carbon atoms.

Examples of the silicon-containing group include silyl groups, siloxy groups, hydrocarbon-substituted silyl groups, and hydrocarbon-substituted siloxy groups. Specific examples thereof include methylsilyl groups, dimethylsilyl groups, trimethylsilyl groups, ethylsilyl groups, diethylsilyl groups, triethylsilyl groups, diphenylmethylsilyl groups, triphenylsilyl groups, dimethylphenylsilyl groups, dimethyl-t-butylsilyl groups, and dimethyl (pentafluorenyl) silyl groups. Among them, preferred are methylsilyl groups, dimethylsilyl groups, trimethylsilyl groups, ethylsilyl groups, diethylsilyl groups, triethylsilyl groups, dimethylphenylsilyl groups, and triphenylsilyl groups. Particularly preferred are trimethylsilyl groups, triethylsilyl groups, triphenylsilyl groups, and dimethylphenylsilyl groups. Specific examples of the hydrocarbon-substituted siloxy groups include trimethylsiloxy groups.

Examples of the germanium-containing group and the tin-containing group include groups in which silicon of the silicon-containing groups is substituted with germanium and tin. Next, the examples of R2 to R6 described above will be described more specifically. Specific examples of the alkoxy group include methoxy groups, ethoxy groups, n-propoxy groups, isopropoxy groups, n-butoxy groups, isobutoxy groups, and t-butoxy groups.

Specific examples of the alkylthio group include methylthio groups and ethylthio groups. Specific examples of the aryloxy group include phenoxy groups, 2,6-dimethylphenoxy groups, and 2,4,6-trimethylphenoxy groups. Specific examples of the arylthio group include phenylthio groups, methylphenylthio groups, and naphthylthio groups.

Specific examples of the acyl group include formyl groups, acetyl groups, benzoyl groups, p-chlorobenzoyl groups, and p-methoxybenzoyl groups. Specific examples of the ester group include acetyloxy groups, benzoyloxy groups, methoxycarbonyl groups, phenoxycarbonyl groups, and p-chlorophenoxycarbonyl groups.

Specific examples of the thioester group include acetylthio groups, benzoylthio groups, methylthiocarbonyl groups, and phenylthiocarbonyl groups. Specific examples of the amide group include acetamide groups, N-methylacetamide groups, and N-methylbenzamide groups. Specific examples of the imide group include acetimide groups and benzimide groups. Specific examples of the amino group include dimethylamino groups, ethylmethylamino groups, and diphenylamino groups.

Specific examples of the imino group include methylimino groups, ethylimino groups, propylimino groups, butylimino groups, and phenylimino groups. Specific examples of the sulfonic ester group include sulfonic acid methyl groups, sulfonic acid ethyl groups, and sulfonic acid phenyl groups. Specific examples of the sulfonic amide groups include phenyl sulfonamide groups, N-methyl sulfonamide groups, and N-methyl-p-toluene sulfonamide groups.

Two or more groups of $R^2$ to $R^5$, preferably mutually adjacent groups may bond to each other to form an aliphatic ring, an aromatic ring, or a hydrocarbon ring including a heteroatom such as a nitrogen atom, and these rings may further include substituents.

n represents a value satisfying a valence of M, and specifically, is an integer of from 0 to 5, preferably from 1 to 4, and more preferably from 1 to 3. X represents a hydrogen atom, a halogen atom, a hydrocarbon group, an oxygen-containing group, a sulfur-containing group, a nitrogen-containing group, a boron-containing group, an aluminum-containing group, a phosphorous-containing group, a halogen-containing group, a heterocyclic compound residue, a silicon-containing group, a germanium-containing group, or a tin-containing group. In addition, when n is 2 or larger, Xs may be the same as or different from each other.

Examples of the halogen atom include fluorine, chlorine, bromine, and iodine. Examples of the hydrocarbon group include the same ones as those exemplified in $R^2$ to $R^5$ described above. Specific examples thereof include alkyl groups such as methyl groups, ethyl groups, propyl groups, butyl groups, hexyl groups, octyl groups, nonyl groups, dodecyl groups, and eicosyl groups; cycloalkyl groups having 3 to 30 carbon atoms, such as cyclopentyl groups, cyclohexyl groups, norbornyl groups, and adamantyl groups; alkenyl groups such as vinyl groups, propenyl groups, and cyclohexenyl groups; arylalkyl groups such as benzyl groups, phenylethyl groups, and phenylpropyl groups; and aryl groups such as phenyl groups, tolyl groups, dimethylphenyl groups, trimethylphenyl groups, ethylphenyl groups, propylphenyl groups, biphenyl groups, naphthyl groups, methylnaphthyl groups, anthryl groups, and phenanthryl groups, although not limited thereto. In addition, these hydrocarbon groups include halogenated hydrocarbon groups, specifically, groups in which at least one hydrogen atom of hydrocarbon groups having 1 to 20 carbon atoms is substituted with halogen.

Among them, the groups having 1 to 20 carbon atoms are preferable. Examples of the heterocyclic compound residue include the same ones as those exemplified in the section of $R^2$ to $R^5$. Examples of the oxygen-containing group include the same ones as those exemplified in the section of $R^2$ to $R^5$, and specific examples thereof include hydroxy groups; alkoxy groups such as methoxy groups, ethoxy groups, propoxy groups, and butoxy groups; aryloxy groups such as phenoxy groups, methylphenoxy groups, dimethylphenoxy groups, and naphthoxy groups; arylalkoxy groups such as phenylmethoxy groups and phenylethoxy groups; acetoxy groups; and carbonyl groups, although not limited thereto.

Examples of the sulfur-containing group include the same ones as those exemplified in the section of $R^2$ to $R^5$, and specific examples thereof include sulfonate groups such as methyl sulfonate groups, trifluoromethane sulfonate groups, phenyl sulfonate groups, benzyl sulfonate groups, p-toluene sulfonate groups, trimethylbenzene sulfonate groups, triisobutyl benzene sulfonate groups, p-chlorobenzene sulfonate groups, and pentafluorobenzene sulfonate groups; sulfinate groups such as methyl sulfinate groups, phenyl sulfinate groups, benzyl sulfinate groups, p-toluene sulfinate groups, trimethyl benzene sulfinate groups, and pentafluorobenzene sulfinate groups; alkylthio groups; and arylthio groups, although not limited thereto.

Specific examples of the nitrogen-containing group include the same ones as those exemplified in the section of $R^2$ to $R^5$. Specific examples thereof include amino groups; alkylamino groups such as methyl amino groups, dimethyl amino groups, diethyl amino groups, dipropyl amino groups, dibutyl amino groups, and dicyclohexyl amino groups; and aryl amino groups or alkylaryl amino groups, such as phenyl amino groups, diphenyl amino groups, ditolyl amino groups, dinaphthyl amino groups, and methyl phenyl amino groups, although not limited to thereto.

Specific examples of the boron-containing group include $BR_4$ (R represents hydrogen, an alkyl group, an aryl group that may have a substituent, a halogen atom, or the like). Specific examples of the phosphorus-containing group include trialkyl phosphine groups such as trimethyl phosphine groups, tributyl phosphine groups, and tricyclohexyl phosphine groups; triaryl phosphine groups such as triphenyl phosphine groups and tritolyl phosphine groups; phosphite groups (phosphide groups) such as methyl phosphite groups, ethyl phosphite groups, and phenyl phosphite groups; phosphonic acid groups; and phosphinic acid groups, although not limited thereto.

Specific examples of the silicon-containing groups include the same ones as those exemplified in the section of $R^2$ to $R^5$. Specific examples thereof include hydrocarbon-substituted silyl groups such as phenyl silyl groups, diphenyl silyl groups, trimethyl silyl groups, triethyl silyl groups, tripropyl silyl groups, tricyclohexyl silyl groups, triphenyl silyl groups, methyl diphenyl silyl groups, tritolyl silyl groups, and trinaphthyl silyl groups; hydrocarbon-substituted silyl ether groups such as trimethyl silyl ether groups; silicon-substituted alkyl groups such as trimethyl silyl methyl groups; and silicon-substituted aryl groups such as trimethyl silyl phenyl groups.

Specific examples of the germanium-containing group include the same ones as those exemplified in the section of $R^2$ to $R^5$. Specific examples thereof include groups in which silicon of the silicon-containing groups is substituted with germanium. Specific examples of the tin-containing group include the same ones as those exemplified in the section of $R^2$ to $R^5$. More specific examples thereof include groups in which silicon of the silicon-containing groups is substituted with tin.

Specific examples of the halogen-containing group include fluorine-containing groups such as $PF_6$ and $BF_4$, chlorine-containing groups such as $ClO_4$ and $SbC_{16}$, and iodine-containing groups such as $IO_4$, although not limited thereto. Specific examples of the aluminum-containing group include $AlR_4$ (R represents hydrogen, an alkyl group, an aryl group that may have a substituent, a halogen atom, or the like), although not limited thereto.

$R^6$ to $R^8$ are hydrocarbon groups, at least one of which is an aromatic hydrocarbon group.

Specific examples of the above hydrocarbon groups include linear or branched alkyl groups having 1 to 30 carbon atoms, and preferably 1 to 20 carbon atoms, such as methyl groups, ethyl groups, n-propyl groups, isopropyl groups, n-butyl groups, isobutyl groups, sec-butyl groups, t-butyl groups, neopentyl groups, and n-hexyl groups; linear or branched alkenyl groups having 2 to 30 carbon atoms, and preferably 2 to 20 carbon atoms, such as vinyl groups, allyl groups, and isopropenyl groups; linear or branched alkynyl groups having 2 to 30 carbon atoms, and preferably 2 to 20 carbon atoms, such as ethynyl groups and propargyl groups; cyclic saturated hydrocarbon groups having 3 to 30 carbon atoms, and preferably 3 to 20 carbon atoms, such as cyclopropyl groups, cyclobutyl groups, cyclopentyl groups, cyclohexyl groups, and adamantyl groups; cyclic unsaturated hydrocarbon groups having 5 to 30 carbon atoms, such as cyclopentadienyl groups, indenyl groups, and fluorenyl groups; aryl groups having 6 to 30 carbon atoms, and preferably 6 to 20 carbon atoms, such as phenyl groups, naphthyl groups, biphenyl groups, terphenyl groups, phenanthryl groups, and anthracenyl groups; and alkyl-substituted aryl groups such as tolyl groups, isopropyl phenyl groups, t-butyl phenyl groups, dimethyl phenyl groups, and di-t-butyl phenyl groups.

In the hydrocarbon groups, a hydrogen atom(s) may be substituted with halogen. Examples of such hydrocarbon groups include halogenated hydrocarbon groups having 1 to 30 carbon atoms, and preferably 1 to 20 carbon atoms, such as trifluoromethyl groups, pentafluorophenyl groups, and chlorophenyl groups. In addition, the hydrocarbon groups may be substituted with other hydrocarbon groups, and examples thereof include alkyl groups substituted with aryl groups such as benzyl groups and cumyl groups.

Specific examples of the above aromatic hydrocarbon group include aryl groups having 6 to 30 carbon atoms, and preferably 6 to 20 carbon atoms, such as phenyl groups, naphthyl groups, biphenyl groups, terphenyl groups, phenanthryl groups, and anthracenyl groups and alkyl-substituted aryl groups such as tolyl groups, isopropyl phenyl groups, t-butyl phenyl groups, dimethyl phenyl groups, and di-t-butyl phenyl groups. In the aromatic hydrocarbon groups, a hydrogen atom(s) may be substituted with halogen, or the aromatic hydrocarbon groups may be substituted with other hydrocarbon groups.

When at least one of the hydrocarbon groups of $R^6$ to $R^8$ is an aromatic hydrocarbon group, the polymerization catalyst including the transition metal compound (B) provides a favorable activity even under high temperature polymerization conditions and thus is suitable to produce the olefin-based resin (β) according to the present invention, so that the propylene-based resin composition of the invention exhibits favorable performance.

When m is 2 or larger, two of the groups represented by $R^2$ to $R^8$ between the structural units of formula [B] may be bonded to each other. Furthermore, when m is 2 or larger, $R^1$s, $R^2$s, $R^3$s, $R^4$s, $R^5$s, $R^6$s, $R^7$s, and $R^8$s, respectively, may be the same as or different from each other.

In addition, when n is an integer of 2 or larger, a plurality of groups represented by X may be the same as or different from each other, and the plurality of groups represented by X may bond to each other to form a ring.

Additionally, the transition metal compound (B) represented by general formula [B] as described above can be used singularly or in combination of two or more thereof.

[Compound (C)]

The compound [C] that is used in the present invention reacts with the compounds (A) and (B) and serves as the olefin polymerization catalyst. Specifically, the compound (C) is selected from compounds that react with (C-1) an organometallic compound, (C-2) an organoaluminum oxy compound, and (C-3) the crosslinking metallocene compound (A) or the transition metal compound (B) to form an ion pair. Hereinafter, the compounds (C-1) to (C-3) will be described in order.

((C-1) Organometallic compound)

Specific examples of the organometallic compound (C-1) that is used in the present invention include organoaluminum compounds represented by the following general formula (C-1a), complex alkylated compounds of metals of group I in the periodic table and aluminum represented by the following general formula (C-1b), and dialkylated compounds of metals of group II or XII in the periodic table represented by the following general formula (C-1c). In addition, the organometallic compound (C-1) does not include organoaluminum oxy compounds (C-2) that will be described later.

(C-1a)

In general formula (C-1a) above, $R^a$ and $R^b$ may be the same as or different from each other, and represent hydrocarbon groups having 1 to 15 carbon atoms, and preferably 1 to 4 carbon atoms; Y represents a halogen atom; and p is $0<p\leq3$, q is $0\leq q<3$, r is $0\leq r<3$, s is $0\leq s<3$, and m+n+p+q=3.

(C-1b)

In general formula (C-1b) above, $M^3$ represents Li, Na, or K, and $R^c$ represents a hydrocarbon group having 1 to 15 carbon atoms, and preferably 1 to 4 carbon atoms.

$$R^d R^e M^4 \quad \text{(C-1c)}$$

In general formula (C-1c) above, $R^d$ and $R^e$ may be the same as or different from each other, and represent hydrocarbon groups having 1 to 15 carbon atoms, and preferably 1 to 4 carbon atoms, and $M^4$ is Mg, Zn, or Cd.

Examples of the organoaluminum compounds represented by general formula (C-1a) can include organoaluminum compounds represented by the following general formulae (C-1a-1) to (C-1a-4).

$$R^a_p Al(OR^b)_{3-p} \quad \text{(C-1a-1)}$$

(In the formula, $R^a$ and $R^b$ may be the same as or different from each other, and represent hydrocarbon groups having 1 to 15 carbon atoms, and preferably 1 to 4 carbon atoms, and P is preferably $1.5 \leq p \leq 3$).

$$R^a_p Al Y_{3-p} \quad \text{(C-1a-2)}$$

(In the formula, $R^a$ represents a hydrocarbon group having 1 to 15 carbon atoms, and preferably 1 to 4 carbon atoms; Y represents a halogen atom; and P is preferably $0 < p < 3$).

$$R^a_p Al H_{3-p} \quad \text{(C-1a-3)}$$

(In the formula, $R^a$ represents a hydrocarbon group having 1 to 15 carbon atoms, and preferably 1 to 4 carbon atoms, and P is preferably $2 \leq p < 3$).

$$R^a_p Al(OR^b)_q Y_s \quad \text{(C-1a-4)}$$

(In the formula, $R^a$ and $R^b$ may be the same as or different from each other, and represent hydrocarbon groups having 1 to 15 carbon atoms, and preferably 1 to 4 carbon atoms; Y represents a halogen atom; and p is $0 < p \leq 3$, q is $0 \leq q < 3$, s is $0 \leq s < 3$, and $p+q+s=3$).

Specific examples of the organoaluminum compounds belonging to general formula (C-1a) include tri-n-alkyl aluminiums such as trimethyl aluminum, triethyl aluminum, tri-n-butyl aluminum, tripropyl aluminum, tripentyl aluminum, trihexyl aluminum, trioctyl aluminum, and tridecyl aluminum; tri-branched alkyl aluminiums such as tri-isopropyl aluminum, tri-isobutyl aluminum, tri-sec-butyl aluminum, tri-tert-butyl aluminum, tri-2-methylbutyl aluminum, tri-3-methylbutyl aluminum, tri-2-methylpentyl aluminum, tri-3-methylpentyl aluminum, tri-4-methylpentyl aluminium, tri-2-methylhexyl aluminum, tri-3-methylhexyl aluminum, and tri-2-ethylhexyl aluminium; tri-cycloalkyl aluminiums such as tri-cyclohexyl aluminum and tri-cyclooctyl aluminum; triaryl aluminiums such as triphenyl aluminum and tritolyl aluminium: dialkyl aluminum hydrides such as di-isobutyl aluminum hydride; trialkenyl aluminiums such as tri-isoprenyl aluminum represented by $(i\text{-}C_4H_9)_x Al_y (C_5H_{10})_z$ (in the formula, x, y, and Z are positive values, and $z \geq 2x$); alkyl aluminum alkoxides such as isobutyl aluminum methoxide, isobutyl aluminium ethoxide, and isobutyl aluminum isopropoxide; dialkyl aluminum alkoxides such as dimethyl aluminum methoxide, diethyl aluminum ethoxide, and dibutyl aluminum butoxide; alkyl aluminum sesquialkoxides such as ethyl aluminum sesquiethoxide and butyl aluminum sesquibutoxide; partially alkoxylated alkyl aluminiums having an average composition presented by $R^a_{2.5} Al(OR^b)_{0.5}$ (in the formula, $R^a$ and $R^b$ may be the same as or different from each other, and represent hydrocarbon groups having 1 to 15 carbon atoms, and preferably 1 to 4 carbon atoms); dialkyl aluminum aryloxides such as diethyl aluminum phenoxide, diethyl aluminum(2,6-di-t-butyl-4-methylphenoxide), ethyl aluminum bis(2,6-di-t-butyl-4-methylphenoxide), diisobutyl aluminum(2,6-di-t-butyl-4-methylphenoxide), and isobutyl aluminum bis(2,6-di-t-butyl-4-methylphenoxide); dialkyl aluminum halides such as dimethyl aluminum chloride, diethyl aluminum chloride, dibutyl aluminum chloride, diethyl aluminum bromide, and diisobutyl aluminum chloride; alkyl aluminum sesquihalides such as ethyl aluminum sesquichloride, butyl aluminum sesquichloride, and ethyl aluminum sesquibromide; partially halogenated alkyl aluminiums such as alkyl aluminum dihalides such as ethyl aluminum dichloride, propyl aluminum dichloride, and butyl aluminium dibromide; dialkyl aluminum hydrides such as diethyl aluminum hydride and dibutyl aluminum hydride; partially hydrogenated alkyl aluminiums such as alkyl aluminum dihydrides such as ethyl aluminum dihydride and propyl aluminum dihydride; and partially alkoxylated and halogenated alkyl aluminiums such as ethyl aluminum ethoxychloride, butyl aluminum butoxychloride, and ethyl aluminum ethoxybromide.

In addition, compounds similar to the (C-1a) can be also used in the present invention, and examples of such compounds include organoaluminum compounds in which two or more aluminum compounds are bonded via a nitrogen atom. Specific examples of such compounds include $(C_2H_5)_2 AlN(C_2H_5)Al(C_2H_5)_2$.

Examples of compounds belonging to general formula (C-1b) above include $LiAl(C_2H_5)_4$ and $LiAl(C_7H_{15})_4$.

Examples of compounds belonging to general formula (C-1c) above include dimethyl magnesium, diethyl magnesium, dibutyl magnesium, butyl ethyl magnesium, dimethyl zinc, diethyl zinc, diphenyl zinc, di-n-propyl zinc, di-isopropyl zinc, di-n-butyl zinc, di-isobutyl zinc, bis(pentafluorophenyl) zinc, dimethyl cadmium, and diethyl cadmium.

In addition, besides them, examples of the organometallic compounds (C-1) that can be used include methyl lithium, ethyl lithium, propyl lithium, butyl lithium, methyl magnesium bromide, methyl magnesium chloride, ethyl magnesium bromide, ethyl magnesium chloride, propyl magnesium bromide, propyl magnesium chloride, butyl magnesium bromide, and butyl magnesium chloride.

Additionally, as the organometallic compound (C-1), there can be also used compounds in which the above organoaluminum compounds are formed in a polymerization system, such as, for example, combinations of halogenated aluminium and alkyl lithium or combinations of halogenated aluminum and alkyl magnesium.

The organometallic compounds (C-1) as mentioned above are used singularly or in combination of two or more thereof.
((C-2) Organoaluminum Oxy Compound)

The organoaluminum oxy compound (C-2) that is used in the present invention may be conventionally known aluminoxane or may be a benzene-insoluble organoaluminum oxy compound as exemplified in JP-A-H2-78687. Specific examples of the organoaluminum oxy compound (C-2) include methyl aluminoxane, ethyl aluminoxane, and isobutyl aluminoxane.

Examples of a method for producing a conventionally known aluminoxane include the following methods, and conventionally known aluminoxanes can be usually obtained as a hydrocarbon solvent solution.

(1) A method of adding an organoaluminum compound such as trialkyl aluminum to a hydrocarbon medium suspension of a compound containing adsorbed water or a salt containing crystallization water, such as, for example, hydrated magnesium chloride, hydrated copper sulfate, hydrated aluminum sulfate, hydrated nickel sulfate, or hydrated cerium chloride to allow the adsorbed water or the crystallized water to react with the organoaluminum compound;

(2) a method of allowing water, ice, or water vapor to directly act on an organoaluminum compound such as trialkyl aluminum in a medium such as benzene, toluene, ethylether, or tetrahydrofuran; and (3) a method of allowing an organic tin oxide such as dimethyl tin oxide or dibutyl tin oxide to react with an organoaluminum compound such as trialkyl aluminum in a medium such as decane, benzene, or toluene.

In addition, the aluminoxanes may include a small amount of an organometallic component. Additionally, after distilling and removing a solvent or a nonreactive organoaluminum compound from the recovered solution of the aluminoxane, the obtained aluminoxane may be re-dissolved in a solvent or suspended in a poor solvent of aluminoxane.

Specific examples of the organoaluminum compound used to prepare aluminoxane include the same organoaluminum compounds as those exemplified as the organoaluminum compounds belonging to general formula (C-1a) above.

Among them, trialkyl aluminum and tri-cycloalkyl aluminum are preferable, and trimethyl aluminum is particularly preferable.

The organoaluminum compounds as mentioned above are used singularly or in combination of two or more thereof.

As a solvent used to prepare aluminoxane, there may be mentioned aromatic hydrocarbons such as benzene, toluene, xylene, cumene, and cymene; aliphatic hydrocarbons such as pentane, hexane, heptane, octane, decane, dodecane, hexadecane, and octadecane; alicyclic hydrocarbons such as cyclopentane, cyclohexane, cyclooctane, and methyl cyclopentane; petroleum fractions such as gasoline, kerosene, and light oil; or halogenated products of the aromatic hydrocarbons, the aliphatic hydrocarbons, and the alicyclic hydrocarbons, particularly, hydrocarbon solvents of chlorinated products and brominated products. Furthermore, ethers such as ethyl ether and tetrahydrofuran can be also used. Among these solvents, aromatic hydrocarbons or aliphatic hydrocarbons are particularly preferable.

In addition, the benzene-insoluble organoaluminum oxy compound used in the present invention includes an Al component that is dissolved in benzene at 60° C. in an amount of usually 10% or less, preferably 5% or less, and particularly preferably 2% or less in terms of Al atoms. In other words, the benzene-insoluble organoaluminum oxy compound is preferably insoluble or hardly soluble in benzene.

As the organoaluminum oxy compound (C-2) used in the present invention, there may be also mentioned organoaluminum oxy compounds including boron represented by the following general formula (III).

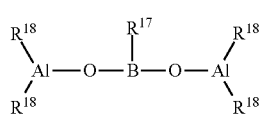
(III)

(In general formula (III), $R^{17}$ represents a hydrocarbon group having 1 to 10 carbon atoms, and four $R^{18}$s may be the same as or different from each other, and represent a hydrogen atom, a halogen atom, and hydrocarbon groups having 1 to 10 carbon atoms).

The organoaluminum oxy compound including boron represented by general formula (III) above can be produced by allowing an alkylboronic acid represented by the following general formula (IV) to react with an organoaluminum compound for 1 minute to 24 hours at a temperature of from −80° C. to room temperature in an inert solvent under an inert gas atmosphere.

(In general formula (IV), $R^{19}$ represents the same group as $R^{17}$ in general formula (III) above).

Specific examples of the alkylboronic acid represented by general formula (IV) above include methylboronic acid, ethylboronic acid, isopropylboronic acid, n-propylboronic acid, n-butylboronic acid, isobutylboronic acid, n-hexylboronic aid, cyclohexylboronic acid, phenylboronic acid, 3,5-difluoroboronic acid, pentafluorophenylboronic acid, and 3,5-bis(trifluoromethyl)phenylboronic acid. Among them, methylboronic acid, n-butylboronic acid, isobutylboronic acid, 3,5-difluorophenylboronic acid, and pentafluorophenylboronic acid are preferable. These are used singularly or in combination of two or more thereof.

Specific examples of an organoaluminum compound allowed to react with such an alkylboronic acid include the same ones as those exemplified as the organoaluminum compound belonging to general formula (C-1a) above.

The organoaluminum compound is preferably trialkyl aluminum and tri-cycloalkyl aluminum, and particularly, trimethyl aluminum, triethyl aluminum, and triisobutyl aluminum are preferable. These are used singularly or in combination of two or more thereof.

The organoaluminum oxy compounds (C-2) as mentioned above are used singularly or in combination of two or more thereof.

((C-3) Compound that Reacts with Crosslinking Metallocene Compound (A) or Transition Metal Compound (B) to Form Ion Pair)

Examples of the compound (C-3) (hereinafter referred to also as "ionized ionic compound") that reacts with the crosslinking metallocene compound (A) or the transition metal compound (B) to form an ion pair, which is used in the present invention, include Lewis acids, ionic compounds, borane compounds, and carborane compounds described in JP-A-H1-501950, JP-A-H1-502036, JP-A-H3-179005, JP-A-H3-179006, JP-A-H3-207703, JP-A-H3-207704, U.S. Pat. No. 5,321,106, and the like. Furthermore, heteropoly compounds and isopoly compounds can be also used.

Specific examples of the Lewis acids include compounds represented by $BR_3$ (R is a phenyl group that may have a substituent such as fluorine, a methyl group, or a trifluoromethyl group, or fluorine), such as trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron, and tris(3,5-dimethylphenyl)boron.

Examples of the ionized ionic compound include compounds represented by the following general formula (V).

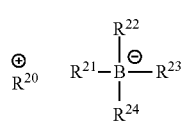
(V)

(In general formula (V), $R^{20}$ is $H^+$, a carbonium cation, an oxonium cation, an ammonium cation, a phosphonium cation, a cycloheptyl trienyl cation, or a ferrocenium cation containing a transition metal, and $R^{21}$ to $R^{24}$ may be the same as or different from each other and are organic groups, and preferably aryl groups or substituted aryl groups).

Specific examples of the carbonium cation include tri-substituted carbonium cations such as a triphenyl carbonium cation, a tri(methylphenyl)carbonium cation, and a tri(dimethylphenyl) carbonium cation.

Specific examples of the ammonium cation include trialkyl ammonium cations such as a trimethyl ammonium cation, a triethyl ammonium cation, a tripropyl ammonium cation, a tributyl ammonium cation, and a tri (n-butyl) ammonium cation; N,N-dialkyl anilinium cations such as an N,N-dimethyl anilinium cation, an N,N-diethyl anilinium cation, and an N,N-2,4,6-pentamethyl anilinium cation; and dialkyl ammonium cations such as a di(isopropyl)ammonium cation and a dicyclohexyl ammonium cation.

Specific examples of the phosphonium cation include triaryl phosphonium cations such as a triphenyl phosphonium cation, a tri(methylphenyl)phosphonium cation, and a tri(dimethylphenyl)phosphonium cation.

As $R^{15}$, carbonium cations and ammonium cations are preferable, and triphenyl carbonium cations, N,N-dimethyl anilinium cations, and N,N-diethyl anilinium cations are particularly preferable.

In addition, examples of the ionic compound include trialkyl-substituted ammonium salts, N,N-dialkyl anilinium salts, dialkyl ammonium salts, and triaryl phosphonium salts.

Specific examples of the trialkyl-substituted ammonium salts include triethyl ammonium tetra(phenyl)boron, tripropyl ammonium tetra(phenyl) boron, tri (n-butyl) ammonium tetra(phenyl) boron, trimethyl ammonium tetra(p-tolyl)boron, trimethyl ammonium tetra(o-tolyl)boron, tri(n-butyl) ammonium tetra(pentafluorophenyl)boron, tripropyl ammonium tetra(o,p-dimethylphenyl)boron, tri(n-butyl) ammonium tetra(m, m-dimethylphenyl)boron, tri(n-butyl) ammonium tetra(p-trifluoromethylphenyl)boron, tri(n-butyl)ammonium tetra(3,5-ditrifluoromethylphenyl)boron, and tri(n-butyl)ammonium tetra(o-tolyl)boron.

Specific examples of the N,N-dialkyl anilinium salts include N,N-dimethylanilinium tetra(phenyl)boron, N,N-diethylanilinium tetra(phenyl)boron, and N,N,2,4,6-pentamethylanilinium tetra(phenyl)boron.

Specific examples of the dialkyl ammonium salts include di (1-propyl) ammonium tetra(pentafluorophenyl) boron and dicyclohexylammonium tetra(phenyl)) boron.

Furthermore, examples of the ionized ionic compound include triphenylcarbonium tetrakis(pentafluorophenyl)borate, N, N-dimethylanilinium tetrakis(pentafluorophenyl) borate, ferrocenium tetra(pentafluorophenyl)borate, triphenylcarbenium pentaphenylcyclopentadienyl complex, N,N-diethylanilinium pentaphenylcyclopentadienyl complex, and boron compounds represented by the following formula (VI) or (VII).

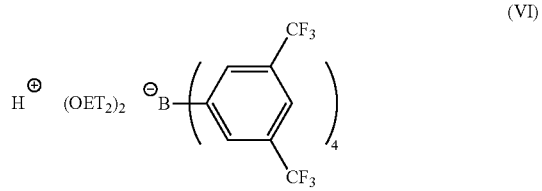

(In formula (VI), Et represents an ethyl group).

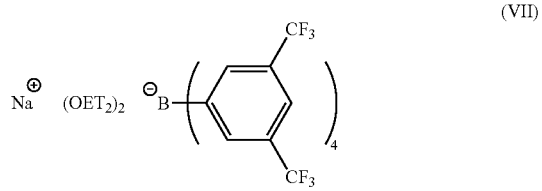

(In formula (VII), Et represents an ethyl group).

Specific examples of the borane compounds as the an example of the ionized ionic compound (compound (C-3)) include decaborane; anion salts such as bis[tri(n-butyl)ammonium]nonaborate, bis[tri(n-butyl)ammonium]decaborate, bis[tri(n-butyl)ammonium]undecaborate, bis[tri(n-butyl) ammonium]dodecaborate, bis[tri(n-butyl)ammonium]decachlorodecaborate, and, bis[tri(n-butyl)ammonium]dodecachlorododecaborate; metal borane anion salts such as tri(n-butyl)ammonium bis[dodecahydride dodecaborate]cobaltate (III) and bis[tri(n-butyl)ammonium]bis(dodecahydride dodecaborate)nickelate (III).

Specific examples of the carborane compounds as the an example of the ionized ionic compound include anion salts such as 4-carbanonaborane, 1,3-dicarbanonaborane, 6,9-dicarbadecaborane, dodecahydride-1-phenyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydride-11-methyl-2,7-dicarbaundecaborane, tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate, tri(n-butyl)ammonium 6-carbadecaborate, tri(n-butyl) ammonium 6-carbadecaborate, tri(n-butyl)ammonium 7-carbaundecaborate, tri(n-butyl)ammonium 7,8-dicarbaundecaborate, tri(n-butyl)ammonium 2,9-dicarbaundecaborate, tri(n-butyl)ammonium dodecahydride-8-methyl-7,9-dicarbaundecaborate, tri(n-butyl)ammonium undecahydride-8-ethyl-7,9-dicarbaundecaborate, tri(n-butyl)ammonium undecahydride-8-butyl-7,9-dicarbaundecaborate, tri(n-butyl)ammonium undecahydride-8-allyl-7,9-dicarbaundecaborate, tri(n-butyl)ammonium undecahydride-9-trimethylsilyl-7,8-dicarbaundecaborate, and tri(n-butyl)ammonium undecahydride-4,6-dibromo-7-carbaundecaborate; and metal carborane anion salts such as tri(n-butyl)ammonium bis(nonahydride-1,3-dicarbanonaborate)cobaltate (III), tri (n-butyl)ammonium bis(undecahydride-7,8-dicarbaundecaborate)ferrate (III), tri(n-butyl)ammonium bis(undecahydride-7,8-dicarbaundecaborate)cobaltate (III), tri(n-butyl) ammonium bis(undecahydride-7,8-dicarbaundecaborate) nickelate (III), tri(n-butyl)ammonium bis(undecahydride-7,8-dicarbaundecaborate)cuprate (III), tri(n-butyl)ammonium bis(undecahydride-7,8-dicarbaundecaborate)aurate (III), tri (n-butyl)ammonium bis(nonahydride-7,8-dimethyl-7,8-dicarbaundecaborate)ferrate (III), tri(n-butyl)ammonium bis (nonahydride-7,8-dimethyl-7,8-dicarbaundecaborate) chromate (III), tri(n-butyl)ammonium bis (tribromooctahydride-7,8-dicarbaundecaborate)cobaltate (III), tris[tri(n-butyl)ammonium]bis(undecahydride-7-carbaundecaborate)chromate (III), bis[tri(n-butyl)ammonium] bis(undecahydride-7-carbaundecaborate)manganate (IV), bis[tri(n-butyl)ammonium]bis(undecahydride-7-carbaundecaborate)cobaltate (III), and bis[tri(n-butyl)ammonium]bis (undecahydride-7-carbaundecaborate)nickelate (IV).

The heteropoly compounds that are the an example of the ionized ionic compound are compounds that include an atom selected from silicon, phosphorus, titanium, germanium, arsenic, and tin and one or two atoms selected from vanadium, niobium, molybdenum, and tungsten. Specific examples of the compounds include phosphovanadic acid, germanovanadic acid, arsenovanadic acid phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotaungstovanadic acid, phosphomolybdotungstovanadic acid, germanomolybdotungstovnadic acid, phosphomolybdotungstic acid, phosphomolybdoniobic acid, and salts of these acids, although not limited thereto. In addition, examples of the salts include salts of the above-mentioned acids and metals of group I or II in the periodic table, and specifically, such as lithium, sodium, potassium, rubidium, cesium, beryllium, magnesium, calcium, strontium, and barium, and organic salts such as triphenylethyl salts.

The isopoly compounds that are the an example of the ionized ionic compound are compounds composed of one metal ion selected from vanadium, niobium, molybdenum, and tungsten, and can be regarded as molecular ion species of metal oxides. Specific examples of the compounds include vanadic acid, niobic acid molybdic acid, tungstic acid, and salts of these acids, although not limited thereto. In addition, examples of the above salts include salts of the above acids and metals of group I or II in the periodic table, specifically, such as lithium, sodium, potassium, rubidium, cesium, beryllium, magnesium, calcium, strontium, and barium, and organic salts such as triphenylethyl salts.

The ionized ionic compounds (compound (C-3)) as described above are used singularly or in combination of two or more thereof.

When the organoaluminum oxy compound (C-2) such as methyl aluminoxane as a co-catalyst component is used in combination with the crosslinking metallocene compound (A), the compound exhibits a very high polymerization activity on an olefin compound.

The ionized ionic compounds as described above are used singularly or in combination of two or more thereof.

Hereinafter, a description will be given of methods for polymerizing olefin in the presence of an olefin polymerization catalyst including the compounds (A), (B), and (C) described above to produce the olefin-based resin (β).

Polymerization can be performed by any of liquid phase polymerization methods such as solution polymerization methods, bulk polymerization methods, and suspension polymerization, and gas phase polymerization methods. A post-process [a-2] of a polymerization method [a] and a polymerization method [b] that will be described later are performed by a liquid phase polymerization method.

Specific examples of an inert hydrocarbon medium that is used in the liquid phase polymerization method include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; and halogenated hydrocarbons such as ethylene chloride, chlorobenzene, and dichloromethane or mixtures thereof. Olefin itself can be also used as a solvent.

In producing the olefin-based resin (β), when using the olefin polymerization catalyst described above, the crosslinking metallocene compound (A) is used in an amount of usually from $10^{-8}$ to 1 mole, and preferably from $10^{-7}$ to 0.5 moles per liter of reaction volume, and the transition metal compound (B) is used in an amount of usually from $10^{-12}$ to $10^{-2}$ moles, and preferably from $10^{-10}$ to $10^{-3}$ moles per liter of reaction volume. In addition, the crosslinking metallocene compound (A) and the transition metal compound (B) are used in such an amount that a mole ratio (B/A) of the transition metal compound (B) to the crosslinking metallocene compound (A) is usually from 0.00001 to 100, preferably from 0.00005 to 10, and more preferably from 0.0001 to 5.

The organometallic compound (C-1) is used in such an amount that a mole ratio (C-1/M) of the organometallic compound (C-1) to the transition metal atom (M) (a titanium atom, a zirconium atom, or a hafnium atom in the crosslinking metallocene compound (A)) in the crosslinking metallocene compound (A) and the transition metal compound (B) is usually from 0.01 to 100000, and preferably from 0.05 to 50000.

The organoaluminum oxy compound (C-2) is used in such an amount that a mole ratio (C-2/M) of an aluminum atom in the organoaluminum oxy compound (C-2) to the transition metal atom (M) (a titanium atom, a zirconium atom, or a hafnium atom in the crosslinking metallocene compound (A)) in the crosslinking metallocene compound (A) and the transition metal compound (B) is usually from 10 to 500000, and preferably from 20 to 100000.

The ionized ionic compound (C-3) is used in such an amount that a mole ratio (C-3/M) of the ionized ionic compound (C-3) to the transition metal atom (M) (a titanium atom, a zirconium atom, or a hafnium atom in the crosslinking metallocene compound (A)) in the crosslinking metallocene compound (A) and the transition metal compound (B) is usually from 1 to 10, and preferably from 1 to 5.

In addition, a polymerization temperature of olefin using such an olefin polymerization catalyst is in a range of usually from −50 to +300° C., and preferably from 0 to 170° C. Polymerization pressure condition is usually from normal pressure to 9.8 MPa (100 kg/cm$^2$), and preferably from normal pressure to 4.9 MPa (50 kg/cm$^2$), and polymerization reaction can be performed by any a batch method, a semi-continuous method, and a continuous method.

The molecular weight of the olefin polymer to be obtained can be adjusted by adding hydrogen to the polymerization system or changing the polymerization temperature. Furthermore, the molecular weight thereof can also be adjusted by selection of any compounds used for the compounds (A), (B), and (C) or selection of any combination thereof.

As olefins that are used in polymerization, there are mentioned ethylene and the above-mentioned α-olefins having 3 to 20 carbon atoms. These olefins can be used in combination with ethylene as an essential monomer and one or more other monomers.

In the present invention, the olefin-based resin (β) can be produced by either the following method [a] or [b].

Polymerization Method [a]

A method including a pre-process [a-1] for obtaining a vinyl-terminated macromonomer by polymerizing ethylene in the presence of the transition metal compound (B) and the compound (C) and then a post-process [a-2] for copolymerizing ethylene with at least one α-olefin selected from α-olefins having 3 to 20 carbon atoms in the presence of the crosslinking metallocene compound (A) and the compound (C) in the presence of a reaction product of the pre-process [a-1].

Polymerization Method [b]

A method of copolymerizing ethylene with at least one α-olefin selected from α-olefins having 3 to 20 carbon atoms in the presence of the crosslinking metallocene compound (A), the transition metal compound (B), and the compound (C).

Hereinafter, preferable embodiments of the polymerization methods [a] and [b] will be described.

Polymerization Method [a]

Pre-Process [a-1]

The pre-process is a process for mainly polymerizing ethylene by an olefin polymerization catalyst including the transition metal compound (B) and the compound (C) to obtain a vinyl-terminated macromonomer that is substantially an ethylene polymer. The polymerization method is not particularly limited in the above-mentioned range. In the case of liquid phase polymerization, an obtained reaction solution may be introduced as it is to a post-process. Alternatively, after obtaining the vinyl-terminated macromonomer, the vinyl-terminated macromonomer may be introduced to the post-process in a lumpy form as it is or a powder form, or may be formed into slurry or melted again before being introduced to the post-process.

Post-Process [a-2]

It is a method including a post-process for copolymerizing ethylene, at least one α-olefin selected from α-olefins having 3 to 20 carbon atoms, and the vinyl-terminated macromonomer obtained in the pre-process [a-1] in the presence of the crosslinking metallocene compound (A) and the compound (C). The polymerization method is not particularly limited in the range described above. Since this is a process that produces a non-crystalline or low-crystalline ethylene/α-olefin copolymer moiety, a liquid phase polymerization method is preferable, and particularly, solution polymerization is preferable in terms of controlling each monomer concentration to obtain an olefin-based resin (β) having a desired structure.

In the polymerization reaction, the pre-process [a-1] may be performed by a batch method, and the post-process [a-2] may be also performed by a batch method, or the pre-process [a-1] may be performed by the batch method, whereas the post-process [a-2] may be performed by a continuous method by introducing the obtained macromonomer. Alternatively, the pre-process [a-1] can be performed by a continuous method, and the post-process [a-2] can be also performed by a continuous method by introducing a product as it is. Still alternatively, the pre-process [a-1] can be performed by the continuous method, and the post-process [a-2] can be also performed by a batch method.

Polymerization Method [b]

This is a method of polymerizing, in a single stage, ethylene with at least one α-olefin selected from α-olefins having 3 to 20 carbon atoms in the presence of the crosslinking metallocene compound (A), the transition metal compound (B), and the compound (C), and can be performed in a single polymerization device. An olefin polymerization catalyst comprising the transition metal compound (B) and the compound (C) tends to polymerize ethylene with high selectivity even when any α-olefin other than ethylene is present in the polymerization system. Furthermore, the catalyst tends to produce a polymer having a relatively small molecular weight, and the obtained polymer has a vinyl terminal. Accordingly, the olefin polymerization catalyst including the transition metal compound (B) and the compound (C) can produce a vinyl-terminated macromonomer that is substantially an ethylene polymer.

On the other hand, an olefin polymerization catalyst comprising the crosslinking metallocene compound (A) and the compound (C) can produce a polymer having a large molecular weight and can copolymerize ethylene, an α-olefin(s), and additionally, the vinyl-terminated macromonomer obtained by using the olefin polymerization catalyst including the transition metal compound (B) and the compound (C). In this manner, under the single polymerization reaction conditions, the olefin-based polymer [R1] can be included in the olefin-based resin (β).

In the method for producing the olefin-based resin (β), the post-process [a-2] of the polymerization method [a] and the polymerization process of the polymerization method [b] are preferably performed by a solution polymerization method in a temperature range of from 80 to 300° C.

The above-mentioned "solution polymerization" is a general term for a method of performing polymerization in a state where the polymer has been dissolved in an inert hydrocarbon that will be described later as a polymerization solvent. Examples of the polymerization solvent used in the post-process [a-2] of the polymerization method [a] and the polymerization process of the polymerization method [b] include aliphatic hydrocarbons and aromatic hydrocarbons. Specific examples thereof include aliphatic hydrocarbons such as propane, butane, pentane, hexane, heptane, octane, decane, dodecane, and kerosene; alicyclic hydrocarbons such as cyclopentane, cyclohexane, and methyl cyclopentane; aromatic hydrocarbons such as benzene, toluene, and xylene; and halogenated hydrocarbons such as ethylene chloride, chlorobenzene, and dichloromethane, and these can be used singularly or in combination of two or more thereof. Additionally, among them, from industrial viewpoints, aliphatic hydrocarbons such as hexane and heptane are preferable, and furthermore, hexane is preferable from the viewpoint of separation and purification from the olefin-based resin (β).

In addition, the polymerization temperature of the post-process [a-2] of the polymerization method [a] and the polymerization process of the polymerization method [b] is in a range of preferably from 80 to 200° C., and more preferably from 90 to 200° C. The reason for the preferable temperature range is that the vinyl-terminated macromonomer is favorably dissolved at temperatures of 90° C. or higher in an aliphatic hydrocarbon such as hexane or heptane industrially preferably used as the above-mentioned polymerization solvent. Higher polymerization temperature is preferable in terms of improving the introduction efficiency of polyethylene side chain. In addition, from the viewpoint of productivity improvement also, higher temperature is preferable for polymerization.

Polymerization pressure condition for the post-process [a-2] of the polymerization method [a] and the polymerization process of the polymerization method [b] is usually from normal pressure to 10 MPa gauge pressure, preferably from normal pressure to 5 MPa gauge pressure, and more preferably from normal pressure to 3 MPa gauge pressure. Additionally, from the viewpoint of productivity improvement, preferred is from 0.5 to 3 MPa gauge pressure.

The polymerization reaction can be performed by any of a batch method, a semi-continuous method, and a continuous method. Furthermore, polymerization can be also performed by dividing into two or more stages different in reaction conditions. Among such methods, it is preferable for the present invention to employ a method of performing copolymerization by continuously supplying monomers to a reactor.

The reaction time (an average retention time in a case of performing copolymerization by the continuous method) of the post-process [a-2] of the polymerization method [a] and the polymerization process of the polymerization method [b] varies with conditions such as the catalyst concentration and the polymerization temperature. However, the reaction time is usually from 0.5 minutes to 5 hours, and preferably from 5 minutes to 3 hours.

In the post-process [a-2] of the polymerization method [a] and the polymerization method [b], a polymer concentration under normal operation is usually from 5 to 50% by weight, and preferably from 10 to 40% by weight. The polymer concentration is preferably from 15 to 35% by weight, from the viewpoint of viscosity limitation in polymerization ability, a post-processing process (desolvation) load, and productivity.

The molecular weight of the olefin polymer to be obtained can be also adjusted by changing a hydrogen concentration in the polymerization system and the polymerization temperature within the range. Furthermore, the molecular weight thereof can be also adjusted by the amount of the compound (C) to be used. When adding hydrogen, an appropriate amount thereof is approximately from 0.001 to 5,000 NL per kg of an olefin polymer to be produced.

Furthermore, other resins, rubbers, inorganic fillers, and/or the like can be added to the olefin-based resin (β) in a range not impairing the object of the present invention. In addition, there can be added additives such as a weathering stabilizer, a heat stabilizer, an antistatic agent, an antislip agent, an antiblocking agent, an antifogging agent, a lubricant, pigments dyes, a plasticizer, an anti-aging agent, a hydrochloric acid absorber, an antioxidant or the like, and a crystal nucleating agent. In the olefin-based resin according to the present invention, amounts of addition of the other resins, the other rubbers, the inorganic fillers, and the additives, and the like are not particularly limited in the range not impairing the object of the invention. For example, in an embodiment that can be exemplified, the olefin-based resin (β) is included in an amount of from 5 to 100% by weight, preferably from 25 to 100% by weight, more preferably from 50 to 100% by weight, and still more preferably from 70 to 100% by weight with respect to a total weight.

Propylene-Based Resin Composition

In the propylene-based resin composition of the present invention, when the sum of the (α) and the (β) is 100 parts by weight, the propylene-based polymer (α) is in an amount of from 1 to 99 parts by weight, preferably from 3 to 97 parts by weight, and more preferably from 5 to 95 parts by weight. The olefin-based resin (β) is in an amount of from 1 to 99 parts by weight, preferably from 3 to 97 parts by weight, and more preferably from 5 to 95 parts by weight. When the amounts of the propylene-based polymer (α) and the olefin-based resin (β) are in the above ranges, the balance between the impact resistance and the rigidity of the propylene-based resin composition becomes favorable, so that the composition can be suitably used in various kinds of molded articles.

Furthermore, in the propylene-based resin composition according to the present invention, other resins, rubbers, inorganic fillers, organic fillers, and the like can be added in the range not impairing the object of the invention. Additionally, there can be added additives such as a weathering stabilizer, a heat stabilizer, an antistatic agent, an antislip agent, an antiblocking agent, an antifogging agent, a lubricant, pigments dyes, a plasticizer, an anti-aging agent, a hydrochloric acid absorber, an antioxidant or the like, and a crystal nucleating agent. In the propylene-based resin composition according to the present invention, amounts of addition of the other resins, the other rubbers, the inorganic fillers, the additives, and the like are not particularly limited in the range not impairing the object of the invention.

The method for preparing the propylene-based resin composition according to the present invention is not particularly limited, and a melting method, a solution method, or the like is usable. Practically, a melting and kneading method is preferable. The melting and kneading method can be a melting and kneading method that is generally in practical use for thermoplastic resins. For example, respective components in a powdery or granular form are uniformly mixed, if required, together with additives described in the section of the additional components, and the like by a Henschel mixer, a ribbon blender, a V-shaped blender, or the like, and then, the mixture is kneaded by a single screw or multi-screw kneading extruder, a kneading roll, a batch kneader, a kneader, a Banbury mixer, or the like to prepare the resin composition.

The melting and kneading temperature for each component (for example, a cylinder temperature in the case of an extruder) is usually from 170 to 250° C., and preferably from 180 to 230° C. Furthermore, the kneading order and method for each component are not particularly limited.

Molded Article

The propylene-based resin composition according to the present invention can improve impact resistance while maintaining rigidity and has an excellent balance between the rigidity and the impact resistance. Thus, the resin composition can be molded into various kinds of molded articles by known molding methods such as injection molding, extrusion molding, inflation molding, blow molding, extrusion blow molding, injection blow molding, press molding, vacuum molding, calendaring molding, and foaming molding. Then, the resin composition can be used for various known purposes, such as automotive parts, containers for food and medicine, and packaging materials for food and electronic materials.

Molded articles produced using the propylene-based resin composition according to the present invention have the excellent balance between rigidity and impact resistance, along with high surface hardness and also excellent chemical resistance. Thus, they can be used for various kinds of automotive parts. For example, the molded articles are usable for automotive exterior parts such as bumpers, side malls, and aerodynamic undercovers, automotive interior parts such as instrument panels and interior trims, outer plate parts such as fenders, door panels, and steps, parts around engines, such as an engine cover, a fan, and a fan shroud, and the like.

Examples of the containers for food and medicine include food containers, retort containers, and bottle containers such as tableware, retort containers, frozen storage containers, retort pouches, microwavable heat-resistant containers, frozen food containers, frozen dessert cups, cups, and beverage bottles, blood transfusion sets, medical bottles, medical containers, medical hollow bottles, medical bags, transfusion bags, blood preservation bags, transfusion bottle chemical containers, detergent containers, cosmetic containers, perfume containers, and toner containers.

Examples of the packaging materials include food packaging materials, meat packaging materials, processed-fish packaging materials, vegetable packaging materials, fruit packaging materials, fermented food packaging, sweets packaging materials, oxygen absorbent packaging materials, retort food packaging materials, freshness preservation films, medicine packaging materials, cell culture bags, cell inspection films, bulb packaging materials, seed packaging materials, vegetable/fungus cultivation films, heat-resistant vacuum molded containers, prepared-food containers, prepared-food container lids, industrial wrapping films, household wrapping films, and baking cartons.

Examples of films, sheets, and tapes include protection films such as polarizing plate protection films, liquid crystal panel protection films, optical component protection films, lens protection films, protection films for electric parts and electrical appliances, mobile phone protection films, PC protection films, masking films, capacitor films, reflection films, laminates (including glass), radiation resistant films, γ-ray resistant films, and porous films.

Examples of other purposes for use include casings of home electric appliances, hoses, tubes, electric wire coating materials, high voltage electric wire insulators, cosmetic and perfume spray tubes, medical tubes, transfusion tubes, pipes, wire harnesses, interior materials for motorcycles, railroad vehicles, air planes, ships, and the like, instrument panel skins, door trim skins, rear package trim skins, ceiling skins, rear pillar skins, seat back garnishes, console boxes, arm rests, airbag case lids, shift knobs, assist grips, side step mats, reclining covers, in-trunk sheets, seat belt buckles, mall materials such as inner/outer malls, roof malls, and belt malls, automotive seal materials such as door seals and body seals, automotive interior/exterior parts such as glass run channels, mudguards, kicking plates, step mats, number plate housings, automotive hose components, air duct hoses, air duct covers, air intake pipes, air dam skirts, timing belt cover seals, bonnet cushions, and door cushions, special tires such as vibration damping tires, silent tires, car race tires, and radio control tires, packings, automotive dust covers, lamp seals, boot materials for automobiles, rack and pinion boots, timing belts, wire harnesses, grommets, emblems, air filter packings, skin materials for furniture, shoes, garments, bags, building materials, and the like, building seal materials, waterproof sheets, building material sheets, building material gaskets, window films for building materials, iron-core protecting materials, gaskets, doors, doorframes, window frames, cornices, baseboards, open frames and the like, floor materials, ceiling materials, wall papers, health items (e.g., nonslip mats/sheets, fall-preventing films/mats/sheets), health device components, impact-absorbing materials such as impact-absorbing pads, protectors/protection tools (e.g., helmets and guards), sport gears (e.g., sport grips and protectors), protection tools for sports, rackets, mouth guards, balls, golf balls, carrying tools (e.g., carrying impact-absorbing grips and impact-absorbing sheets), vibration damping pallets, impact-absorbing dampers, insulators, impact absorbers for shoes, impact-absorbing foaming articles, and impact-absorbing films, grip materials, general merchandise, toys, shoe treads, shoe soles, shoe midsoles/inner soles, soles, sandals, suckers, toothbrushes, floor materials, gymnastic mats, electrical tool components, agricultural equipment components, heat dissipation materials, transparent substrates, soundproof materials, cushion materials, wire cables, shape memory materials, medical gaskets, medical caps, medicine caps, gaskets, packing materials used for products subjected to high-temperature processing such as boiling and high pressure steam sterilization after filling bottles with baby food, dairy products, medicines, sterilized water, or the like, industrial seal materials, and industrial sewing machine tables, number plate housings, cap liners such as PET bottle caps, stationary products, office supplies, supporting members for precision instruments and OA devices such as OA printer legs, FAX legs, sewing machine legs, motor supporting mats, and audio vibration preventing materials, heat-resistant OA packings, animal cages, physical and chemical science experimental tools such as beakers and measuring cylinders, optical measurement cells, garment cases, clear cases, clear files, clear sheets, desk mats, fiber applications such as nonwoven fabrics, stretchable nonwoven fabrics, fibers, waterproof fabrics, air-permeable fabrics and clothes, paper diapers, sanitary products, hygiene products, filters, bug filters, dust-collecting filters, air cleaners, hollow fiber filters, water purifying filters, and gas separation membranes.

Among them, particularly suitable use purposes are automotive internal/external parts such as bumpers and instrument panels, outer plate parts, food containers, and beverage containers, because molded articles obtained from the propylene-based resin composition of the present invention can improve impact resistance while maintaining rigidity and can have the excellent balance between rigidity and impact resistance.

EXAMPLES

Hereinafter, the present invention will be described more specifically with reference to Examples. The invention is not limited to the Examples without departing from the gist of the invention.

In the Examples below, physical properties of olefin-based resins (β), propylene-based polymers (α), and propylene-based resin compositions were measured by the following methods.

<<Methods for Measuring Physical Properties of Olefin-Based Resin (β)>>

Methods for measuring physical properties of the olefin-based resin (β) are given below.

(1) Measurement of Melting Temperature (Tm) and Melting Heat Quantity (ΔH)

Melting peaks (Tm) and melting heat quantities ΔH were obtained by performing DSC measurement in the following conditions.

Using a differential scanning calorimeter [RDC 220 manufactured by Seiko Instruments Inc.], approximately 10 mg of a sample was heated from 30° C. to 200° C. at a temperature increase rate of 50° C./min in a nitrogen atmosphere and maintained at the temperature for 10 minutes. Additionally, the sample was cooled to 30° C. at a temperature decrease rate of 10° C./min and maintained at the temperature for 5 minutes, followed by being heated to 200° C. at a temperature increase rate of 10° C./min. A heat absorption peak observed in the second temperature increase was used as a melting peak, and the temperature at the peak was obtained as a melting temperature (Tm). Additionally, a melting heat quantity ΔH was obtained by calculating an area of the melting peak. When multiple melting peaks were observed, the entire area of the melting peaks was calculated to obtain a melting heat quantity ΔH.

(2) Measurement of Glass Transition Temperature Tg

Measurement of glass transition temperature Tg was performed by performing DSC measurement in the following conditions.

Using a differential scanning calorimeter [RDC 220 manufactured by Seiko Instruments Inc.], approximately 10 mg of a sample was heated from 30° C. to 200° C. at a temperature increase rate of 50° C./min in a nitrogen atmosphere and maintained at the temperature for 10 minutes. Additionally, the sample was cooled to −100° C. at a temperature decrease rate of 10° C./min and maintained at the temperature for 5 minutes, followed by being heated to 200° C. at a temperature increase rate of 10° C./min. A glass transition temperature Tg is detected in such a manner that, in the second temperature increase, a DSC curve bends due to a change in specific heat and a baseline is moved in parallel. A temperature at an intersection between a tangent line of the baseline on a lower temperature side from the bend and a tangent line of a point having a maximum inclination in the bent portion was used as a glass transition temperature Tg.

(3) Measurement of Ortho-Dichlorobenzene Soluble Component

The percentage E (% by weight) of an ortho-dichlorobenzene-soluble component at 20° C. or lower was obtained by performing CFC measurement in the following conditions. Device: cross-fractionation chromatograph CFC2 (Polymer ChAR), Detector (built-in): infrared spectrophotometer IR[4]

(Polymer ChAR), Detection wavelength: 3.42 μm (2,920 cm-1); fixed, Sample concentration: 120 mg/30 mL, Injection volume: 0.5 mL, Temperature decrease time: 1.0° C./min, Elution segmentation: 4.0° C. interval (−20 to 140° C.), GPC column: Shodex HT-806M X 3 columns (Showa Denko Co., Ltd.), GPC column temperature: 140° C., GPC column calibration: monodispersed polystyrene (Tosoh at), Molecular weight calibration method: universal calibration method (in terms of polystyrene molecular weight), Mobile phase: o-dichlorobenzene (BHT added), and Flow rate: 1.0 mL/min.

(4) Pulsed NMR Measurement

Pulsed NMR measurement was performed in the following conditions.
Device: JNM-MU25 manufactured by JEOL, Co. Ltd., Measurement technique: Carr Purecell Meiboom Gill method (CPMG method), Pulse width: 90° C. pulse, 2.0 μs, Repeating time: 4 sec, Number of times of integration: 8 times, and Measurement temperature: 200° C.

(5) Elastic Modulus Measurement (Tensile Test)

Elastic modulus was measured using a sample piece obtained by press-molding an olefin-based resin (β) at 200° C. for 5 minutes, according to ASTM D638.

(6) $^{13}$C-NMR Measurement

In order to perform a composition analysis of an α-olefin of a polymer and check the number of methyl branches and a grafted structure of a macromonomer, $^{13}$C-NMR measurement was performed in the following conditions.
Device: AVANCE III 500 CryoProbe Prodigy type nuclear magnetic resonance device manufactured by Bruker Biospin GmbH, Measurement nucleus: $^{13}$C (125 MHz), Measurement mode: single pulse proton broadband decoupling, Pulse width: 45° (5.00 μs), Number of points: 64 k, Measurement range: 250 ppm (−55 to 195 ppm), Repeating time: 5.5 seconds, Number of times of integration: 512 times, Measurement solvent: ortho-dichlorobenzene/benzene-$d_6$ (4/1 v/v), Sample concentration: ca. 60 mg/0.6 mL, Measurement temperature: 120° C., Window function: exponential (BF: 1.0 Hz), and Chemical shift reference: benzene-$d_5$ (128.0 ppm).

(7) GPC Analysis

In order to perform a molecular weight analysis of a polymer and estimate a remaining macromonomer quantity, a GPC analysis was performed in the following conditions.
Device: Alliance GPC 2000 model manufactured by Waters Corporation, Column: TSK-gel GMH6-HT 2 columns, TSK-gel GMH6-HTL 2 columns (all of which are manufactured by Tosoh Corporation; inner diameter: 7.5 mm, length: 30 cm), Column temperature: 140° C., Mobile phase: ortho-dichlorobenzene (including 0.025% dibutylhydroxy toluene), Detector: differential refractometer, Flow rate: 1.0 mL/min, Sample concentration: 0.15% (w/v), Injection volume: 0.5 mL, Sampling time interval: 1 second, and Column calibration: monodispersed polystyrene (manufactured by Tosoh Corporation).

(8) Intrinsic Viscosity ([η] [dl/g]) Measurement

Intrinsic viscosity was measured at 135° C. in a decalin solvent.

(9) Melt Flow Rate (MFR [g/10 min])

Melt flow rate was measured under a load of 2.16 kg according to ASTM D1238E. The measurement was performed at 190° C.

(10) The composition ratio (% by weight) of an olefin-based polymer [R1] was roughly estimated by subtracting a remaining macromonomer composition ratio (% by weight) calculated from the GPC analysis and a composition ratio (% by weight) of an ethylene/α-olefin copolymer having no side chains roughly estimated from the percentage of an ortho-dichlorobenzene-soluble component at 20° C. or lower from the entire quantity (100% by weight).

<<Methods for Measuring Physical Properties of Propylene-Based Polymer (α) and Propylene-Based Resin Composition>>

Hereinafter, a description will be given of methods for measuring physical properties of propylene-based polymers (α) and propylene-based resin compositions. In addition, intrinsic viscosity was measured by the above method (8).

(11) Melt Flow Rate (MFR [g/10 min])

Melt flow rate was measured under the load of 2.16 kg according to ASTM D1238E. The measurement was performed at 230° C.

(12) Quantity of n-Decane-Soluble Component and Quantity of n-Decane-Insoluble Component at 23° C. ([% by weight])

Approximately 3 g of a propylene-based polymer (α), 500 ml of decane, and a small amount of a decane-soluble heat-resistance stabilizer were charged in a glass measurement container and heated to 150° C. in 2 hours while being stirred with a stirrer in a nitrogen atmosphere to dissolve the propylene-based polymer (α). The resulting solution was maintained at 150° C. for 2 hours, and then gradually cooled to 23° C. in 8 hours. The obtained solution containing a propylene-based block copolymer precipitate was filtered under reduced pressure through a glass filter of 25G-4 standard manufactured by Iwata Glass Co., Ltd. Then, 100 ml of the filtrate was collected and dried under reduced pressure to obtain apart of a decane-soluble component. After this operation, a decane-soluble component (Dsol) quantity and a decane-insoluble component (Dinsol) quantity were determined by the following formulae. In addition, the propylene-based polymer (α) was measured up to a unit of $10^{-4}$ g, and the weight thereof was represented by b (g) in the following formulae. Additionally, the weight of the a part of the decane-soluble component was measured up to the unit of $10^{-4}$ g, and the weight thereof was represented by a (g) in the following formulae.

Content of n-decane-soluble component at 23° C.
(Dsol)=100×(500×a)/(100×b)

Content of n-decane-insoluble component at 23° C.
(Dinsol)=100−100×(500×a)/(100×b)

(13) Measurement of Pentad Fraction mmmm

Pentad fraction mmmm [%] that is one index of tacticity of a polymer and represents micro-tacticity of the polymer was calculated from a peak intensity ratio of $^{13}$C-NMR spectra attributed based on Macromolecules 8,687 (1975) in the propylene-based polymer (α). The $^{13}$C-NMR spectra were measured by an apparatus EX-400 manufactured by JOEL Ltd., using TMS as a reference, at 130° C. in an o-dichlorobenzene solvent.

(14) Measurement of Propylene- and Ethylene-Derived Skeletal Contents

In order to measure an ethylene-derived skeleton concentration in the Dsol, 20 to 30 mg of a sample was dissolved in 0.6 ml of a 1,2,4-trichlorobenzene/heavy benzene (mass ratio 2:1) solution, and then, carbon nuclear magnetic resonance analysis ($^{13}$C-NMR) was performed. Propylene and ethylene were quantified by a dyad chain distribution. In the case of a propylene-ethylene copolymer, quantities thereof were obtained by the following calculating formulae using PP=Sαα, EP=Sαγ+Sαβ, and EE=1/2(Sβδ+Sδδ)+1/4Sγδ.

Propylene (% by mol)=(PP+1/2EP)×100/[(PP+1/2EP)+(1/2EP+EE)]

Ethylene (% by mol)=(1/2EP+EE)×100/[(PP+1/2EP)+(1/2EP+EE)]

(15) Flexural Modulus Measurement

Flexural modulus FM [MPa] was measured in the following conditions according to JIS K7171.

<Measurement Conditions>
Test piece: 10 mm (width)×4 mm (thickness)×80 mm (length)
Bending rate: 2 mm/min
Bending span: 64 mm

(16) Charpy Impact Test

Charpy impact value [kJ/m$^2$] was measured in the following conditions according to JIS K7111.

<Test Conditions>
Temperature: −30° C.
Test piece: 10 mm (width)×80 mm (length)×4 mm (thickness)
Notch: formed by machining.

(17) Rockwell Hardness Measurement

Rockwell hardness (R scale) was measured in the following conditions according to JIS K7202.

<Measurement Conditions>
Test piece: 30 mm (width)×30 mm (length)×2 mm (thickness)
Measurement was performed by stacking two test pieces together.

Hereinafter, a description will be given of production examples of the olefin-based resin (β). In addition, in order to ensure obtaining of a sample quantity necessary for evaluation, there were cases when production was performed a plurality of times.

Production Example 1

Production of Olefin-Based Resin (β-1)

<Synthesis of Macromonomer (P-1) (Pre-Process [a-1])>

A compound (1) represented by the following formula (1) used as a catalyst was synthesized according to [Synthesis Example 3] of WO2006/057229, and a macromonomer (P-1) was synthesized according to [Example 1] of the same publication. The obtained product had a Mw of 1550 in terms of polyethylene and a Mw/Mn of 2.32, and a one-terminal unsaturation percentage measured by $^1$H-NMR was 99.0% by mol.

<Graft Copolymerization (Post-Process [b-1])>

A compound (2) represented by the following formula (2) used as a catalyst was synthesized by a known method.

Into a thoroughly nitrogen-substituted glass reactor with an inner volume of 1 L, 2.2 g of the macromonomer (P-1) and 500 ml of xylene were placed and heated to 90° C. to dissolve the macromonomer. Into the solution, 120 liters/hr of ethylene and 31 liters/hr of 1-butene were continuously supplied to saturate a liquid phase and a gas phase. Subsequently, while continuously supplying ethylene and 1-butene, 1.5 mL (1.5 mmol) of a decane solution (1.0 mol/L) of triisobutyl aluminium (referred to also as iBu$_3$Al), 1.5 mL (0.0030 mmol) of a toluene solution (0.0020 mol/L) of the compound (2), and then, 1.9 mL (0.0076 mmol) of a toluene solution (4.0 mmol/L) of triphenylcarbenium tetrakis(pentafluorophenyl)borate (referred to also as Ph3CB (C$_6$F$_5$)4) were added, and polymerization was performed at 90° C. for 15 minutes under normal pressure. The polymerization was stopped by adding a small amount of isobutanol. The obtained polymerization reaction solution was added into 1.5 liters of methanol containing a small amount of hydrochloric acid to precipitate a polymer. The precipitate was washed with methanol and then dried under reduced pressure at 80° C. for 10 hours to obtain 24.4 g of an olefin-based resin (β-1). Table 1 depicts analysis results of the obtained olefin-based resin (β-1).

Production Example 2

Production of Olefin-Based Resin (β-2)

An olefin-based resin (β-2) was produced in the same manner as Production Example 1, except that, in steps of the post-process of Production Example 1, the amount of the macromonomer (P-1) to be charged was changed to 5.0 g, the amounts of the gaseous monomers to be supplied were changed to 110 liters/hr of ethylene and 44 liters/hr of 1-butene, and the polymerization time was changed to 18 minutes. The amount of the obtained olefin-based resin (β-2) was 27.3 g. Table 1 depicts analysis results of the obtained olefin-based resin (β-2).

Production Example 3

Production of Olefin-Based Resin (β'-1)

An olefin-based resin (β'-1) was produced in the same manner as Production Example 1, except that, in the post-process of Production Example 1, the amount of 1-butene to be supplied was changed to 32 liters/hr, the polymerization temperature was changed to 93° C., and polymerization was performed without adding the macromonomer (P-1). The amount of the obtained olefin-based resin (β'-1) was 22.3 g. Table 1 depicts analysis results of the obtained olefin-based resin (β'-1).

Production Example 4

Production of Olefin-Based Resin (β-3)

A compound (4) represented by the following formula (4) used as a catalyst was synthesized by a known method.

Into a stainless steel autoclave with an inner volume of 1 L equipped with a pressure control valve, 1079 mL/hr of heptane, 181 mL/hr of octene, 28 mL/hr of a toluene solution (compound (4): 0.10 mmol/L, compound (1): 0.30 mmol/L, and MMAO: 15.0 mmol/L (as an aluminum atom concentration)) as a mixture of the compound (4), the compound (1), and a modified methylaluminoxane (referred to also as MMAO), 112 mL/hr of a toluene solution (0.4 mmol/L) of triphenylcarbenium tetrakis(pentafluorophenyl)borate (referred to also as $Ph_3CB(C_6F_5)_4$), 300 g/L of ethylene, and 2.7 mL/h of hydrogen, respectively, were continuously charged (intermittently charged at 92-second intervals). The pressure control valve was set to 0.74 MPa, and a polymerization reaction solution was continuously taken out so that the solution amount in the polymerization device was maintained at 700 mL. After 2 hours from start of charging of all the solvent, monomers, and catalyst, the polymerization reaction solution was collected for 30 minutes. The obtained polymerization reaction solution was added into a mixed solution of 1.5 liters of methanol (750 mL) containing a small amount of hydrochloric acid and acetone (750 mL) to precipitate a polymer. The precipitate was washed with methanol and then dried under reduced pressure at 80° C. for 10 hours to obtain 92.3 g of an olefin-based resin. Table 1 depicts analysis results of the obtained olefin-based resin.

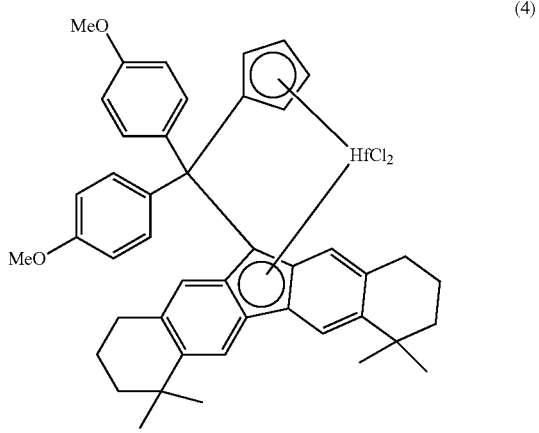

(4)

Production Example 5

Production of Olefin-Based Resin (b'-2)

An olefin-based resin (b'-2) was produced in the same manner as Production Example 4, except that, in Production Example 4, a toluene solution (compound (4): 0.10 mmol/L and MMAO: 15.0 mmol/L (as an aluminum atom concentration)) as a mixture of the compound (4) and MMAO was used instead of the toluene solution as the mixture of the compound (4), the compound (1), and MMAO. The olefin-based resin (b'-2) was obtained in an amount of 93.4 g. Table 1 depicts analysis results of the obtained olefin-based resin (b'-2).

Production Example 6

Production of Olefin-Based Resin (b-4)

A compound (5) represented by the following formula (5) used as a catalyst was synthesized by a known method.

Into a stainless steel polymerization device with an inner volume of 100 L equipped with an impeller (number of rotations of stirring=250 rpm), 23 L/hr of dehydrated hexane, 0.0095 mmol/hr of the compound (4), 0.0029 mmol/hr of the compound (5), 0.045 mmol/hr of triphenylcarbenium tetrakis(pentafluorophenyl)borate, and 5.0 mmol/hr of triisobutyl aluminium were continuously supplied. Propylene, ethylene, and hydrogen were continuously supplied so that a gas composition in the gas phase polymerization device became 0.34 (mole ratio) as butene/ethylene and 0.058 (mole ratio) as hydrogen/ethylene. The produced polymerization solution was continuously discharged through a discharge outlet provided on a sidewall of the polymerization device while regulating the opening degree of a solution surface control valve so that the solution amount in the polymerization device was maintained at 28 L. The obtained polymerization solution was introduced into a heater and heated to 180° C. Then, methanol, as a catalyst deactivator, was added at a rate of 80 mL per hour to stop the polymerization. The resulting solution was continuously transferred to a devolatilization step under reduced pressure and dried to obtain an olefin-based resin (β-4) at a production rate of 4.2 kg/hr. Table 1 depicts analysis results of the obtained olefin-based resin (β-4).

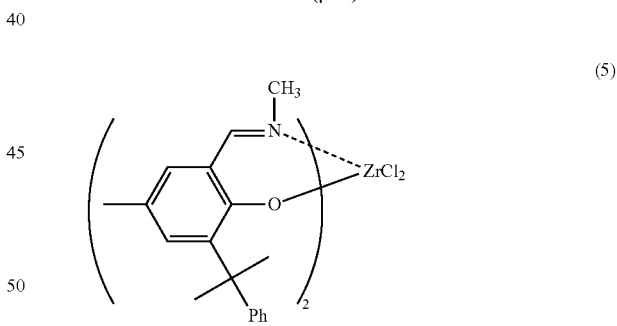

(5)

TABLE 1

|  | Production Ex. 1 | Production Ex. 2 | Production Ex. 3 | Production Ex. 4 | Production Ex. 5 | Production Ex. 6 |
| --- | --- | --- | --- | --- | --- | --- |
| Symbol of olefin-based resin | β-1 | β-2 | β'-1 | β-3 | β'-2 | β-4 |
| Temperature Tm of 60° C. or higher at which a melting peak appears (° C.) | 89.0 | 93.8 | Not observed | 96.2 | Not observed | 98.8 |
| Melting heat quantity ΔH (J/g) | 9.0 | 28.0 | Not observed | 59.5 | Not observed | 34.6 |
| Percentage E of ortho-dichlorobenzene-soluble component at 20° C. or lower (wt %) | 25.0 | 13.7 | 93.0 | 10.1 | 95.0 | 18.2 |
| Glass transition temperature Tg (° C.) | −67.4 | −70.3 | −67.3 | −68.2 | −67 | −70.6 |
| Intrinsic viscosity [η] (g/dl) | 2.05 | 1.69 | n.d. | 1.28 | 1.93 | 1.35 |
| MFR (g/10 min) | 0.25 | 0.18 | n.d. |  | 0.75 | 1.08 |
| Value A | 226 | 49 | n.d. | n.d. | n.d. | 95 |

TABLE 1-continued

| | | | Production Ex. 1 | Production Ex. 2 | Production Ex. 3 | Production Ex. 4 | Production Ex. 5 | Production Ex. 6 |
|---|---|---|---|---|---|---|---|---|
| Pulsed NMR | Relaxation time T2 (ms) | | 220 | 243 | n.d. | 360 | n.d. | n.d. |
| 4th component | Abundance ratio (%) | | 16.2 | 18.9 | n.d. | 42.0 | n.d. | n.d. |
| Elastic modulus (MPa) | | | n.d. | 14.5 | n.d. | 53.46 | 2.25 | 20.5 |
| Structure of olefin-based polymer [R1] | Main chain: ethylene/α-olefin copolymer unit | Type of α-olefin | 1-butene | 1-butene | 1-butene | 1-octene | 1-octene | 1-butene |
| | | α-olefin composition (mol %) | 19 | 24 | 19 | 21 | 21 | 24 |
| | | Weight average molecular weight | 113000 | 99000 | 91000 | 167000 | 167000 | 75000 |
| | Side chain: ethylene polymer unit | Weight average molecular weight | 1600 | 1600 | No side chains | 1600 | No side chains | 2800 |
| | | Number of grafts (/1000 C) | 1.5 | 3.2 | No side chains | 3.2 | No side chains | 1.6 |
| | | Methyl branches (/1000 C) | <0.05 | <0.05 | No side chains | <0.05 | No side chains | <0.05 |
| Composition ratio of remaining macromonomer (wt %) | | | 2.2 | 5.5 | 0 | 22 | 0 | 12 |
| Composition ratio of olefin-based polymer [R1] (wt %) | | | >65.0 | >79.5 | 0 | >70 | 0 | >66 |

Production Example 7

(1) Preparation of Solid Titanium Catalyst Component

After obtaining a uniform solution by heating and reacting 95.2 g of anhydrous magnesium chloride, 442 ml of decane, and 390.6 g of 2-ethylhexyl alcohol at 130° C. for 2 hours, 21.3 g of phthalic anhydride was added to the solution. Then, stirring and mixing was performed at 130° C. for 1 hour to dissolve the phthalic anhydride.

The uniform solution thus obtained was cooled to room temperature. After that, 75 ml of the uniform solution was charged dropwise over 1 hour into 200 ml of titanium tetrachloride maintained at −20° C. After finishing charging, the temperature of the mixed solution was raised to 110° C. in 4 hours, and when the temperature reached 110° C., 5.22 g of diisobutyl phthalate (DIBP) was added, and the mixed solution was maintained at the same temperature while stirring for 2 hours from the point in time.

After finishing the 2-hour reaction, a solid fraction was collected by hot filtration. The solid fraction was suspended again in 275 ml of titanium tetrachloride, and then the suspension was heated again at 110° C. for 2 hours. After finishing the reaction, a solid fraction was collected again by hot filtration and thoroughly washed with decane and hexane at 110° C. until any free titanium compound was not detected in the solution.

Herein, detection of the free titanium compound was confirmed by the following method. Ten ml of a supernatant solution of the solid catalyst component was collected by a syringe and charged into a previously nitrogen-substituted 100-ml Schlenk flask with a side arm. Next, the solvent hexane was dried out by nitrogen gas flow, and furthermore, the supernatant was dried in vacuum for 30 minutes. Into the residue were charged 40 ml of an ion exchange water and 10 ml of (1:1) sulfuric acid, followed by stirring for 30 minutes. The obtained solution was transferred to a 100-ml measuring flask through a filter paper. Subsequently, 1 ml of a concentrated phosphoric acid aqueous solution as a masking agent for iron (II) ions and 5 ml of a 3% hydrogen peroxide solution as a color reagent for titanium were added. Furthermore, the solution in the measuring flask was diluted with ion exchange water to 100 ml and mixed by shaking the flask. Twenty minutes later, a light absorbance at 420 nm was observed through UV, and washing removal of the free titanium was performed until the absorption was not observed.

A solid titanium catalyst component (A) thus prepared was stored as a decane slurry. A part of the slurry was dried to investigate a catalyst composition. The composition of the solid titanium catalyst component (A) thus obtained included 2.3% by weight of titanium, 61% by weight of chlorine, 19% by weight of magnesium, and 12.5% by weight of DIBP.

(2) Production of Prepolymerization Catalyst

One hundred g of the solid catalyst component, 39.3 mL of triethyl aluminum, and 100 L of heptane were placed in an autoclave with an inner volume of 200 L equipped with a stirrer. The inner temperature of the autoclave was maintained at 15 to 20° C. Then, 600 g of propylene was placed therein, and the mixture was allowed to react while stirring for 60 minutes, whereby a catalyst slurry was obtained.

(3) Main Polymerization

Into a jacketed circulation tubular polymerization device with an inner volume of 58 L, 43 kg/h of propylene, 177 NL/h of hydrogen, 0.58 g/h of the catalyst slurry produced in (2) as a solid catalyst component, 3.1 ml/h of triethyl aluminum, and 3.3 ml/h of dicyclopentyl dimethoxysilane were continuously supplied and polymerized in a full-liquid state without any gas phase. The temperature and pressure of the tubular polymerization device were 70° C. and 3.53 MPa/G.

The obtained slurry was transferred to a vessel polymerization device with an inner volume of 100 L equipped with a stirrer to furthermore perform polymerization. Into the polymerization device, propylene was supplied at 45 kg/h, and hydrogen was supplied so that the gas phase fraction had a hydrogen concentration of 3.2% by mol. Polymerization was performed at a polymerization temperature of 70° C. and a pressure of 3.28 MPa/G.

An obtained propylene-based homopolymer (α-h-1) was dried in vacuum at 80° C. Table 2 depicts physical properties of the propylene-based homopolymer (α-h-1).

TABLE 2

|  | Production Ex. 7 |
|---|---|
| Polymer | α-h-1 |
| MFR (g/10 min) | 30 |
| mmmm (%) | 97.8 |

Production Example 8

(1) Preparation of Magnesium Compound

A reaction chamber with a stirrer (inner volume: 500 liters) was thoroughly substituted with nitrogen gas, and into which 97.2 kg of ethanol, 640 g of iodine, and 6.4 kg of metal magnesium were charged and allowed to react while stirring under refluxing conditions until no hydrogen gas occurred in the system, whereby a solid reaction product was obtained. The reaction solution containing the solid reaction product was dried under reduced pressure to obtain an intended magnesium compound (a solid catalyst carrier).

(2) Preparation of Solid Catalyst Component

Into a thoroughly nitrogen gas-substituted reaction chamber with a stirrer (inner volume: 500 liters), 30 kg of the magnesium compound (unpulverized), 150 liters of purified heptane (n-heptane), 4.5 liters of silicon tetrachloride, and 5.4 liters of di-n-butyl phthalate were added. The inside of the system was maintained at 90° C., and 144 liters of titanium tetrachloride was charged therein while stirring, followed by allowing to react at 110° C. for 2 hours. Then, a solid component was isolated and washed with purified heptane at 80° C. Furthermore, 228 liters of titanium tetrachloride was added, and the mixture was allowed to react at 110° C. for 2 hours. After that, the resultant was thoroughly washed with purified heptane to obtain a solid catalyst component.

(3) Pre-Processing

Into a reaction chamber with an inner volume of 500 liters equipped with a stirrer was charged 230 liters of purified heptane, and then, 25 kg of the solid catalyst component, 1.0 mol/mol of triethyl aluminum with respect to titanium atoms in the solid catalyst component, and 1.8 mol/mol of dicyclopentyl dimethoxysilane with respect thereto were supplied. After that, propylene was introduced until a propylene partial pressure of 0.03 MPa-G was reached, and the mixture was allowed to react at 25° C. for 4 hours. After finishing the reaction, the resulting solid catalyst component was washed with purified heptane a couple of times, and furthermore, carbon dioxide was supplied, followed by stirring for 24 hours.

(4) Polymerization

Into a polymerization device with an inner volume of 200 L equipped with a stirrer, 3 mmol/hr of the processed solid catalyst component in terms of titanium atoms in the component, 2.5 mmol/kg-PP of triethyl aluminum, and 0.25 mmol/kg-PP of dicyclopentyl dimethoxysilane, respectively, were supplied. Then, propylene, ethylene, and 1-butene, respectively, were continuously supplied at 46.0 kg/hr, 2.0 kg/hr, and 2.4 kg/hr, respectively, at a polymerization temperature of 82° C. and a polymerization pressure of 2.8 MPa-G to allow them to react. At this time, in the polymerization device, the ethylene concentration was 2.4% by mol, the 1-butene concentration was 1.8% by mol, and the hydrogen concentration was 8.2% by mol.

As a result of that, there was obtained a propylene-based random copolymer (α-r-1) having an ethylene content of 3.6% by weight, a 1-butene content of 2.4% by weight, and an MFR of 7.0 g/10 min. Table 3 depicts physical properties of the propylene-based random copolymer (α-r-1).

TABLE 3

|  | Production Ex. 8 |
|---|---|
| Polymer | α-r-1 |
| MFR (g/10 min) | 7 |
| Ethylene content (wt %) | 3.6 |
| Butene content (wt %) | 2.4 |
| Tm (° C.) | 138 |

Production Example 9

(1) Preparation of Solid Titanium Catalyst Component

A solid titanium catalyst component was obtained in the same method as the method described in Production Example 7.

(2) Production of Prepolymerization Catalyst

A catalyst slurry including the prepolymerization catalyst component was obtained in the same method as the method described in Production Example 7.

(3) Main Polymerization

Into a jacketed circulation tubular polymerization device with an inner volume of 58 L, 43 kg/h of propylene, 300 NL/h of hydrogen, 0.55 g/h of the catalyst slurry produced in (2) as a solid catalyst component, 2.9 ml/h of triethyl aluminum, and 3.1 ml/h of dicyclopentyl dimethoxysilane were continuously supplied and polymerized in a full-liquid state without any gas phase. The temperature and pressure of the tubular polymerization device were 70° C. and 3.74 MPa/G.

The obtained slurry was transferred to a vessel polymerization device with an inner volume of 100 L equipped with a stirrer to furthermore perform polymerization. Into the polymerization device, propylene was supplied at 45 kg/h, and hydrogen was supplied so that the gas phase fraction had a hydrogen concentration of 8.7% by mol. The polymerization was performed at a polymerization temperature of 70° C. and a pressure of 3.49 MPa/G.

The obtained slurry was transferred to a pipette with an inner volume of 2.4 L, in which the slurry was gasified to perform solid-gas separation, followed by supplying a polypropylene homopolymer powder to a gas phase polymerization device with an inner volume of 480 L to perform ethylene/propylene block copolymerization. In addition, a part of the powder was sampled before the copolymerization to measure MFR and mmmm. Propylene, ethylene, and hydrogen were continuously supplied so that the gas composition in the gas phase polymerization device became 0.23 (mole ratio) as ethylene/(ethylene+propylene) and became 0.031 (mole ratio) as hydrogen/ethylene. The polymerization was performed at a polymerization temperature of 70° C. and a pressure of 1.0 MPa/G.

An obtained propylene-based block copolymer (α-b-1) was dried in vacuum at 80° C. Table 4 depicts physical properties of the obtained propylene-based block copolymer (α-b-1).

Production Example 10

(1) Preparation of Solid Titanium Catalyst Component

A solid titanium catalyst component was obtained in the same method as the method described in Production Example 7.

(2) Production of Prepolymerization Catalyst

One hundred g of the solid catalyst component, 131 ml of triethyl aluminum, 37.3 ml of diethylamino triethoxysilane, and 14.3 L of heptane were placed in an autoclave with an inner volume of 20 L equipped with a stirrer. The inner temperature of the autoclave was maintained at 15 to 20° C., and 1000 g of propylene was placed. The mixture was allowed to react while stirring for 120 minutes. After finishing the polymerization, a solid component was sedimented, and a supernatant solution was removed and washing with heptane was performed twice. The obtained prepolymerization catalyst was suspended again in purified heptane, and adjustment was made with heptane so that the solid catalyst component had a concentration of 1.0 g/L, whereby a catalyst slurry was obtained.

(3) Main Polymerization

Into a jacketed circulation tubular polymerization device with an inner volume of 58 L, 43 kg/h of propylene, 256 NL/h of hydrogen, 0.49 g/h of the catalyst slurry produced in (2) as a solid catalyst component, 4.5 ml/h of triethyl aluminum, and 1.8 ml/h of diethylamino triethoxysilane were continuously supplied and polymerized in a full-liquid state without any gas phase. The temperature and pressure of the tubular polymerization device were 70° C. and 3.57 MPa/G.

The obtained slurry was transferred to a vessel polymerization device with an inner volume of 100 L equipped with a stirrer to furthermore perform polymerization. Into the polymerization device, propylene was supplied at 45 kg/h, and hydrogen was supplied so that the gas phase fraction had a hydrogen concentration of 8.8% by mol. The polymerization was performed at a polymerization temperature of 68° C. and a pressure of 3.36 MPa/G.

The obtained slurry was transferred to a pipette with an inner volume of 2.4 L, in which the slurry was gasified to perform solid-gas separation, followed by supplying a polypropylene homopolymer powder to a gas phase polymerization device with an inner volume of 480 L to perform ethylene/propylene block copolymerization. In addition, a part of the powder was sampled before the copolymerization to measure MFR and mmmm. Propylene, ethylene, and hydrogen were continuously supplied so that the gas composition in the gas phase polymerization device became 0.20 (mole ratio) as ethylene/(ethylene+propylene) and became 0.0063 (mole ratio) as hydrogen/ethylene. The polymerization was performed at a polymerization temperature of 70° C. and a pressure of 1.40 MPa/G.

An obtained propylene-based block copolymer was dried in vacuum at 80° C. Table 4 depicts physical properties of the obtained propylene-based block copolymer (α-b-2).

TABLE 4

|  |  | Production Ex. 9 | Production Ex. 10 |
|---|---|---|---|
|  | Polymer | α-b-1 | α-b-2 |
| Homo PP moiety | MFR (g/10 min) | 70 | 270 |
|  | mmmm (%) | 97.7 | 97.8 |
| Dsol. | Content (wt %) | 12.0 | 9.0 |
|  | Ethylene content (mol %) | 42 | 40 |
|  | [η] | 3.4 | 7.5 |
|  | MFR(g/10 min) | 30 | 85 |

Example 1

After mixing 25 parts by weight of the olefin-based resin (β-1) produced in Production Example 1, 75 parts by weight of the propylene-based homopolymer (α-h-1) produced in Production Example 7, 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder in the following conditions to prepare a pellet-shaped propylene-based resin composition and form a test piece by an injection molding machine in the following conditions. Table 5 depicts physical properties of the obtained propylene-based resin composition.

<Conditions for Melting and Kneading>
Same direction twin-screw extruder: Product No. KZW-15, manufactured by Technovel Corporation
Kneading temperature: 190° C.
Number of screw rotations: 500 rpm
Number of feeder rotations: 40 rpm
<JIS Compact Test Piece/Injection Molding Conditions>
Injection molding machine: Product No. EC40 manufactured by Toshiba Machine Co., Ltd.
Cylinder temperature: 190° C.
Mold temperature: 40° C.
Injection time–dwell time: 13 seconds (primary filling time: 1 second)
Cooling time: 15 seconds Example 2

After mixing 25 parts by weight of the olefin-based resin (β-1) produced in Production Example 1, 75 parts by weight of the propylene-based random copolymer (α-r-1) produced in Production Example 8, 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder to prepare a pellet-shaped propylene-based resin composition and form a test piece by an injection molding machine, as in Example 1. Table 5 depicts physical properties of the obtained propylene-based resin composition.

Example 3

After mixing 25 parts by weight of the olefin-based resin (β-1) produced in Production Example 1, 75 parts by weight of the propylene-based block copolymer (α-b-1) produced in Production Example 9, 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder to prepare a pellet-shaped propylene-based resin composition and form a test piece by an injection molding machine, as in Example 1. Table 5 depicts physical properties of the obtained propylene-based resin composition.

olefin-based resin (β-1) produced in Production Example 1. Table 5 depicts physical properties of the obtained propylene-based resin composition.

Comparative Example 4

After mixing 15 parts by weight of the olefin-based resin (β'-1) produced in Production Example 3, 10 parts by weight of the macromonomer (P-1) synthesized in the pre-process [a-1] of Production Example 1, 75 parts by weight of the propylene-based homopolymer (α-h-1) produced in Production Example 7, 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder to prepare a pellet-shaped propylene-based resin composition and form a test piece by an injection molding machine, as in Example 1. Table 5 depicts physical properties of the obtained propylene-based resin composition.

TABLE 5

| | | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|---|
| Composition (parts by weight) | Olefin-based resin (β-1) | 25 | 25 | 25 | | | | |
| | Olefin-based resin (β'-1) | | | | 25 | 25 | 25 | 15 |
| | Macromonomer (P-1) | | | | | | | 10 |
| | Propylene-based homopolymer (α-h-1) | 75 | | | 75 | | | 75 |
| | Propylene-based random polymer (α-r-1) | | 75 | | | 75 | | |
| | Propylene-based block copolymer (α-b-1) | | | 75 | | | 75 | |
| Mechanical physical properties | MFR (g/10 min) | 14 | 5 | 12 | 19 | 6 | 17 | 36 |
| | FM (MPa) | 1080 | 650 | 740 | 1110 | 620 | 780 | 1190 |
| | Charpy impact value (−30° C.) (kJ/m$^2$) | 3.2 | 6.0 | 10.0 | 2.6 | 2.4 | 8.5 | 1.3 |
| | Rockwell hardness (R scale) | 70 | 40 | 34 | 54 | 14 | 11 | 59 |

Comparative Example 1

Comparative Example 1 was performed in the same manner as Example 1, except that, in Example 1, 25 parts by weight of the olefin-based resin (β'-1) produced in Production Example 3 was used instead of 25 parts by weight of the olefin-based resin (β-1) produced in Production Example 1. Table 5 depicts physical properties of the obtained propylene-based resin composition.

Comparative Example 2

Comparative Example 2 was performed in the same manner as Example 2, except that, in Example 2, 25 parts by weight of the olefin-based resin (β'-1) produced in Production Example 3 was used instead of 25 parts by weight of the olefin-based resin (β-1) produced in Production Example 1. Table 5 depicts physical properties of the obtained propylene-based resin composition.

Comparative Example 3

Comparative Example 3 was performed in the same manner as Example 3, except that, in Example 3, 25 parts by weight of the olefin-based resin (β'-1) produced in Production Example 3 was used instead of 25 parts by weight of the Example 4

After mixing 20 parts by weight of the olefin-based resin (β-2) produced in Production Example 2, 60 parts by weight of the propylene-based homopolymer (α-b-2) produced in Production Example 10, 20 parts by weight of talc (JM-209 (trademark), manufactured by Asada Milling Co., Ltd.), 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder in the following conditions to prepare a pellet-shaped propylene-based resin composition and form a test piece by an injection molding machine in the following conditions. Table 6 depicts physical properties of the obtained propylene-based resin composition.

<Conditions for Melting and Kneading>

Same direction twin-screw extruder: Product No. KZW-15, manufactured by Technovel Corporation Kneading temperature: 190° C.

Number of screw rotations: 500 rpm

Number of feeder rotations: 40 rpm

<JIS Compact Test Piece/Injection Molding Conditions>

Injection molding machine: Product No. EC40 manufactured by Toshiba Machine Co., Ltd.

Cylinder temperature: 190° C.

Mold temperature: 40° C.

Injection time–dwell time: 13 seconds (primary filling time: 1 second)

Cooling time: 15 seconds

Example 5

After mixing 23 parts by weight of the olefin-based resin (β-2) produced in Production Example 2, 57 parts by weight of the propylene-based homopolymer (α-b-2) produced in Production Example 10, 20 parts by weight of talc (JM-209 (trademark), manufactured by Asada Milling Co., Ltd.), 0.1 parts by weight of a heat-resistant stabilizer IRGANOX 1010 (trademark, Ciba-Geigy Corporation), 0.1 parts by weight of a heat-resistant stabilizer IRGAFOS 168 (trademark, Ciba-Geigy Corporation), and 0.1 parts by weight of calcium stearate by a tumbler, the mixture was melted and kneaded by a twin-screw extruder to prepare a pellet-shaped propylene-based resin composition and form a test piece by an injection molding machine, as in Example 4. Table 6 depicts physical properties of the obtained propylene-based resin composition.

Example 6

Example 6 was performed in the same manner as Example 4, except that, in Example 4, 20 parts by weight of the olefin-based resin (β-4) produced in Production Example 6 was used instead of 20 parts by weight of the olefin-based resin (β-2) produced in Production Example 2. Table 6 depicts physical properties of the obtained propylene-based resin composition.

Comparative Example 5

Comparative Example 5 was performed in the same manner as Example 4, except that, in Example 4, 20 parts by weight of the olefin-based resin (β'-1) produced in Production Example 3 was used instead of 20 parts by weight of the olefin-based resin (β-2) produced in Production Example 2. Table 6 depicts physical properties of the propylene-based resin composition.

Comparative Example 6

Comparative Example 6 was performed in the same manner as Example 5, except that, in Example 5, 23 parts by weight of the olefin-based resin (β'-1) produced in Production Example 3 was used instead of 23 parts by weight of the olefin-based resin (β-2) produced in Production Example 2. Table 6 depicts physical properties of the propylene-based resin composition.

Comparative Example 7

Comparative Example 7 was performed in the same manner as Example 4, except that, in Example 4, 20 parts by weight of an olefin-based resin (a linear olefin-based block polymer, XLT 8677 (trademark) manufactured by the Dow Chemical Company) (β'-3) was used instead of 20 parts by weight of the olefin-based resin (β-2) produced in Production Example 2. Table 6 depicts physical properties of the propylene-based resin composition.

Comparative Example 8

Comparative Example 8 was performed in the same manner as Example 5, except that, in Example 5, 23 parts by weight of the olefin-based resin (the linear olefin-based block polymer, XLT 8677 (trademark) manufactured by the Dow Chemical Company) ((β'-3) was used instead of 23 parts by weight of the olefin-based resin (β-2) produced in Production Example 2. Table 6 depicts physical properties of the propylene-based resin composition.

TABLE 6

|  |  | Ex. 4 | Ex. 5 | Ex. 6 | Comp. Ex. 5 | Comp. Ex. 6 | Comp. Ex. 7 | Comp. Ex. 8 |
|---|---|---|---|---|---|---|---|---|
| Composition (parts by weight) | Olefin-based resin (β-2) | 20 | 23 | | | | | |
| | Olefin-based resin (β-4) | | | 20 | | | | |
| | Olefin-based resin (β'-1) | | | | 20 | 23 | | |
| | Olefin-based resin (β'-3) | | | | | | 20 | 23 |
| | Propylene-based block copolymer (α-b-2) | 60 | 57 | 60 | 60 | 57 | 60 | 57 |
| | Talc | 20 | 20 | 20 | 20 | 20 | 20 | 20 |
| Mechanical physical properties | MFR (g/10 min) | 31 | 29 | 32 | 38 | 34 | 33 | 27 |
| | FM (Mpa) | 2130 | 1960 | 2090 | 2040 | 1940 | 2010 | 1820 |
| | Charpy impact value (−30° C.) (kJ/m$^2$) | 5.2 | 6.5 | 4.9 | 4.3 | 5.0 | 4.9 | 5.8 |
| | Rockwell hardness (R scale) | 66 | 59 | 65 | 58 | 51 | 59 | 48 |

The invention claimed is:

1. A propylene-based resin composition characterized by comprising from 1 to 99 parts by weight of a propylene-based polymer (α) whose melt flow rate (MFR) at 230° C. under a load of 2.16 kg obtained according to ASTM D1238E is from 0.1 to 500 g/10 min and from 1 to 99 parts by weight of an olefin-based resin (β) satisfying the following requirements (I) to (V) (in which a sum of the (α) and the (β) is 100 parts by weight):

(I) the olefin-based resin (β) includes a grafted olefin-based polymer [R1] having a main chain comprising an ethylene/α-olefin copolymer and at least one side chain comprising an ethylene polymer;

(II) the olefin-based resin (β) has a melting peak in a range of from 60 to 130° C. in a differential scanning calorimetry (DSC) measurement and a melting heat quantity ΔH at the melting peak is in a range of from 5 to 100 J/g;

(III) a percentage E of an ortho-dichlorobenzene soluble component at 20° C. or lower measured by cross-fractionation chromatography (CFC) is 45% by weight or less;

(IV) a glass transition temperature Tg measured by differential scanning calorimetry (DSC) is in a range of from −80 to −30° C.; and (V) an intrinsic viscosity [η] measured in decalin at 135° C. is in a range of from 0.1 to 12 dl/g.

2. The propylene-based resin composition according to claim 1, wherein the side chain of the grafted olefin-based polymer [R1] has a weight average molecular weight in a range of from 500 to 10000.

3. The propylene-based resin composition according to claim 1, wherein the side chain is present with an average frequency of from 0.3 to 20 per 1000 carbon atoms included in the main chain of the grafted olefin-based polymer [R1].

4. The propylene-based resin composition according to claim 1, wherein the olefin-based resin (β) further satisfies the following requirement (VI):

(VI) when the MFR of the olefin-based resin (β) at 190° C. under the load of 2.16 kg obtained according to ASTM D1238E is M g/10 min and the intrinsic viscosity [η] of the olefin-based resin (β) measured in decalin at 135° C. is H g/dl, a value A represented by the following relational equation (Eq-1) is in a range of from 30 to 280:

$$A = M/\exp(-3.3H) \qquad \text{(Eq-1)}$$

5. The propylene-based resin composition according to claim 1, wherein the olefin-based resin (β) further satisfies the following requirement (VII):

(VII) in a four-component approximation by a Lorentz function performed for a free induction decay curve obtained by a Carr Purcell Meiboom Gill method in a pulsed nuclear magnetic resonance (pulsed NMR) measurement at 200° C., a spin-spin relaxation time (T2) of a component having a highest mobility is in a range of from 150 to 500 ms and an abundance ratio of the component is in a range of from 15 to 50%.

6. A method for producing the olefin-based resin (β) according to claim 1, comprising a step of copolymerizing ethylene with at least one α-olefin selected from α-olefins having 3 to 20 carbon atoms in the presence of an olefin polymerization catalyst including the following components (A) to (C):

(A) a crosslinking metallocene compound represented by the following general formula (I);

(B) a transition metal compound represented by the following general formula [B]; and (C) at least one compound selected from an organometallic compound (C-1), an organoaluminum oxy compound (C-2), and a compound (C-3) that reacts with the crosslinking metallocene compound (A) or the transition metal compound (B) to form a pair of ions,

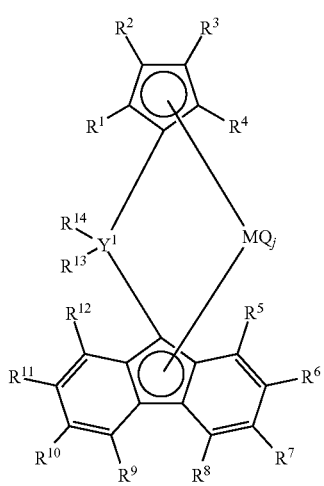

(I)

(in the formula (I), $R^1$, $R^2$, $R^3$, $R^4$, $R^5$, $R^8$, $R^9$, and $R^{12}$ each independently represent a hydrogen atom, a hydrocarbon group, a silicon-containing group, or a hetero atom-containing group other than silicon-containing groups, in which adjacent two groups of $R^1$ to $R^4$ may bond to each other to form a ring;

$R^6$ and $R^{11}$ are the same atom or the same group selected from a hydrogen atom, hydrocarbon groups, silicon-containing groups, and hetero atom-containing groups other than silicon-containing groups, $R^7$ and $R^{10}$ are the same atom or the same group selected from a hydrogen atom, hydrocarbon groups, silicon-containing groups, and hetero atom-containing groups other than silicon-containing groups, in which $R^6$ and $R^7$ may bond to each other to form a ring, and $R^{10}$ and $R^{11}$ may bond to each other to form a ring, provided that not all of $R^6$, $R^7$, $R^{10}$, and $R^{11}$ are hydrogen atoms;

$R^{13}$ and $R^{14}$ each independently represent an aryl group;

M represents a titanium atom, a zirconium atom, or a hafnium atom;

$Y^1$ represents a carbon atom or a silicon atom;

Q represents a halogen atom, a hydrocarbon group, a halogenated hydrocarbon group, a neutral conjugated or non-conjugated diene having 4 to 10 carbon atoms, an anion ligand, or a neutral ligand capable of being coordinated with a lone pair of electrons, and j represents an integer of from 1 to 4, in which when j is an integer of 2 or larger, a plurality of Qs each may be the same as or different from each other),

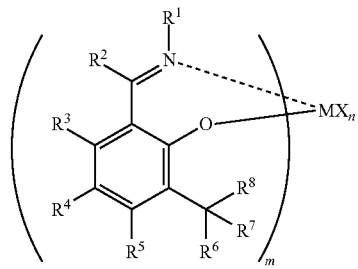

[B]

(in the general formula [B], M represents a transition metal atom of group IV or V in the periodic table;

m represents an integer of from 1 to 4;

$R^1$ represents a hydrocarbon group having 1 to 8 carbon atoms represented by general formula $C_{n'}H_{2n'+1}$ (n' is an integer of from 1 to 8);

$R^2$ to $R^5$ may be the same as or different from each other, and represent a hydrogen atom, a halogen atom, a hydrocarbon group, a heterocyclic compound residue, an oxygen-containing group, a nitrogen-containing group, a boron-containing group, a sulfur-containing group, a phosphorous-containing group, a silicon-containing group, a germanium-containing group, or a tin-containing group, in which two or more thereof may bond to each other to form a ring;

$R^6$ to $R^8$ are hydrocarbon groups, at least one of which is an aromatic hydrocarbon group, and when m is an integer of 2 or larger, two of the groups represented by $R^2$ to $R^8$ between structural units of formula [B] may be bonded to each other;

n is a value satisfying a valence of M, and X represents a hydrogen atom, a halogen atom, a hydrocarbon group, an oxygen-containing group, a sulfur-containing group, a nitrogen-containing group, a boron-containing group, an aluminum-containing group, a phosphorous-containing group, a halogen-containing group, a heterocyclic compound residue, a silicon-containing group, a germanium-containing group, or a tin-containing group, in which when n is an integer of from 2 or larger, a plurality of Xs may be the same as or different from each other, and the plurality of groups represented by X may bond to each other to form a ring).

7. The method for producing the olefin-based resin (β) according to claim 6, wherein the copolymerizing step is a step of copolymerizing by a solution polymerization method in a temperature range of from 80 to 300° C.

8. A molded article comprising the propylene-based resin composition according to claim 1.

* * * * *